US012634967B2

(12) United States Patent
Farag

(10) Patent No.: US 12,634,967 B2
(45) Date of Patent: May 19, 2026

(54) METHOD AND APPARATUS FOR SIDELINK INITIAL BEAM ACQUISITION

(71) Applicant: Samsung Electronics Co., Ltd., Suwon-si (KR)

(72) Inventor: Emad Nader Farag, Flanders, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 324 days.

(21) Appl. No.: 18/364,358

(22) Filed: Aug. 2, 2023

(65) Prior Publication Data

US 2024/0073934 A1 Feb. 29, 2024

Related U.S. Application Data

(60) Provisional application No. 63/465,456, filed on May 10, 2023, provisional application No. 63/398,432, filed on Aug. 16, 2022.

(51) Int. Cl.
*H04W 72/40* (2023.01)

(52) U.S. Cl.
CPC .................................. *H04W 72/40* (2023.01)

(58) Field of Classification Search
CPC .................................................... H04W 72/40
See application file for complete search history.

(56) References Cited

U.S. PATENT DOCUMENTS

| | | | |
|---|---|---|---|
| 2020/0053702 A1 | 2/2020 | Cheng et al. | |
| 2020/0336253 A1 | 10/2020 | He et al. | |

| | | | |
|---|---|---|---|
| 2021/0410129 A1 | 12/2021 | Freda et al. | |
| 2022/0053521 A1* | 2/2022 | Yoshioka | .............. H04L 1/1896 |
| 2022/0201528 A1 | 6/2022 | Shin et al. | |
| 2022/0232527 A1 | 7/2022 | Hong et al. | |
| 2022/0399917 A1 | 12/2022 | Shin et al. | |
| 2024/0187181 A1* | 6/2024 | Zhao | ..................... H04L 5/0023 |

(Continued)

FOREIGN PATENT DOCUMENTS

| | | |
|---|---|---|
| WO | 2021034572 A1 | 2/2021 |
| WO | 2021101196 A1 | 5/2021 |

OTHER PUBLICATIONS

International Search Report and Written Opinion issued Nov. 28, 2023 regarding International Application No. PCT/KR2023/012125, 7 pages.

(Continued)

*Primary Examiner* — Won Tae C Kim

(57) ABSTRACT

Method and apparatus for sidelink (SL) initial beam acquisition in a wireless communication system. A method for operating a user equipment (UE) includes transmitting, to a second UE, first physical sidelink control channels (PSCCHs) and corresponding first physical sidelink shared channels (PSSCHs) using multiple spatial domain transmission filters, respectively. The first PSCCHs and the corresponding first PSSCHs includes a first link establishment message. The method further includes receiving, from the second UE, assistance information associated with a spatial domain transmission filter. The method further includes determining, based on the assistance information, the spatial domain transmission filter. The method further includes transmitting, based on the spatial domain transmission filter, a second PSCCH and a corresponding second PSSCH to the second UE.

20 Claims, 18 Drawing Sheets

(56) References Cited

U.S. PATENT DOCUMENTS

2024/0196455 A1 * 6/2024 Löhr ................. H04W 28/0268
2024/0244449 A1 * 7/2024 Zhao .................... H04W 16/28

OTHER PUBLICATIONS

LG Electronics, "Discussion on channel access mechanism for sidelink on unlicensed spectrum", 3GPP TSG RAN WG1 Meeting #110, R1-2205850, Aug. 2022, 24 pages.
"5G; NR; Physical channels and modulation (3GPP TS 38.211 version 17.5.0 Release 17)", ETSI TS 138 211 V17.5.0, Jul. 2023, 141 pages.
"5G; NR; Multiplexing and channel coding (3GPP TS 38.212 version 17.5.0 Release 17)", ETSI TS 138 212 V17.5.0, Apr. 2023, 206 pages.
"5G; NR; Physical layer procedures for control (3GPP TS 38.213 version 17.6.0 Release 17)", ETSI TS 138 213 V17.6.0, Jul. 2023, 265 pages.
"5G; NR; Physical layer procedures for data (3GPP TS 38.214 version 17.6.0 Release 17)", ETSI TS 138 214 V17.6.0, Jul. 2023, 236 pages.
"5G; NR; Medium Access Control (MAC) protocol specification (3GPP TS 38.321 version 17.5.0 Release 17)", ETSI TS 138 321 V17.5.0, Jul. 2023, 255 pages.
"5G; NR; Radio Resource Control (RRC); Protocol specification (3GPP TS 38.331 version 17.5.0 Release 17)", ETSI TS 138 331 V17.5.0, Jul. 2023, 1304 pages.
"LTE; Evolved Universal Terrestrial Radio Access (E-UTRA); Physical layer procedures (3GPP TS 36.213 version 17.5.0 Release 17)", ETSI TS 136 213 V17.5.0, Apr. 2023, 569 pages.
Oppo et al., "New WID on NR sidelink evolution", 3GPP TSG RAN Meeting #94e, RP-213678, Dec. 2021, 6 pages.
Extended European Search Report issued Aug. 1, 2025 regarding Application No. 23855149.3, 7 pages.

* cited by examiner

800

Higher Layer Configuration of TCI States

MAC CE signaling of TCI State code points

DCI signaling of TCI State

FIG. 8

Direct Communication Request (DCR) includes the Target User Info. UE-B matching the Target User Info can respond to DCR.

Direct Communication Request (DCR) doesn't include the Target User Info.
A UE-B interested in the service type announced can respond to DCR.

1800

Transmit PSCCHs and corresponding PSSCHs using multiple spatial domain transmission filters. — 1810

Receive assistance information associated with a spatial domain transmission filter. — 1820

Determine the spatial domain filter. — 1830

Transmit a PSCCH and a corresponding PSCCH to the second UE. — 1840

METHOD AND APPARATUS FOR SIDELINK INITIAL BEAM ACQUISITION

CROSS-REFERENCE TO RELATED AND CLAIM OF PRIORITY

The present application claims priority under 35 U.S.C. § 119(e) to U.S. Provisional Patent Application No. 63/398,432 filed on Aug. 16, 2022, and U.S. Provisional Patent Application No. 63/465,456 filed on May 10, 2023, which are hereby incorporated by reference in their entirety.

TECHNICAL FIELD

The present disclosure relates generally to wireless communication systems and, more specifically, the present disclosure relates to method and apparatuses for sidelink (SL) initial beam acquisition.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance. To meet the demand for wireless data traffic having increased since deployment of 4G communication systems, and to enable various vertical applications, 5G communication systems have been developed and are currently being deployed.

SUMMARY

The present disclosure relates to SL initial beam acquisition.

In one embodiment, a user equipment (UE) is provided. The UE includes a transceiver configured to transmit, to a second UE, first physical sidelink (SL) control channels (PSCCHs) and corresponding first physical SL shared channels (PSSCHs) using multiple spatial domain transmission filters, respectively. The first PSCCHs and the corresponding first PSSCHs include a first link establishment message. The transceiver is further configured to receive, from the second UE, assistance information associated with a spatial domain transmission filter. The UE further includes a processor operably coupled to the transceiver. The processor is configured to determine, based on the assistance information, the spatial domain transmission filter. The transceiver is further configured to transmit, based on the spatial domain transmission filter, a second PSCCH and a corresponding second PSSCH to the second UE.

In another embodiment, a method of operating a UE is provided. The method includes transmitting, to a second UE, first PSCCHs and corresponding first PSSCHs using multiple spatial domain transmission filters, respectively. The first PSCCHs and the corresponding first PSSCHs includes a first link establishment message. The method further includes receiving, from the second UE, assistance information associated with a spatial domain transmission filter. The method further includes determining, based on the assistance information, the spatial domain transmission filter. The method further includes transmitting, based on the spatial domain transmission filter, a second PSCCH and a corresponding second PSSCH to the second UE.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates examples of transceiver configuration indication (TCI) signaling according to embodiments of the present disclosure;

DETAILED DESCRIPTION

FIGS. 1-18, discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, and to enable various vertical applications, 5G/NR communication systems have been developed and are currently being deployed. The 5G/NR communication system is implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation, radio access technology (RAT)-dependent positioning and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to the deployment of 5G communication systems, 6G, or even later releases which may use terahertz (THz) bands.

The following documents and standards descriptions are hereby incorporated by reference into the present disclosure as if fully set forth herein: [1] 3GPP TS 38.211 v17.5.0, "NR; Physical channels and modulation;" [2] 3GPP TS 38.212 v17.5.0, "NR; Multiplexing and Channel coding;" [3] 3GPP TS 38.213 v17.6.0, "NR; Physical Layer Procedures for Control;" [4] 3GPP TS 38.214 v17.6.0, "NR; Physical Layer Procedures for Data;" [5] 3GPP TS 38.321 v17.5.0, "NR; Medium Access Control (MAC) protocol specification;" [6] 3GPP TS 38.331 v17.5.0, "NR; Radio Resource Control (RRC) Protocol Specification;" [7] 3GPP TS 36.213 v17.5.0, "Evolved Universal Terrestrial Radio Access (E-UTRA); Physical layer procedures;" and [8] RP-213678, "WID on NR sidelink evolution."

Figure 1:
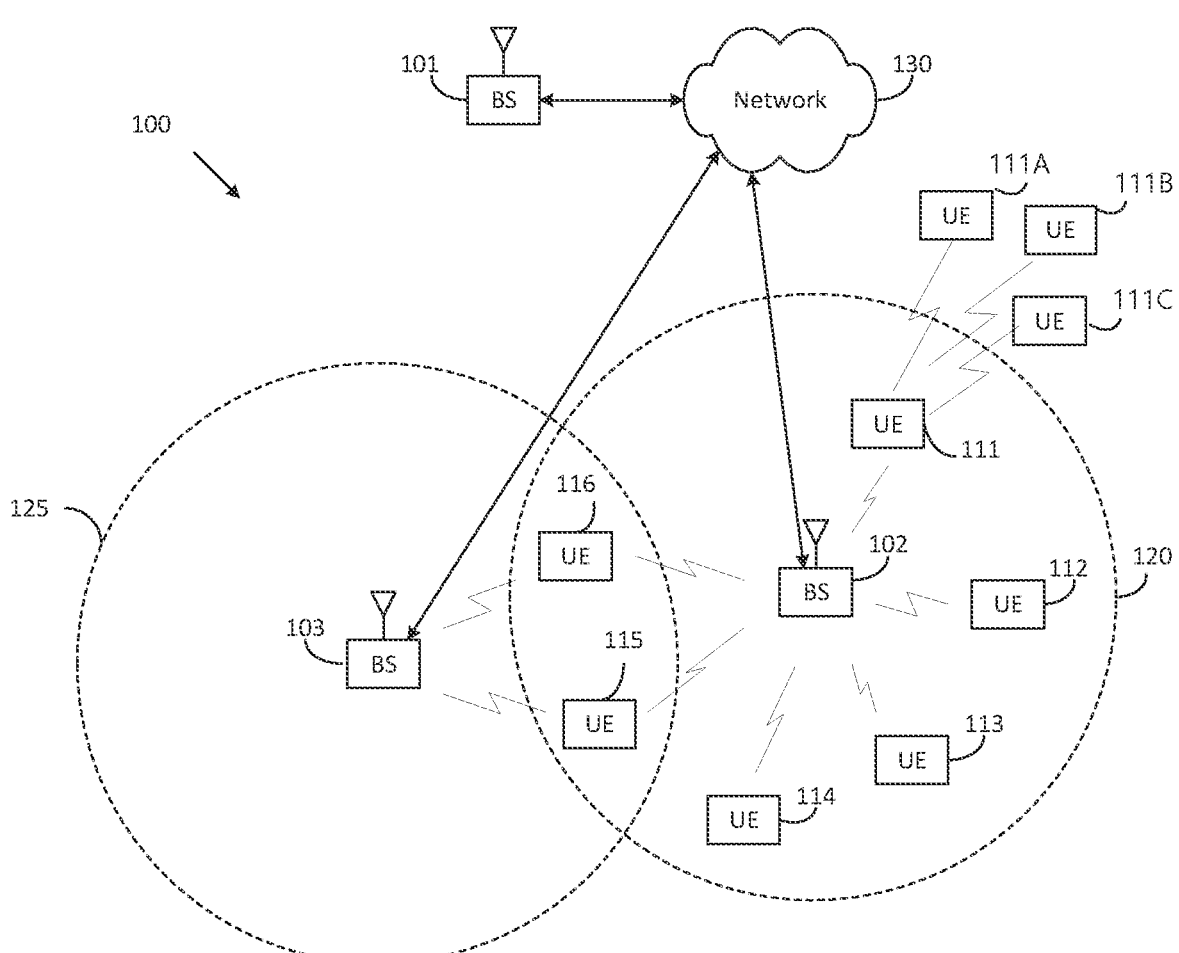
FIG. 1 illustrates an example wireless network according to embodiments of the present disclosure.
Figure 2:
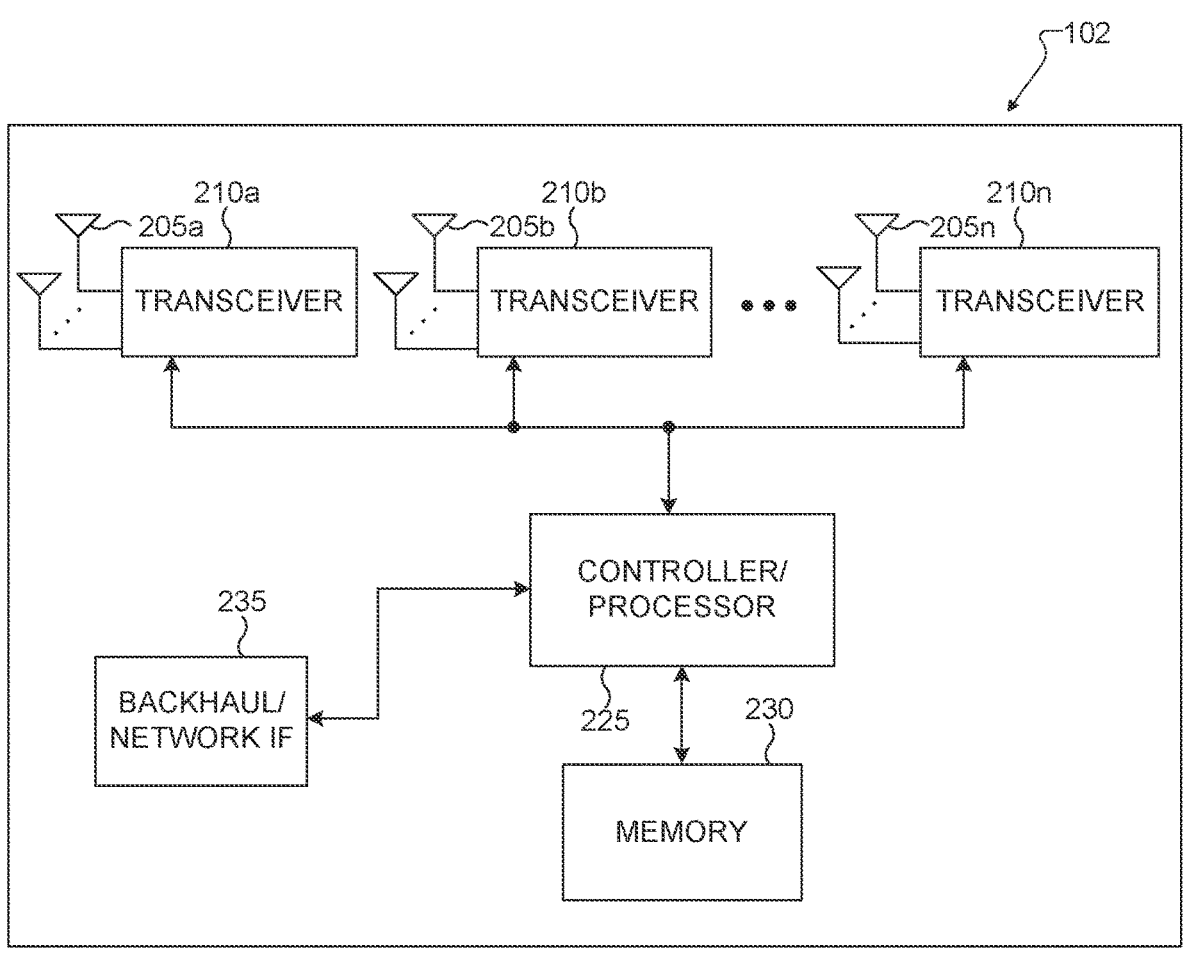
FIG. 2 illustrates an example gNodeB (gNB) according to embodiments of the present disclosure.
Figure 3:
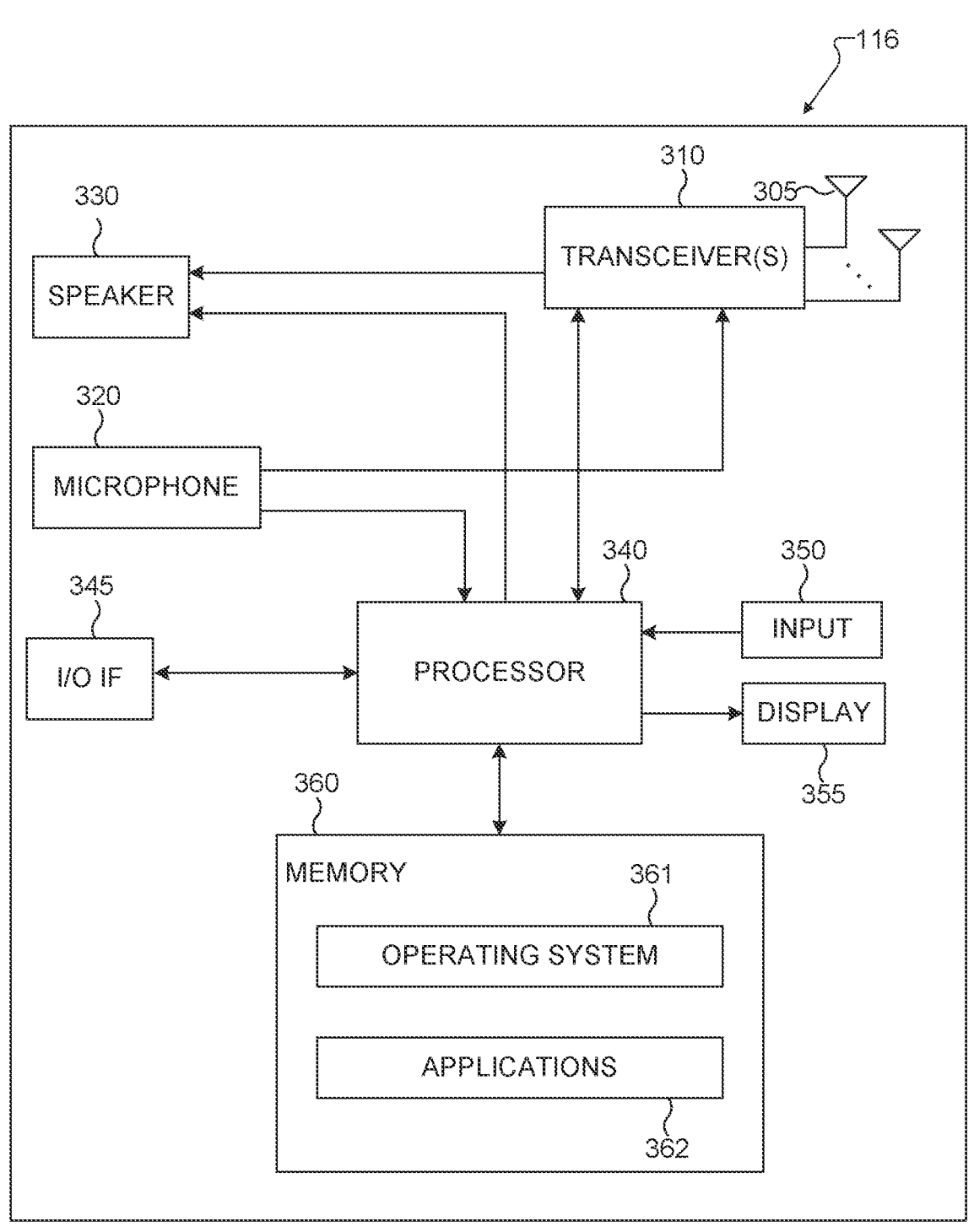
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to how different embodiments may be implemented. Different embodiments of the present disclosure may be implemented in any suitably arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

In another example, the UE 116 may be within network coverage and the other UE may be outside network coverage (e.g., UEs 111A-111C). In yet another example, both UEs are outside network coverage. In some embodiments, one or more of the gNBs 101-103 may communicate with each other and with the UEs 111-116 using 5G/NR, LTE, LTE-A, WiMAX, WiFi, or other wireless communication techniques. In some embodiments, the UEs 111-116 may use a device to device (D2D) interface called PC5 (e.g., also known as sidelink at the physical layer) for communication.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3 rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

The dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for utilizing SL initial beam acquisition. In certain embodiments, one or more of the UEs 111-116 also include circuitry, programing, or a combination thereof to support a SL initial beam acquisition.

Although FIG. 1 illustrates one example of a wireless network, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

As discussed in greater detail below, the wireless network 100 may have communications facilitated via one or more devices (e.g., UEs 111A to 111C) that may have a SL communication with the UE 111. The UE 111 can communicate directly with the UEs 111A to 111C through a set of SLs (e.g., SL interfaces) to provide sideline communication, for example, in situations where the UEs 111A to 111C are remotely located or otherwise in need of facilitation for network access connections (e.g., BS 102) beyond or in addition to traditional fronthaul and/or backhaul connections/interfaces. In one example, the UE 111 can have direct communication, through the SL communication, with UEs 111A to 111C with or without support by the BS 102. Various of the UEs (e.g., as depicted by UEs 112 to 116) may be capable of one or more communication with their other UEs (such as UEs 111A to 111C as for UE 111).

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming radio frequency (RF) signals, such as signals transmitted by UEs in the wireless network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of uplink (UL) channels and/or signals and the transmission of downlink (DL) channels and/or signals by the transceivers 210a-210n in accordance with well-known principles. The controller/processor 225 could support additional functions as well, such as more advanced wireless communication functions.

For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as to support sidelink (SL) initial beam acquisition. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. Additionally, where the term "UE" is used herein, the UE may be any of UE's 111-116 in FIG. 1 and this UE may have the same or similar configuration as described with and illustrated respect to UE 116 in FIG. 3. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna(s) 305, an incoming RF signal transmitted by a gNB of the wireless network 100 or by other UEs (e.g., one or more of UEs 111-115) on a SL channel. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channels and/or signals or SL channels and/or signals and the transmission of UL channels and/or signals or SL channels and/or signals by the transceiver(s) 310 in accordance with well-known principles. In some embodiments, the processor 340 includes at least one microprocessor or microcontroller.

The processor 340 is also capable of executing other processes and programs resident in the memory 360. For example, the processor 340 may execute processes for utilizing and supporting SL initial beam acquisition as described in embodiments of the present disclosure. The processor 340 can move data into or out of the memory 360 as required by an executing process. In some embodiments, the processor 340 is configured to execute the applications 362 based on the OS 361 or in response to signals received from gNBs or another SL UE or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes, for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4A:
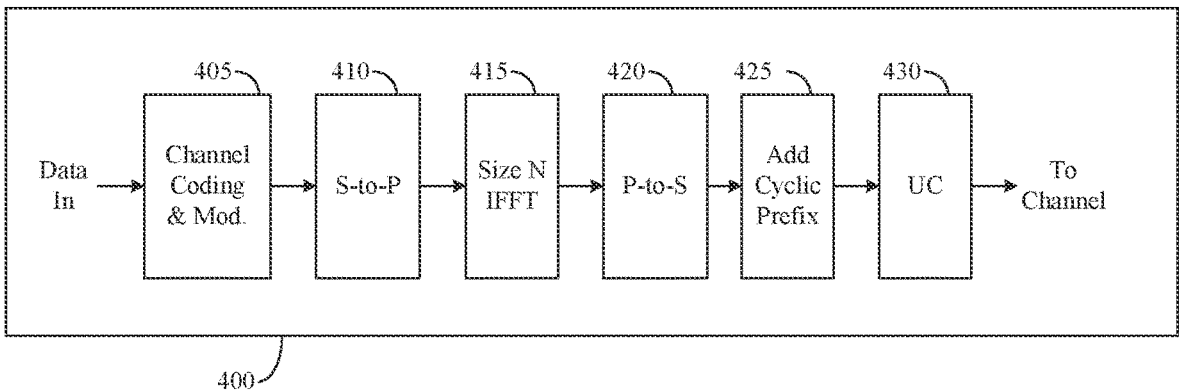
FIGS. 4A and 4B illustrate an example of a wireless transmit and receive paths according to embodiments of the present disclosure.
Figure 4B:
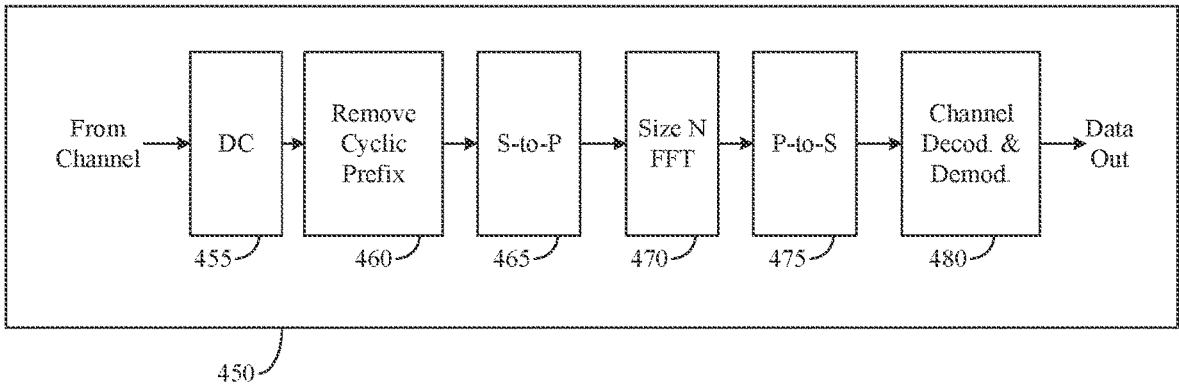

FIG. 4A and FIG. 4B illustrate an example of wireless transmit and receive paths 400 and 450, respectively, according to embodiments of the present disclosure. For example, a transmit path 400 may be described as being implemented in a gNB (such as gNB 102), while a receive path 450 may be described as being implemented in a UE (such as UE 116). However, it will be understood that the receive path 450 can be implemented in a gNB and that the transmit path 400 can be implemented in a UE. It may also be understood that the receive path 450 can be implemented in a first UE and that the transmit path 400 can be implemented in a second UE to support SL communications. In some embodiments, the transmit path 400 and the receive path 450 can be configured to support SL initial beam acquisition as described in embodiments of the present disclosure.

As illustrated in FIG. 4A, the transmit path 400 includes a channel coding and modulation block 205, a serial-to-parallel (S-to-P) block 410, a size N Inverse Fast Fourier Transform (IFFT) block 415, a parallel-to-serial (P-to-S) block 420, an add cyclic prefix block 425, and an up-converter (UC) 430. The receive path 250 includes a down-converter (DC) 455, a remove cyclic prefix block 460, a S-to-P block 465, a size N Fast Fourier Transform (FFT) block 470, a parallel-to-serial (P-to-S) block 475, and a channel decoding and demodulation block 480.

In the transmit path 400, the channel coding and modulation block 405 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE (e.g., UEs 111-116). The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to a RF frequency for transmission via a wireless channel. The signal may also be filtered at a baseband before conversion to the RF frequency.

As illustrated in FIG. 4B, the down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time-domain signals. The size N FFT block 470 performs an FFT algorithm to generate N parallel frequency-domain signals. The (P-to-S) block 475 converts the parallel frequency-domain signals to a sequence of modulated data symbols. The channel decoding and demodulation block 480 demodulates and decodes the modulated symbols to recover the original input data stream.

Each of the gNBs 101-103 may implement a transmit path 400 that is analogous to transmitting in the downlink to UEs 111-116 and may implement a receive path 450 that is analogous to receiving in the uplink from UEs 111-116. Similarly, each of UEs 111-116 may implement a transmit path 400 for transmitting in the uplink to gNBs 101-103, and/or for transmitting in the sidelink to another UE and may implement a receive path 450 for receiving in the downlink from gNBs 101-103 and/or for receiving in the sidelink for another UE.

Each of the components in FIGS. 4A and 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 4A and 4B illustrate examples of wireless transmit and receive paths 400 and 450, respectively, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

Figure 5A:
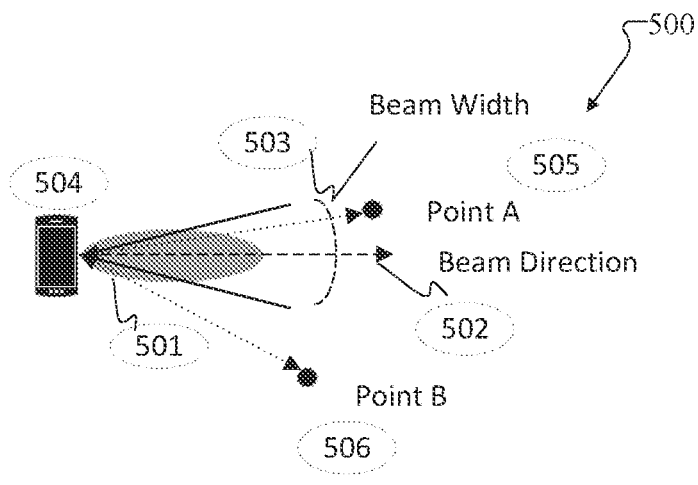
FIG. 5A illustrates an example of a wireless system according to embodiments of the present disclosure.

As illustrated in FIG. 5A, in a wireless system 500, a beam 501 for a device 504 can be characterized by a beam direction 502 and a beam width 503. For example, the device 504 (or UE) transmits RF energy in a beam direction and within a beam width. The device 504 receives RF energy in a beam direction and within a beam width. As illustrated in FIG. 5A, a device at point A 505 can receive from and transmit to device 504 as Point A is within a beam width and direction of a beam from device 504. As illustrated in FIG. 5A, a device at point B 506 cannot receive from and transmit to device 504 as Point B 506 is outside a beam width and direction of a beam from device 504. While FIG. 5A, for illustrative purposes, shows a beam in 2-dimensions (2D), it should be apparent to those skilled in the art, that a beam can be in 3-dimensions (3D), where the beam direction and beam width are defined in space.

Figure 5B:
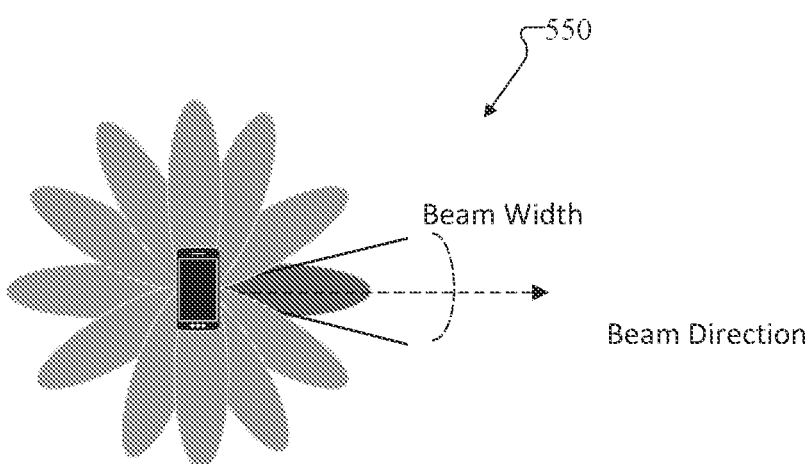
FIG. 5B illustrates an example of a multi-beam operation according to embodiments of the present disclosure.

FIG. 5B illustrates an example of a multi-beam operation 550 according to embodiments of the present disclosure. For example, the multi-beam operation 550 can be utilized by gNB 102 of FIG. 2. This example is for illustration only and other embodiments can be used without departing from the scope of the present disclosure.

In a wireless system, a device can transmit and/or receive on multiple beams. This is known as "multi-beam operation". While FIG. 5B, for illustrative purposes, a beam is in 2D, it should be apparent to those skilled in the art, that a beam can be 3D, where a beam can be transmitted to or received from any direction in space.

Figure 6:
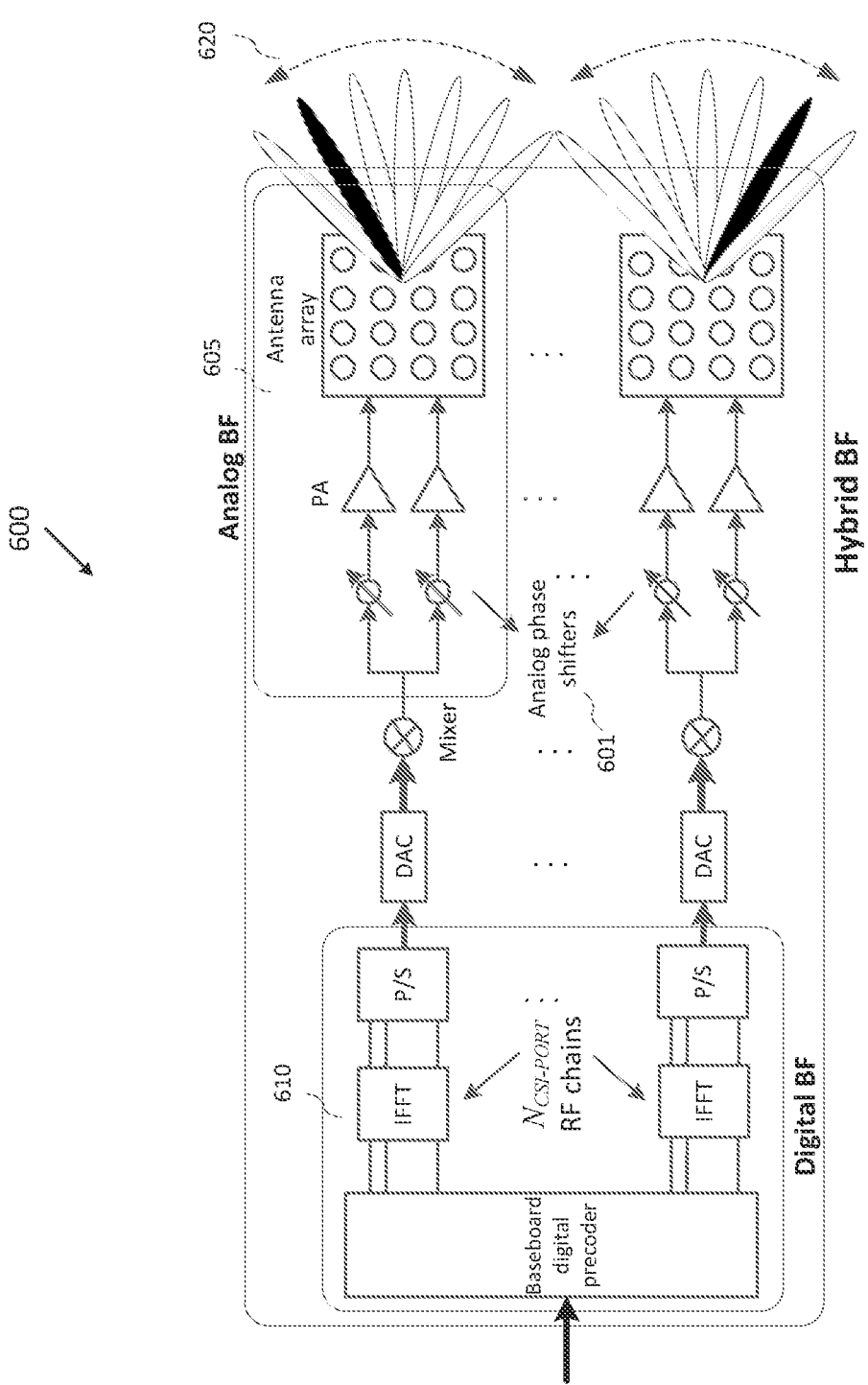
FIG. 6 illustrates an example of a transmitter structure for beamforming according to embodiments of the present disclosure.

FIG. 6 illustrates an example of a transmitter structure 600 for beamforming according to embodiments of the present disclosure. In certain embodiments, one or more of gNB 102 or UE includes the transmitter structure 600. For example, one or more of antenna 205 and its associated systems or antenna 305 and its associated systems can be included in transmitter structure 600. This example is for illustration only and other embodiments can be used without departing from the scope of the present disclosure.

Accordingly, embodiments of the present disclosure recognize that Rel-14 LTE and Rel-15 NR support up to 32 CSI-RS antenna ports which enable an eNB or a gNB to be equipped with a large number of antenna elements (such as 64 or 128). A plurality of antenna elements can then be mapped onto one CSI-RS port. For mmWave bands, although a number of antenna elements can be larger for a given form factor, a number of CSI-RS ports, that can correspond to the number of digitally precoded ports, can be limited due to hardware constraints (such as the feasibility to install a large number of analog-to-digital converters (ADCs)/digital-to-analog converters (DACs) at mmWave frequencies) as illustrated in FIG. 6. Then, one CSI-RS port can be mapped onto a large number of antenna elements that can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or slots/subframes. The number of sub-arrays (equal to the number of RF chains) is the same as the number of CSI-RS ports $N_{CSI-PORT}$. A digital beamforming unit 610 performs a linear combination across $N_{CSI-PORT}$ analog beams to further increase a precoding gain. While analog beams are wideband (hence not frequency-selective), digital precoding can be varied across frequency sub-bands or resource blocks. Receiver operation can be conceived analogously.

Since the transmitter structure 600 of FIG. 6 utilizes multiple analog beams for transmission and reception (wherein one or a small number of analog beams are selected out of a large number, for instance, after a training duration that is occasionally or periodically performed), the term "multi-beam operation" is used to refer to the overall system aspect. This includes, for the purpose of illustration, indicating the assigned DL or UL or SL TX beam (also termed "beam indication"), measuring at least one reference signal for calculating and performing beam reporting (also termed "beam measurement" and "beam reporting", respectively), and receiving a DL or UL or SL transmission via a selection of a corresponding RX beam. The system of FIG. 6 is also applicable to higher frequency bands such as >52.6 GHz. In this case, the system can employ only analog beams. Due to the O2 absorption loss around 60 GHz frequency HO dB additional loss per 100 m distance), a larger number and narrower analog beams (hence a larger number of radiators in the array) are needed to compensate for the additional path loss.

The text and figures are provided solely as examples to aid the reader in understanding the present disclosure. They are not intended and are not to be construed as limiting the scope of the present disclosure in any manner. Although certain embodiments and examples have been provided, it will be apparent to those skilled in the art based on the disclosures herein that changes in the embodiments and examples shown may be made without departing from the scope of the present disclosure. The transmitter structure 600 for beam-forming is for illustration only and other embodiments can be used without departing from the scope of the present disclosure.

Figure 7:
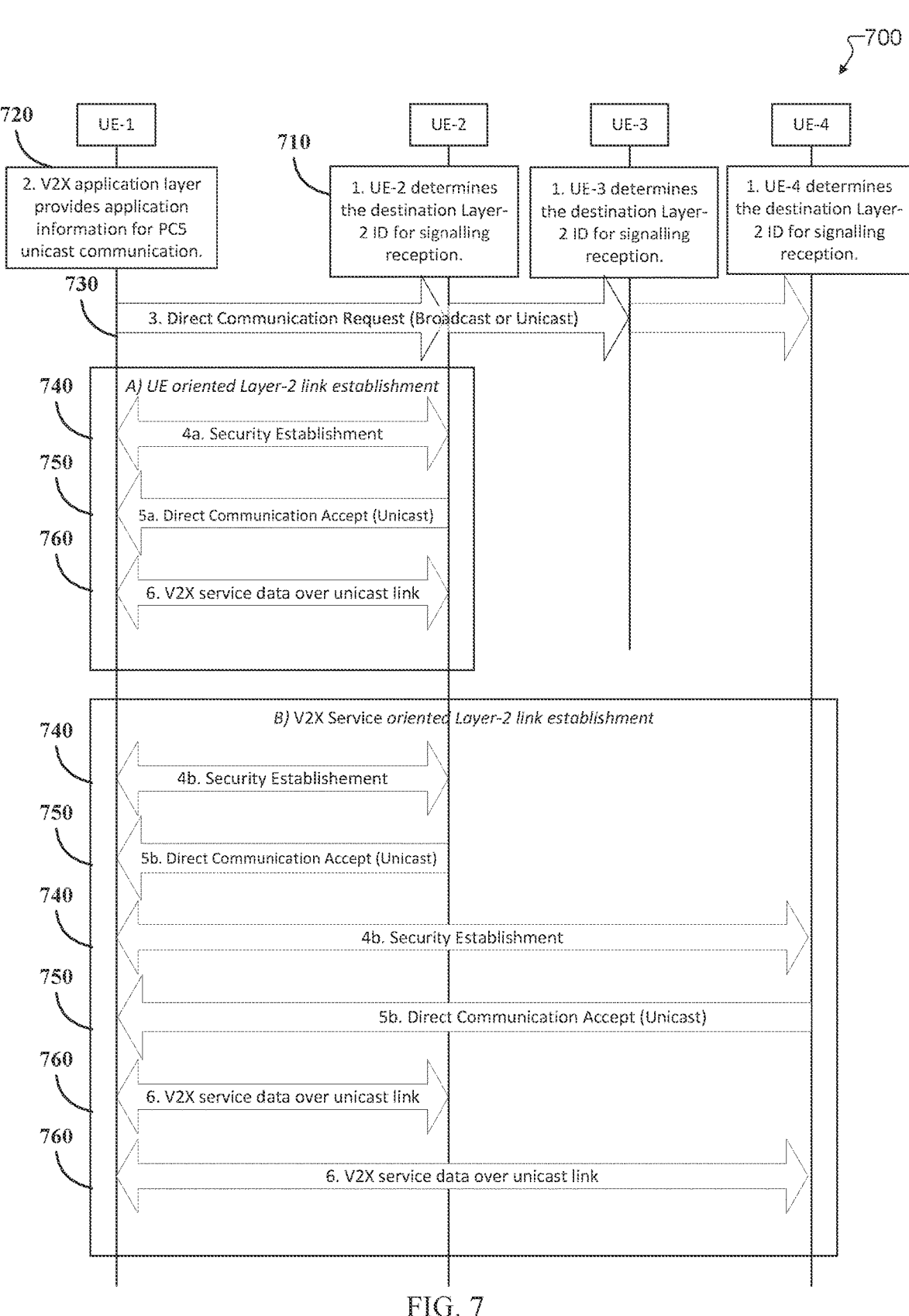
FIG. 7 illustrates a flowchart of an example process for a layer-2 link establishment for unicast mode of vehicle to everything (V2X) communication over protocol layer convergence for 5G new radio (PC5) reference point according to embodiments of the present disclosure.

FIG. 7 illustrates a flowchart of an example process 700 for a layer-2 link establishment for unicast mode of V2X communication over PC5 reference point according to embodiments of the present disclosure. For example, process 700 can be performed by multiple of the UEs 111-116 of FIG. 1 to perform SL communications. This example is for illustration only and other embodiments can be used without departing from the scope of the present disclosure.

Process 700 begins in step 710, the UE(s) determine the destination Layer-2 ID for signaling reception of PC5 unicast link establishment. This is determined as specified in clause 5.6.1.4 of TS 23.387. The destination Layer-2 ID is configured with the UE(s) as specified in clause 5.1.2.1 of TS 23.387. In step 720, the V2X application layer in UE-1 provides application information for PC5 unicast communicating. In step 730, UE-1 sends a Direct Communication Request (DCR) to initiate the unicast layer-2 link establishment procedure and sends the DCR message via PC5 broadcast or unicast using the source Layer-2 ID and destination Layer-2 ID. In step 740, the target UE, or the UEs that are interested in using the announced V2X service type(s) over a PC5 unicast link with UE-1, responds which establishes the security with UE-1. In step 750, the target UE(s) that has successfully established security with UE-1 sends a direct communication accept message to UE-1. In step 760, V2X service data is transmitted over the established unicast link.

A time unit for DL signaling, UL signaling, or SL signaling on a cell is one symbol. A symbol belongs to a slot that includes a number of symbols, such as 14 symbols. A slot can also be used as a time unit. A bandwidth (BW) unit is referred to as a resource block (RB). One RB includes a number of sub-carriers (SCs). For example, a slot can have a duration of one millisecond and an RB can have a bandwidth of 180 kHz and include 12 SCs with inter-SC spacing of 15 kHz. As another example, a slot can have a duration of 0.25 milliseconds and include 14 symbols and an RB can have a BW of 720 kHz and include 12 SCs with SC spacing of 60 kHz. A RB in one symbol of a slot is referred to as physical RB (PRB) and includes a number of resource elements (REs). A slot can be either full DL slot, or full UL slot, or hybrid slot, similar to a special subframe in time division duplex (TDD) systems (see also document and standard [1]). In addition, a slot can have symbols for SL communications. A UE can be configured with one or more bandwidth parts (BWPs) of a system BW for transmissions or receptions of signals or channels.

SL signals and channels are transmitted and received on sub-channels within a resource pool, where a resource pool is a set of time-frequency resources used for SL transmission and reception within a SL BWP. SL channels include physical SL shared channels (PSSCHs) conveying data information and second stage/part SL control information (SCI), physical SL control channels (PSCCHs) conveying first stage/part SCI for scheduling transmissions/receptions of PSSCHs, physical SL feedback channels (PSFCHs) conveying hybrid automatic repeat request acknowledgment (HARQ-ACK) information in response to correct (ACK value) or incorrect (NACK value) transport block receptions in respective PSSCHs, PSFCHs can also convey conflict information, and physical SL Broadcast channel (PSBCH) conveying system information to assist in SL synchronization. SL signals include demodulation reference signals (DM-RS) that are multiplexed in PSSCH or PSCCH transmissions to assist with data or SCI demodulation, channel state information reference signals (CSI-RS) for channel measurements, phase tracking reference signals (PT-RS) for tracking a carrier phase, and SL primary synchronization signals (S-PSS) and SL secondary synchronization signals (S-SSS) for SL synchronization. SCI can include two parts/ stages corresponding to two respective SCI formats where, for example, the first SCI format is multiplexed on a PSCCH, and the second SCI format is multiplexed along with SL data on a PSSCH that is transmitted in physical resources indicated by the first SCI format.

A SL channel can operate in different cast modes. In a unicast mode, a PSCCH/PSSCH conveys SL information from one UE to only one other UE. In a groupcast mode, a PSCCH/PSSCH conveys SL information from one UE to a group of UEs within a (pre-)configured set. In a broadcast mode, a PSCCH/PSSCH conveys SL information from one UE to all surrounding UEs. In NR release 16, there are two resource allocation modes for a PSCCH/PSSCH transmission. In resource allocation mode 1, a gNB schedules a UE on the SL and conveys scheduling information to the UE transmitting on the SL through a DCI format (e.g., DCI Format 3_0) transmitted from the gNB 102 on the DL. In resource allocation mode 2, a UE schedules a SL transmission. SL transmissions can operate within network coverage where each UE is within the communication range of a gNB, outside network coverage where all UEs have no communication with any gNB, or with partial network coverage, where only some UEs are within the communication range of a gNB.

In case of groupcast PSCCH/PSSCH transmission, a UE can be (pre-)configured by one of two options for reporting HARQ-ACK information by the UE.

In one option for HARQ-ACK reporting, a UE can attempt to decode a TB in a PSSCH reception if, for example, the UE detects a SCI format scheduling the TB reception through a corresponding PSSCH. If the UE fails to correctly decode the TB, the UE multiplexes a NACK in a PSFCH transmission. In this option, the UE does not transmit a PSFCH with an ACK when the UE correctly decodes the TB. When a UE that transmitted the PSSCH detects a NACK in a PSFCH reception, the UE can transmit another PSSCH with the TB (retransmission of the TB).

In another option for HARQ-ACK reporting, a UE can attempt to decode a TB if, for example, the UE detects a SCI format that schedules a corresponding PSSCH. If the UE correctly decodes the TB, the UE multiplexes an ACK in a PSFCH transmission; otherwise, if the UE does not correctly decode the TB, the UE multiplexes a NACK in a PSFCH transmission. When a UE that transmitted the PSSCH does not detect an ACK in a PSFCH reception, such as when the UE detects a NACK or does not detect a PSFCH reception, the UE can transmit another PSSCH with the TB.

A sidelink resource pool includes a set/pool of slots and a set/pool of RBs used for sidelink transmission and sidelink reception. A set of slots that belong to a sidelink resource pool can be denoted by $$\left\{ t_0'^{SL}, t_1'^{SL}, t_2'^{SL}, \ldots, t_{T_{MAX}'-1}'^{SL} \right\}$$

and can be configured, for example, at least using a bitmap. Where, $T_{MAX}'$ is the number of SL slots in a resource pool within 1024 frames. Within each slot $$t_y'^{SL}$$

of a sidelink resource pool, there are $N_{subCH}$ contiguous sub-channels in the frequency domain for sidelink transmission, where $N_{subCH}$ is provided by a higher-layer parameter. Subchannel m, where m is between 0 and $N_{subCH}-1$, is given by a set of $n_{subCHsize}$ contiguous PRBs, given by $n_{PRB} = n_{subCHstart} + m \cdot n_{subCHsize} + j$, where j=0, 1, $n_{subCHsize}-1$, $n_{subCHstart}$ and $n_{subCHsize}$ are provided by higher layer parameters.

For resource (re-)selection or re-evaluation in slot n, a UE can determine a set of available single-slot resources for transmission within a resource selection window [n+T_1, n+T_2], such that a single-slot resource for transmission, $R_{x,y}$ is defined as a set of $L_{subCH}$ contiguous subchannels x+i, where i=0, 1, . . . , $L_{subCH}-1$ in slot $$t_y^{SL}.$$

$T_1$ is determined by the UE such that, $$0 \le T_1 \le T_{proc,1}^{SL}, \text{where } T_{proc,1}^{SL}$$

is a PSSCH processing time for example as defined in document and standard [4]. $T_2$ is determined by the UE such that $T_{2min} \le T_2 \le$ Remaining Packet Delay Budget, as long as $T_{2min} <$ Remaining Packet Delay Budget, else $T_2$ is equal to the Remaining Packet Delay Budget. $T_{2min}$ is a configured by higher layers and depends on the priority of the SL transmission.

The slots of a SL resource pool are determined as follows.
1. Let a set of slots that may belong to a resource be denoted by $$\left\{ t_0^{SL}, t_1^{SL}, t_2^{SL}, \ldots, t_{T_{MAX}-1}^{SL} \right\},$$

where $$0 \le t_i^{SL} < 10240 \times 2^{\mu},$$

and $0 \le i < T_{max}$. $\mu$ is the sub-carrier spacing configuration. $\mu=0$ for a 15 kHz sub-carrier spacing. $\mu=1$ for a 30 kHz sub-carrier spacing. $\mu=2$ for a 60 kHz sub-carrier spacing. $\mu=3$ for a 120 kHz sub-carrier spacing. The slot index is relative to slot #0 of system frame number (SFN) #0 of the serving cell, or downlink frame number (DFN) #0. The set of slots includes all slots except:
   a. $N_{S-SSB}$ slots that are configured for SL SS/PBCH Block (S-SSB).
   b. $N_{nonSL}$ slots where at least one SL symbol is not semi-statically configured as UL symbol by higher layer parameter tdd-UL-DL-ConfigurationCommon or sl-TDD-Configurauion. In a SL slot, OFDM symbols Y-th, (Y+1)-th, (Y+X−1)-th are SL symbols, where Y is determined by the higher layer parameter sl-StartSymbol and X is determined by higher layer parameter sl-LengthSymbols.
   c. $N_{reserved}$ reserved slots. Reserved slots are determined such that the slots in the set $$\left\{ t_0^{SL}, t_1^{SL}, t_2^{SL}, \ldots, t_{T_{MAX}-1}^{SL} \right\}$$

is a multiple of the bitmap length ($L_{bitmap}$), where the bitmap ($b_0, b_1, \ldots, b_{L_{bitmap}-1}$) is configured by higher layers. The reserved slots are determined as follows:

i. Let $\{l_0, l_1, \ldots, l_{2^\mu \times 10240 - N_{S\text{-}SSB} N_{nonSL} - 1}\}$ be the set of slots in range $0 \ldots 2^\mu \times 10240 - 1$, excluding S-SSB slots and non-SL slots. The slots are arranged in ascending order of the slot index.

ii. The number of reserved slots is given by: $N_{reserved} = (2^\mu \times 10240 - N_{S\text{-}SSB} - N_{nonSL}) \bmod L_{bitmap}$.

iii. The reserved slots $l_r$ are given by:

$$r = \left\lfloor \frac{m \cdot \left(2^\mu \times 10240 - N_{S\text{-}SSB} - N_{nonSL}\right)}{N_{reserved}} \right\rfloor,$$

where $m = 0, 1, \ldots, N_{reserved} - 1$ $T_{max}$ is given by: $T_{max} = 2^\mu \times 10240 - N_{S\text{-}SSB} - N_{nonSL} - N_{reserved}$.

2. The slots are arranged in ascending order of slot index.

3. The set of slots belonging to the SL resource pool, $$\left\{ t_0'^{SL}, t_1'^{SL}, t_2'^{SL}, \ldots, t_{T'_{MAX} - 1}'^{SL} \right\},$$

are determined as follows:

a. Each resource pool has a corresponding bitmap $(b_0, b_1, \ldots, b_{L_{bitmap} - 1})$ of length $L_{bitmap}$ b. A slot $$t_k^{SL}$$

belongs to the SL resource pool if $b_{k \bmod L_{bitmap}} = 1$ c. The remaining slots are indexed successively staring from $0, 1, \ldots T'_{MAX} - 1$. Where, $T'_{MAX}$ is the number of remaining slots in the set.

Slots can be numbered (indexed) as physical slots or logical slots, wherein physical slots include all slots numbered sequentially, while logical slots include only slots that are allocated to a sidelink resource pool as described herein numbered sequentially. The conversion from a physical duration, $P_{rsvp}$, in milli-second to logical slots, $$P'_{rsvp},$$

is given by $$P'_{rsvp} = \left\lceil \frac{T'_{max}}{10240 \text{ ms}} \times P_{rsvp} \right\rceil$$

(see document and standard [4]).

For resource (re-)selection or re-evaluation in slot n, a UE can determine a set of available single-slot resources for transmission within a resource selection window $[n+T_1, n+T_2]$, such that a single-slot resource for transmission, $R_{x,y}$ is defined as a set of $L_{subCH}$ sub channel s $x+i$, where $i = 0, 1, \ldots, L_{subCH} - 1$ in slot $$t_y^{SL}.$$

$T_1$ is determined by the UE 116 such that, $0 \leq$ $$T_1 \leq T_{proc,1}^{SL}, \text{ where } T_{proc,1}^{SL}$$

is a PSSCH processing time for example as defined in document and standard [4]. $T_2$ is determined by the UE such that $T_{2min} \leq T_2 \leq$ Remaining Packet Delay Budget, as long as $T_{2min} <$ Remaining Packet Delay Budget, else $T_2$ is equal to the Remaining Packet Delay Budget. $T_{2min}$ is configured by higher layers and depends on the priority of the SL transmission.

The resource (re-)selection is a two-step procedure. The first step (e.g., performed in the physical layer) is to identify the candidate resources within a resource selection window. Candidate resources are resources that belong to a resource pool, but exclude resources (e.g., resource exclusion) that were previously reserved, or potentially reserved by other UEs. The resources excluded are based on SCIs decoded in a sensing window and for which the UE measures a SL RSRP that exceeds a threshold. The threshold depends on the priority indicated in a SCI format and on the priority of the SL transmission. Therefore, sensing within a sensing window involves decoding the first stage SCI and measuring the corresponding SL RSRP, wherein the SL RSRP can be based on PSCCH DMRS or PSSCH DMRS. Sensing is performed over slots where the UE doesn't transmit SL. The resources excluded are based on reserved transmissions or semi-persistent transmissions that can collide with the excluded resources or any reserved or semi-persistent transmissions. The identified candidate resources after resource exclusion are provided to higher layers.

The second step (e.g., performed in the higher layers) is to select or re-select a resource from the identified candidate resources for PSSCH/PSCCH transmission.

During the first step of the resource (re-)selection procedure, a UE can monitor slots in a sensing window $$\left[ n - T_0, n - T_{proc,0}^{SL} \right),$$

where the UE monitors slots belonging to a corresponding sidelink resource pool that is not used for the UE's transmission. For example, $$T_{proc,0}^{SL}$$

is the sensing processing latency time as defined in document and standard [4]. To determine a candidate single-slot resource set to report to higher layers, a UE excludes, (e.g., resource exclusion) from the set of available single-slot resources for SL transmission within a resource pool and within a resource selection window, the following:

1. Single slot resource $R_{x,y}$, such that for any slot $$t_m'^{SL}$$

not monitored within the sensing window with a hypothetical received SCI Format 1-0, with a "Resource reservation period" set to any periodicity value allowed by a higher layer parameter reseverationPeriodAllowed, and indicating all sub-channels of the resource pool in this slot, satisfies the condition herein.

2. Single slot resource $R_{x,y}$, such that for any received SCI within the sensing window:

a. The associated L1-RSRP measurement is above a (pre-)configured SL-RSRP threshold, where the SL-RSRP threshold depends on the priority indicated in the received SCI and that of the SL transmission for which resources are being selected.

b. The received SCI in slot $$t_m^{'SL},$$

or if "Resource reservation field" is present in the received SCI the same SCI is assumed to be received in slot $$t_{m+q \times P'_{rsvp\_Rx}}^{'SL},$$

indicates a set of resource blocks that overlaps $$R_{x,y+j \times P'_{rsvp\_Tx}}.$$

Where, i. q=1, 2, . . . , Q, where, ii. If $P_{rsvp\_RX} \leq T_{scal}$ and $$n' - m < P'_{rsvp\_Rx} \rightarrow$$

$$Q = \left\lceil \frac{T_{scal}}{P_{rsvp\_RX}} \right\rceil \cdot T_{scal}$$

is $T_2$ in units of milli-seconds.

Else Q=1

If n belongs to $$\left( t_0^{'SL}, t_1^{'SL}, \ldots , t_{T'_{max}-1}^{'SL} \right),$$

n'=n, else n' is the first slot after slot n belonging to set $$\left( t_0^{'SL}, t_1^{'SL}, \ldots , t_{T'_{max}-1}^{'SL} \right).$$

iii. j=0,1, . . . , $C_{resel}$−1 iv. $P_{rsvp\_RX}$ is the indicated resource reservation period in the received SCI in physical slots, and $$P'_{rsvp\_Rx}$$

is that value converted to logical slots.

18 v.

$$P'_{rsvp\_Tx}$$

is the resource reservation period of the SL transmissions for which resources are being reserved in logical slots.

3. If the candidate resources are less than a (pre-)configured percentage given by higher layer parameter sl TxPrecentageList(prio Tx) that depends on the priority of the SL transmission prio Tx, such as 20% of the total available resources within the resource selection window, the (pre-)configured SL-RSRP thresholds are increased by a predetermined amount, such as 3 dB.

NR sidelink introduced two new procedures for mode 2 resource allocation; re-evaluation and pre-emption.

Re-evaluation check occurs when a UE checks the availability of pre-selected SL resources before the resources are first signaled in an SCI Format, and if needed re-selects new SL resources. For a pre-selected resource to be first-time signaled in slot m, the UE performs a re-evaluation check at least in slot m-$T_3$. The re-evaluation check includes:

1. Performing the first step of the SL resource selection procedure as defined in the 3GPP specifications (i.e., document and standard [4]), which involves identifying a candidate (available) sidelink resource set in a resource selection window as described herein.

2. If the pre-selected resource is available in the candidate sidelink resource set, the resource is used/signaled for sidelink transmission.

3. Else, the pre-selected resource is not available in the candidate sidelink resource set, a new sidelink resource is re-selected from the candidate sidelink resource set.

Pre-emption check occurs when a UE checks the availability of pre-selected SL resources that have been previously signaled and reserved in an SCI Format, and if needed re-selects new SL resources. For a pre-selected and reserved resource to be signaled in slot m, the UE performs a pre-emption check at least in slot m-$T_3$. When pre-emption check is enabled by higher layers, pre-emption check includes:

(a) Performing the first step of the SL resource selection procedure as defined in the 3GPP specifications (i.e., document and standard [4]), which involves identifying candidate (available) sidelink resource set in a resource selection window as described herein.

(b) If the pre-selected and reserved resource is available in the candidate sidelink resource set, the resource is used/signaled for sidelink transmission.

(c) Else, the pre-selected and reserved resource is NOT available in the candidate sidelink resource set. The resource is excluded from the candidate resource set due to an SCI, associated with a priority value $P_{RX}$, having an RSRP exceeding a threshold. Let the priority value of the sidelink resource that is checked for pre-emption be $P_{TX}$.

(d) If the priority value $P_{RX}$ is less than a higher-layer configured threshold and the priority value $P_{RX}$ is less than the priority value $P_{TX}$. The pre-selected and reserved sidelink resource is pre-empted. A new sidelink resource is re-selected from the candidate sidelink resource set. Note that, a lower priority value indicates traffic of higher priority.

(e) Else, the resource is used/signaled for sidelink transmission.

As described herein, the monitoring procedure for resource (re)selection during the sensing window requires reception and decoding of a SCI format during the sensing window as well as measuring the SL RSRP. This reception and decoding process and measuring the SL RSRP increases a processing complexity and power consumption of a UE for sidelink communication and calls for the UE to have receive circuitry on the SL for sensing even if the UE only transmits and does not receive on the sidelink. The sensing procedure is referred to as full sensing.

3GPP Release 16 is the first NR release to include sidelink through work item "5G V2X with NR sidelink", the mechanisms introduced focused on V2X, and can be used for public safety when the service requirement can be met. Release 17 extends sidelink support to more use cases through the work item "NR Sidelink enhancement" (RP-201385). The objectives of Rel-17 SL include resource allocation enhancements that reduce power consumption, and enhanced reliability and reduced latency.

Rel-17 introduced low-power resource allocation. Low-power resource allocation schemes include partial sensing and random resource selection. If a SL transmission from a UE is periodic, partial sensing can be based on periodic-based partial sensing (PBPS), and/or contiguous partial sensing (CPS). If a SL transmission from a UE is aperiodic, partial sensing can be based on CPS and PBPS if the resource pool supports periodic reservations (i.e., sl_multi-ReserveResource is enabled). When a UE performs PBPS, the UE selects a set of Y slots ($Y \geq Y_{min}$) within a resource selection window corresponding to PBPS, where Y min is provided by higher layer parameter minNumCandidateSlotsPeriodic. The UE monitors slots at $$t'^{SL}_{y-k \times P_{reserve}}, \text{ where } t'^{SL}_y$$

is a slot of the Y selected candidate slots. The periodicity value for sensing for PBPS, i.e., $P_{reserve}$ is a subset of the resource reservation periods allowed in a resource pool provided by higher layer parameter sl-ResourceReservePeriodList. $P_{reserve}$ is provided by higher layer parameter periodicSensingOccasionReservePeriodList. If $P_{reserve}$ is not configured, $P_{reserve}$ includes all periodicities in sl-ResourceReservePeriodList. The UE monitors k sensing occasions determined by additionalPeriodicSensingOccasion, as described herein, and not earlier than $n-T_0$. For a given periodicity $P_{reserve}$, the values of k correspond to the most recent sensing occasion earlier than $$t'^{SL}_{y0} - (T^{SL}_{proc,0} + T^{SL}_{proc,1})$$

if additionalPeriodicSensingOccasion is not (pre-)configured, and additionally includes the value of k corresponding to the last periodic sensing occasion prior to the most recent one if additionalPeriodicSensingOccasion is (pre-)configured.

$$t'^{SL}_{y0}$$

is the first slot of the selected Y candidate slots of PBPS. When a UE performs CPS, the UE 116 selects a set of Y' slots ($Y' \geq Y'_{min}$) within a resource selection window corresponding to CPS, where $Y'_{min}$ is provided by higher layer parameter minNumCandidateSlotsA-periodic. The sensing window for CPS starts at least M logical slots before $$t'^{SL}_{y0}$$

(the first of the Y' candidate slots) and ends at $$t'^{SL}_{y0} - (T^{SL}_{proc,0} + T^{SL}_{proc,1}).$$

According to embodiments of the present disclosure, without the loss of any generality, UE-A is the UE 116 initiating the unicast session. i.e., UE-A is the UE that transmits the direct communication request (DCR) for link establishment (also referred to as link establishment message) to UE-B. The roles of UE-A and UE-B can be reversed.

Embodiments of the present disclosure recognize that Rel-17 introduced inter-UE co-ordination (IUC) to enhance the reliability and reduce the latency for resource allocation, where SL UEs exchange information with one another over sidelink to aid the resource allocation mode 2 (re-)selection procedure. UE-A provides information to UE-B, and UE-B uses the provided information for its resource allocation mode 2 (re-)selection procedure. IUC is designed to address issues with distributed resource allocation such as: (1) Hidden node problem, where a UE-B is transmitting to a UE-A and UE-B can't sense or detect transmissions from a UE-C that interfere with its transmission to a UE-A, (2) Exposed node problem, where a UE-B is transmitting to a UE-A, and UE-B senses or detects transmissions from a UE-C and avoids the resources used or reserved by UE-C, but UE-C doesn't cause interference at UE-A, (3) Persistent collision problem, and (4) Half-duplex problem, where UE-B is transmitting to a UE-A in the same slot that UE-A is transmitting in, UE-A will miss the transmission from UE-B as UE-A cannot receive and transmit in the same slot. There are two schemes for inter-UE co-ordination.

In one example, in scheme 1, a UE-A can provide to another UE-B indications of resources that are preferred to be included in UE-B's (re-)selected resources, or non-preferred resources to be excluded for UE-B's (re-)selected resources. When given preferred resources, UE-B may use only those resources for its resource (re-)selection, or UE-B may combine them with resources identified by its own sensing procedure, e.g., by finding the intersection of the two sets of resources, for its resource (re-)selection. When given non-preferred resources, UE-B may exclude these resources from resources identified by its own sensing procedure for its resource (re-)selection. Transmissions of co-ordination information (e.g., IUC messages) sent by UE-A to UE-B, and co-ordination information requests (e.g., IUC requests) sent by UE-B to UE-A, are sent in a MAC-CE message and may also, if supported by the UEs, be sent in a 2nd-stage SCI Format (SCI Format 2-C). The benefit of using the 2nd stage SCI is to reduce latency. IUC messages from UE-A to UE-B can be sent standalone or can be combined with other SL data. Coordination information (IUC messages) can be in response to a request from UE-B, or due to a condition at UE-A. An IUC request is unicast from UE-B to UE-A, in response UE-A sends an IUC message in unicast mode to UE-B. An IUC message transmitted as a result of an internal condition at UE-A can be unicast to UE-B, when the IUC message includes preferred resources or can be unicast, groupcast, or broadcast to UE-B when the IUC message includes non-preferred resources. UE-A can determine preferred or non-preferred resources for UE-B based on its own sensing taking into account the SL-RSRP measurement of the sensed data and the priority of the sensed data, i.e., the priority field of the decoded PSCCH during sensing as well as the priority the traffic transmitted by UE-B in case of request-based IUC or a configured priority in case of condition-based IUC. Non-preferred resources to UE-B can also be determined to avoid the half-duplex problem, where UE-A can't receive data from a UE-B in the same slot UE-A is transmitting.

In another example, a UE-A can provide another UE-B an indication that resources reserved for UE-B's transmission, whether or not UE-A is the destination UE of these resources, are subject to conflict with a transmission from another UE. UE-A determines the conflicting resources based on the priority and RSRP of the transmissions involved in the conflict. UE-A can also determine a presence of a conflict due to the half-duplex problem, where UE-A can't receive a reserved resource from UE-B at the same time UE-A is transmitting. When UE-B receives a conflict indication for a reserved resource, UE-B can re-select new resources to replace them.

The conflict information from UE-A is sent in a PSFCH channel separately (pre-) configured from the PSFCH of the SL-HARQ operation. The timing of the PSFCH channel carrying conflict information can be based on the SCI indicating reserved resource or based on the reserved resource.

In both schemes, UE-A can identify resources according to a number of conditions which are based on the SL-RSRP of the resources in question as a function of the traffic priority, and/or whether UE-A would be unable to receive a transmission from UE-B, due to performing its own transmission, i.e., a half-duplex problem. The purpose of this exchange of information is to give UE-B information about resource occupancy acquired by UE-A which UE-B might not be able to determine on its own due to hidden nodes, exposed nodes, persistent collisions, etc.

Embodiments of the present disclosure recognize that Rel 18 evaluates further evolution of the NR SL air interface for operation in unlicensed bands, beam-based operation in FR2, SL carrier aggregation, and co-channel co-existence between LTE SL and NR SL.

On the (Uu) interface a beam is determined by either a TCI state, that establishes a quasi-colocation (QCL) relationship or spatial relation between a source reference signal (e.g., SSB and/or CSI-RS) and a target reference signal or a spatial relation information that establishes an association to a source reference signal, such as SSB, CSI-RS, or SRS. In either case, the ID of the source reference signal identifies the beam.

Terminology such as TCI, TCI states, SpatialRelationInfo, target RS, reference RS, and other terms is used for illustrative purposes and is therefore not normative. Other terms that refer to same functions can also be used.

Embodiments of the present disclosure recognize that Rel-17 introduced the unified TCI framework, where a unified or master or main or indicated TCI state is signaled or indicated to the UE. The unified, master, main, or indicated TCI state can be one of:

1. In case of joint TCI state indication, wherein a same beam is used for DL and UL channels, a joint TCI state can be used at least for UE-dedicated DL channels and UE-dedicated UL channels.

2. In case of separate TCI state indication, wherein different beams are used for DL and UL channels, a DL TCI state can be used at least for UE-dedicated DL channels.

3. In case of separate TCI state indication, wherein different beams are used for DL and UL channels, a UL TCI state can be used at least for UE-dedicated UL channels.

The unified (master or main or indicated) TCI state is a DL or a Joint TCI state of UE-dedicated reception on physical downlink shared channel (PDSCH)/physical downlink control channel (PDCCH) and the CSI-RS applying the indicated TCI state and/or an UL or a Joint TCI state for dynamic-grant/configured-grant is based on PUSCH, PUCCH, and SRS applying the indicated TCI state.

The unified TCI framework applies to intra-cell beam management, wherein, the TCI states have a source RS that is directly or indirectly associated through a quasi-co-location relation, e.g., spatial relation, with an SSB of a serving cell (e.g., the TCI state is associated with a TRP of a serving cell). The unified TCI state framework also applies to inter-cell beam management, wherein a TCI state can have a source RS that is directly or indirectly associated, through a quasi-co-location relation, e.g., spatial relation, with an SSB of cell that has a physical cell identity (PCI) that is different from the PCI of the serving cell (e.g., the TCI state is associated with a TRP of a cell having a PCI different from the PCI of the serving cell). In Rel-17, UE-dedicated channels can be received and/or transmitted using a TCI state associated with a cell having a PCI different from the PCI of the serving cell. While the common channels can be received and/or transmitted using a TCI state associated with the serving cell (e.g., not associated with a cell having a PCI different from the PCI of the serving cell), common channels can include:

a) Channels carrying system information (e.g., system information block 1 (SIB1)) with a DL assignment carried by a DCI in PDCCH having a CRC scrambled by SI-RNTI and transmitted in Type0-PDCCH common search space (CSS) set.

b) Channels carrying other system information with a DL assignment carried by a DCI in PDCCH having a CRC scrambled by SI-RNTI and transmitted in Type0A-PDCCH CSS set.

c) Channels carrying paging or short messages with a DL assignment carried by a DCI in PDCCH having a CRC scrambled by P-RNTI and transmitted in Type2-PDCCH CSS set.

d) Channels carrying random access channel (RACH) related channels with a DL assignment or UL grant carried by a DCI in PDCCH having a CRC scrambled by random access radio network temporary identifier (RA-RNTI) or temporary C (TC)-RNTI and transmitted in Type1-PDCCH CSS set.

A DL-related DCI Format (e.g., DCI Format 1_1 or DCI Format 1_2), with or without DL assignment, can indicate to a UE through a field "transmission configuration indication" a TCI state code point, wherein, the TCI state codepoint can be one of a DL TCI state, an UL TCI state, a joint TCI state, or a pair of DL TCI state and UL TCI state. Medium access control (MAC) control element (CE) signaling activates TCI state code points.

A QCL relation can be quasi-location with respect to one or more of the following relations (document and standard [4]):

a) Type A, {Doppler shift, Doppler spread, average delay, delay spread} b) Type B, {Doppler shift, Doppler spread} c) Type C, {Doppler shift, average delay} d) Type D, {Spatial Rx parameter}

Additionally, QCL relation can also provide a spatial relation for UL channels, e.g., a DL source reference signal provides information on the spatial domain filter to be used for UL transmissions, or the UL source reference signal provides the spatial domain filter to be used for UL transmissions, e.g., same spatial domain filter for UL source reference signal and UL transmissions.

The unified (master or main or indicated) TCI state applies at least to UE dedicated DL and UL channels. The unified (master or main or indicated) TCI can also apply to other DL and/or UL channels and/or signals e.g., non-UE dedicated channel and sounding reference signal (SRS).

A "reference RS" corresponds to a set of characteristics of a DL beam or an UL TX beam, such as a direction, a precoding/beamforming, a number of ports, and so on.

On an Uu interface, a TCI state can be used for beam indication. It can refer to a DL TCI state for downlink channels (e.g., PDCCH and PDSCH), an uplink TCI state for uplink channels (e.g., PDSCH or PUCCH), a joint TCI state for downlink and uplink channels, or separate TCI states for uplink and downlink channels. A TCI state can be common across multiple component carriers or can be a separate TCI state for a component carrier or a set of component carriers. A TCI state can be gNB or UE panel specific or common across panels. In some examples, the uplink TCI state can be replaced by SRS resource indicator (SRI).

Figure 8:
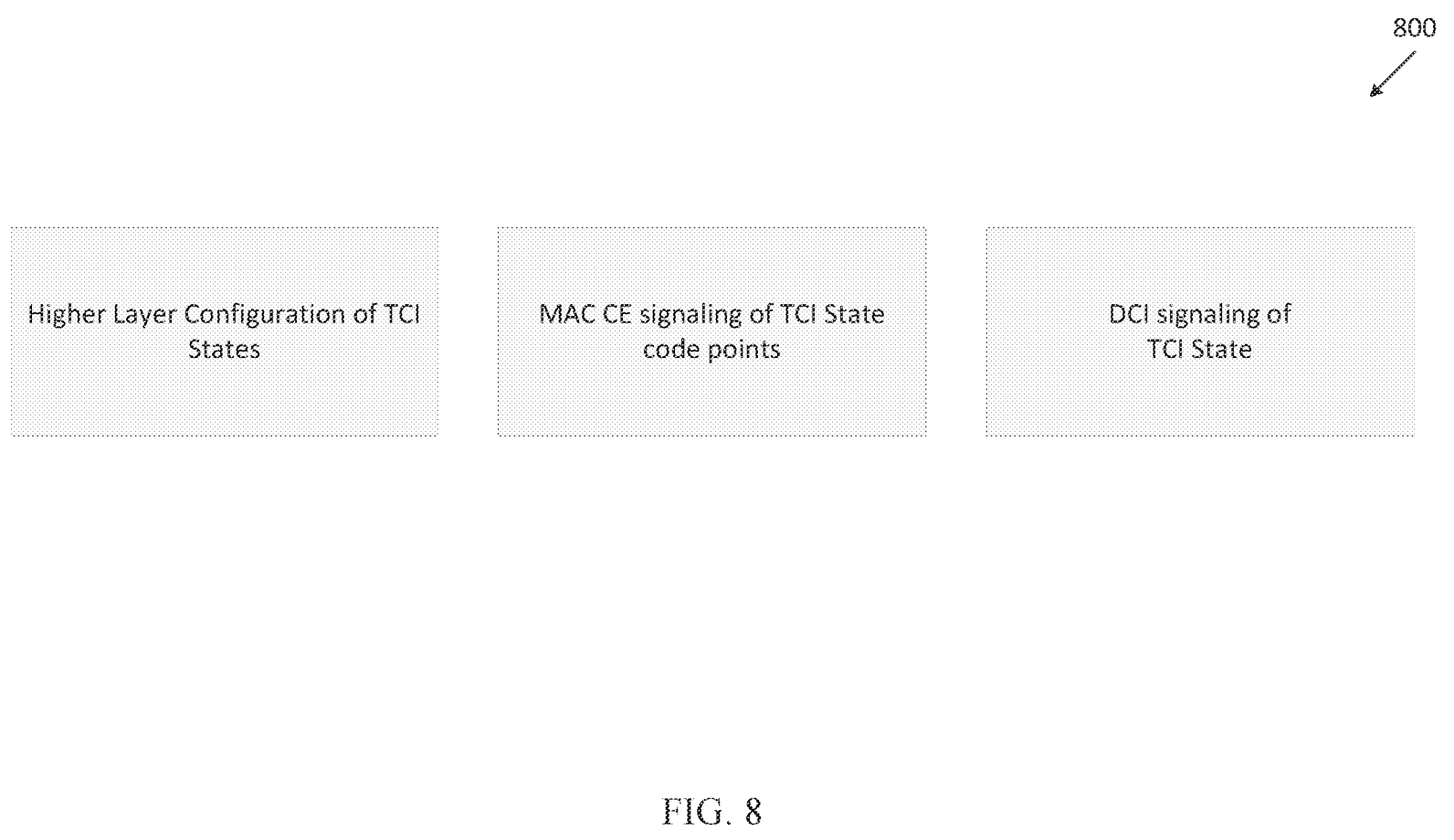

FIG. 8 illustrates examples of TCI signaling 800 according to embodiments of the present disclosure. For example, signaling 800 can be initiated by BS 102 in FIG. 2 and received by a UE (e.g., UEs 111-116 of FIG. 1) and, in particular, transceiver 310. This example is for illustration only and other embodiments can be used without departing from the scope of the present disclosure.

A UE can be configured/updated through higher layer RRC signaling a set of TCI States with N elements. In one example, DL and joint TCI states are configured by higher layer parameter DLorJoint-TCIState, wherein, the number of DL and Joint TCI state is $N_{D,J}$. UL TCI state are configured by higher layer parameter UL-TCIState, wherein the number of UL TCI state is $N_U$. $N=N_{D,J}+N_U$, where N is the total number of configured TCI states. The DLorJoint-TCIState can include DL or Joint TCI states that belong to a serving cell, e.g., the source RS of the TCI state is associated with the serving cell (the PCI of the serving cell). Additionally, the DL or Joint TCI states can be associated with a cell having a PCI different from the PCI of the serving cell, e.g., the source RS of the TCI state is associated with a cell having a PCI different from the PCI of the serving cell. The UL-TCIState can include UL TCI states that belong to a serving cell, e.g., the source RS of the TCI state is associated with the serving cell (the PCI of the serving cell). Additionally, the UL TCI states can be associated with a cell having a PCI different from the PCI of the serving cell, e.g., the source RS of the TCI state is associated with a cell having a PCI different from the PCI of the serving cell.

MAC CE signaling includes activating a subset of M (M≤N) TCI states or TCI state code points from the set of N TCI states, wherein a code point is signaled in the "transmission configuration indication" field a DCI used for indication of the TCI state. A codepoint can include one TCI state (e.g., DL TCI state, UL TCI state, or Joint (DL and UL) TCI state). Alternatively, a codepoint can include two TCI states (e.g., a DL TCI state and an UL TCI state). L1 control signaling (i.e., Downlink Control Information (DCI)) updates the UE's TCI state, wherein the DCI includes a "transmission configuration indication" (beam indication) field e.g., with m bits (such that $M \le 2^m$), the TCI state corresponds to a code point signaled by MAC CE. A DCI used for indication of the TCI state can be DL related DCI Format (e.g., DCI Format 1_1 or DCI Format 1_2), with a DL assignment or without a DL assignment.

Embodiments of the present disclosure describe an initial beam acquisition for SL in FR2 during a DCR (e.g., during link establishment). A first UE, for example, UE-A, wants to establish a unicast link with a second UE, for example, UE-B. UE-A sends a DCR (e.g., link establishment message) to UE-B. The communication request is transmitted from UE-A on multiple UE-A SL transmission beams (for example transmit beam sweeping). UE-B receives the communication request and responds indicating a UE-A SL transmit beam for subsequent communication. This disclosure evaluates aspects related to a transmission of DCR from UE-A on multiple UE-A SL transmit beams, a reception procedure of the DCR at UE-B, and signaling of a beam (e.g., a UE-A SL transmit beam that is preferred by UE-B) for subsequent communication.

Embodiments of the present disclosure recognize that Release 18 evaluates further evolution of the NR SL air interface for operation in unlicensed bands, beam-based operation in FR2, SL carrier aggregation, and co-channel co-existence between LTE SL and NR SL. One of the key features of NR is its ability to support beam-based operation. This is especially important for operation in FR2 which suffers a higher propagation loss. In Rel-16 and Rel-17 the main focus of developing SL was FR1. Indeed, the frequency bands supported for SL in Rel-16 and Rel-17 are all sub-6 GHz frequencies (bands n14, n38, n47, and n79). One of the objectives of Rel-18 is to expand SL to FR2, while SL supports SL phase tracking reference signal (PTRS), an important feature to support operation in FR2, i.e., beam management is missing. In this disclosure, we evaluate aspects related to initial beam acquisition: (1) Transmission of DCR (e.g., link establishment message) from UE-A on multiple UE-A SL transmit beams (for example transmit beam sweeping). (2) Reception procedure of the DCR at UE-B. (3) Signaling of a beam (e.g., a UE-A SL transmit beam that is preferred by UE-B for subsequent communication.

Aspects, features, and advantages of embodiments of the present disclosure are readily apparent from the following detailed description simply by illustrating a number of particular embodiments and implementations including the best mode. Embodiments of the present disclosure are also capable of other and different embodiments, and its several details can be modified in various obvious respects, all without departing from the spirit and scope of the present disclosure. Accordingly, the drawings and description are to be regarded as illustrative in nature, and not as restrictive. Embodiments of the present disclosure are illustrated by way of example, and not by way of limitation, in the figures of the accompanying drawings.

The text and figures are provided solely as examples to aid the reader in understanding the embodiments of the present disclosure. They are not intended and are not to be construed as limiting the scope of the embodiments of the present disclosure in any manner. Although certain embodiments and examples have been provided, it will be apparent to those skilled in the art based on the disclosures herein that changes in the embodiments and examples shown may be made without departing from the scope of this disclosure.

The flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

In SL, "reference RS" can correspond to a set of characteristics for SL beam, such as a direction, a precoding/beamforming, a number of ports, and so on. This can correspond to a SL receive beam or to a SL transmit beam. At least two UEs are involved in a SL communication. We refer to a first UE as UE-A and to second UE as UE-B. In one example, UE-A is transmitting SL data on PSSCH/PSCCH, and UE-B is receiving the SL data on PSSCH/PSCCH.

For mmWave bands (or FR2) or for higher frequency bands (such as >52.6 GHz) where multi-beam operation is especially relevant, a transmission-reception process includes a receiver in a second UE (e.g., UE-B) selecting a receive (RX) beam for a given TX beam from a first UE (e.g., UE-A). During the initiation of a communication session between UE-A and UE-B a beam pair is determined for communication from UE-A to UE-B, i.e., a transmit beam from UE-A is paired with a receive beam from UE-B. A beam pair is also determined for communication from UE-B to UE-A, i.e., a transmit beam from UE-B is paired with a receive beam from UE-A.

In this disclosure, a beam is also referred to as a spatial domain filter. For example, a transmit beam is a spatial domain transmission (or transmit) filter, and a receive beam is a spatial domain reception (or receive) filter.

In this disclosure, RRC signaling (e.g., configuration by RRC signaling) includes RRC signaling over the Uu interface, which can be system information block (SIB)-based RRC signaling (e.g., SIB1 or other SIB) or RRC dedicated signaling that is sent to a specific UE, and/or PC5-RRC signaling over the PC5 or SL interface.

In this disclosure, MAC CE signaling includes MAC CE signaling over the Uu interface, and/or MAC CE signaling over the PC5 or SL interface.

In this disclosure, L1 control signaling includes L1 control signaling over the Uu interface, which can include DL control information (e.g., DCI on PDCCH) and/or UL control information (e.g., UCI on PUCCH or PUSCH), and/or SL control information over the PC5 or SL interface, which can include first stage sidelink control information (e.g., first stage SCI on PSCCH), second stage sidelink control information (e.g., second stage SCI on PSSCH) and/or feedback control information (e.g., control information carried on PSFCH).

In this disclosure a beam report or beam measurement report can be a periodic report, e.g., preconfigured or configured by higher layers, a semi-persistent report that is activated and/or deactivated by MAC CE signaling and/or L1 control signaling, or aperiodic report that is triggered by L1 control signaling and/or MAC CE signaling.

In this disclosure, the container of a report (e.g., beam report (or beam measurement report) or a beam indication message) can be:

a. a MAC CE report. For example, a MAC CE report can reuse the MAC CE CSI report on the SL PC5 interface.

b. a SCI report container. The SCI report container can be first stage SCI (e.g., conveyed by PSCCH) and/or a second stage SCI (e.g., conveyed by PSSCH). In one example, the second stage SCI is a standalone second stage SCI in PSSCH, with no sidelink shared channel (SL-SCH) in PSSCH. In another example, the second stage SCI is multiplexed in PSSCH with a MAC CE carrying the report with no other SL data. In yet another example, the second stage SCI is multiplexed in PSSCH with a MAC CE carrying the report and other SL data. In yet another example, the second stage SCI is multiplexed in PSSCH with other SL data e.g., in a SL-SCH.

c. a PSFCH report container. In one example, the PSFCH can be redesigned to carry more than one bit of information, e.g., a PSFCH with N bits of information and N>1. In another example, a report is one bit indicating if a beam is good (e.g., valid) or bad (e.g., invalid). In yet another example, a report is N bits, with N being a small number and N PSFCHs are used.

d. sent to the network (or gNB) 130 using UCI on PUCCH or PUSCH and/or report can be sent to the network (or gNB) 130 using MAC CE on the Uu interface if a UE is in network coverage.

According to embodiments of the present disclosure, a beam can be identified for communication between a first UE and a second UE.

In one example for the first UE, a same beam is used to transmit PSSCH/PSCCH and PSFCH from the first UE to the second UE. In another example for the first UE, a same beam is used to receive PSSCH/PSCCH and PSFCH at the first UE from the second UE. In another example for the first UE, different beams are used to transmit PSSCH/PSCCH and PSFCH from the first UE to the second UE. In yet another example for the first UE, different beams are used to receive PSSCH/PSCCH and PSFCH at the first UE from the second UE. In yet another example for the first UE, different beams are used to transmit PSSCH and PSCCH from the first UE to the second UE. In yet another example for the first UE, different beams are used to receive PSSCH and PSCCH at the first UE from the second UE. The roles of the first and second UEs can be interchanged.

In one example, a UE can have beam correspondence, without beam sweeping, between the transmit beam and receive beam if the transmit beam to a second UE is known. The receive beam from the second UE is also known without beam sweeping.

In another example, a UE can have beam correspondence, without beam sweeping, between the transmit beam and receive beam if the receive beam from a second UE is known. The transmit beam to the second UE is also known without beam sweeping.

In yet another example, a UE performs beam sweeping to determine a receive beam from a second UE, regardless of whether or not it knows a transmit beam to the second UE.

In yet another example, a UE performs beam sweeping to determine a transmit beam to a second UE, regardless of whether or not it knows a receive beam from the second UE.

According to embodiments of the present disclosure, a DCR can be a message that performs link establishment e.g., sent on PSSCH/PSCCH.

Figure 9:
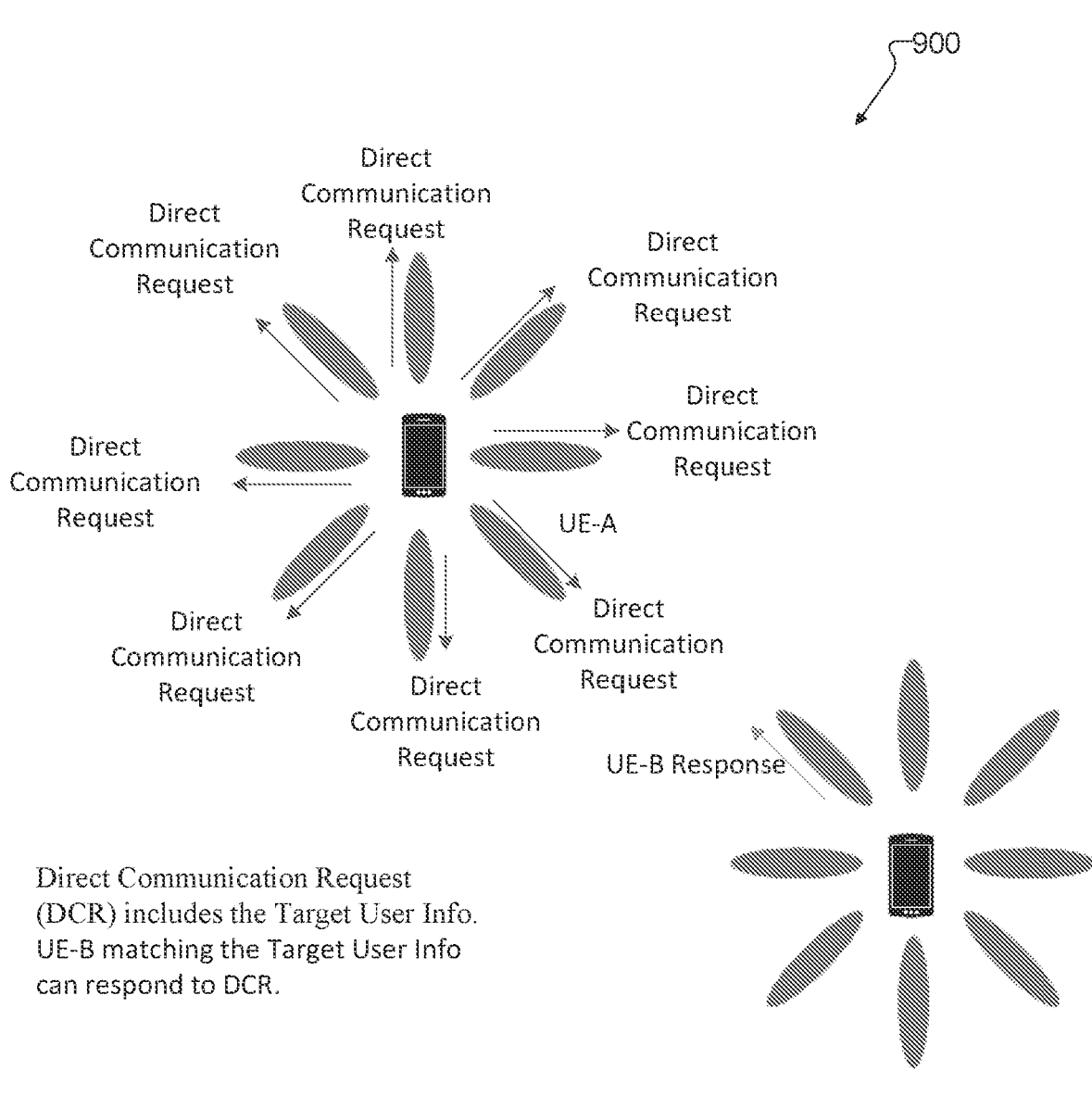
FIG. 9 illustrates an example of an initial beam acquisition according to embodiments of the present disclosure.

FIG. 9 illustrates an example of an initial beam acquisition 900 according to embodiments of the present disclosure. For example, acquisition 900 can be performed by the UE 111 and the UE 111a of FIG. 1. This example is for illustration only and other embodiments can be used without departing from the scope of the present disclosure.

The DCR includes the Target User Info. The DCR to initiate the unicast layer-2 link establishment is transmitted via PC5 unicast transmission to UE-B. When the DCR includes the Target User Info:

a) UE-A transmits the DCR message on multiple UE-A transmit beams (e.g., multiple UE-A spatial domain transmission filters), e.g., transmit beam sweeping.

b) UE-B attempts to receive the DCR messages transmitted on the multiple UE-A transmit beams (e.g., UE-A spatial domain transmission filters) and determines a DCR message (e.g., a DCR message corresponding to a preferred UE-A transmit beam (e.g., UE-A spatial domain transmission filter)). In one example UE-B can perform receive beam sweeping to find a preferred receive beam (spatial domain receive filter) at UE-B. In this case, UE-A can repeat transmission on the same transmit beam (spatial domain transmission filter) from UE-A.

c) UE-B sends a response back to UE-A corresponding to the determined DCR message indicating a preferred transmit beam (spatial domain transmission filter) from UE-A to UE-B. In one example, the response from UE-B is sent on one transmit beam (spatial domain transmission filter) from UE-B. In one example, UE-A can perform receive beam sweeping for the response to find a preferred receive beam (spatial domain reception filter) at UE-A. In this case, UE-B can repeat a response transmission on the same transmit beam (spatial domain transmission filter) from UE-B.

d) In one example, the response from UE-B is transmitted on multiple transmit beams (spatial domain transmission filters) from UE-B to UE-A. In one example, UE-A can perform receive beam sweeping for the response to find a preferred receive beam (spatial domain reception filter) at UE-A. In this case, UE-B can repeat a response transmission on the same transmit beam (spatial domain transmission filter) from UE-B. In a further example, UE-A can indicate to UE-B a preferred transmit beam (spatial domain transmission filter) from UE-B to UE-A.

Figure 10:
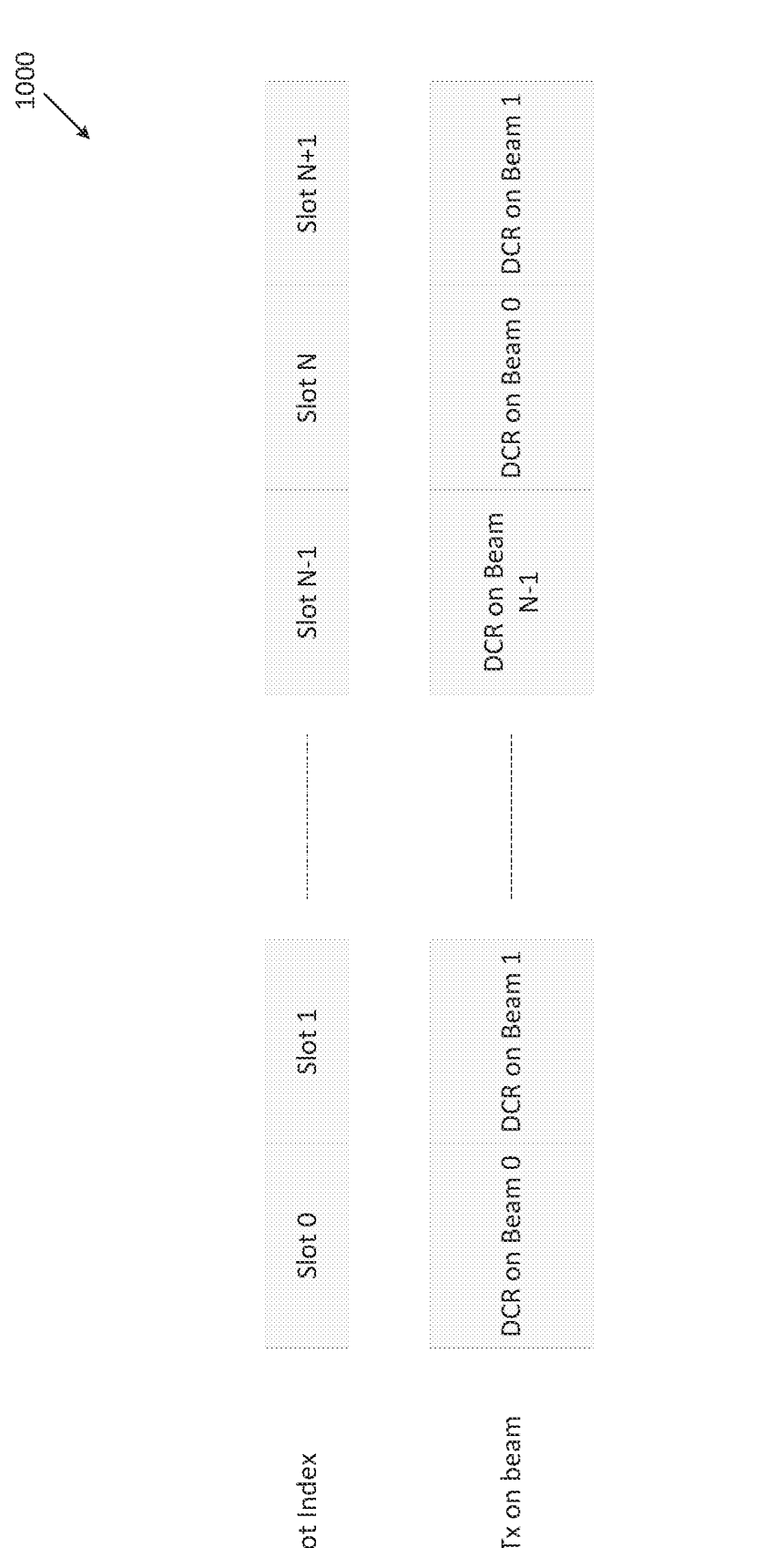
FIG. 10 illustrates an example of an implementation for slot indexes linked to transmission beams according to embodiments of the present disclosure.

FIG. 10 illustrates an example of an implementation 1000 for slot indexes linked to transmission beams according to embodiments of the present disclosure. For example, implementation 1000 can be utilized by the UE 111 of FIG. 1. This example is for illustration only and other embodiments can be used without departing from the scope of the present disclosure.

In one example, a slot index determines or is linked to a UE-A transmit beam (e.g., UE-A spatial domain transmission filter).

In another example, the slot index is a physical slot index.

In yet another example, the slot index is a logical slot index within the resource pool.

In yet another example, if there are N UE-A transmit beams (e.g., UE-A spatial domain transmission filters), 0, 1, . . . , N–1, a DCR transmitted in a slot with index m is transmitted on beam (e.g., spatial domain transmission filter) n, such that m % N=n. % is the modulo operator that determines the remainder after dividing m by N.

In yet another example, if an initial transmission of the DCR message is in slot $m_0$, a retransmission of the DCR message is in slot $m_1$ such that $m_0$% N=$m_1$% N. N can be pre-configured and/or configured or updated by RRC signaling from a network and/or RRC signaling over PC5 and/or MAC CE signaling and/or L1 control signaling.

In yet another example, N can be specified in the system specifications. In one example, if N is not (pre-)configured, a default value specified in the system specification is used. After the UE sweeps through N transmit beams, the UE can cyclically repeat the beam sweep (e.g., retransmission).

In yet another example, after one transmit beam sweep cycle across the N transmit antennas, the UE can ramp up its power by a step size. The step size can be pre-configured, and/or configured or updated by RRC signaling from a network and/or RRC signaling over PC5 and/or MAC CE signaling and/or L1 control signaling.

In yet another example, step size can be specified in the system specifications. In yet another example, if step size is not (pre-)configured, a default value specified in the system specification is used. In one example, whether or not the UE ramps up its power by a step size after sweeping across, N transmit antennas can be pre-configured, and/or configured or updated by RRC signaling from a network and/or RRC signaling over PC5 and/or MAC CE signaling and/or L1 control signaling.

In yet another example, after M transmit beam sweep cycle across the N transmit antennas, the UE can ramp up its power by a step size (e.g., after N×M transmission). The step size and/or M can be pre-configured, and/or configured or updated by RRC signaling from a network and/or RRC signaling over PC5 and/or MAC CE signaling and/or L1 control signaling. In one example, step size and/or M can be specified in the system specifications. In yet another example, if step size and/or M is not (pre-)configured, a default value specified in the system specification is used.

In yet another example, if the number of transmit beams T is less than N, the UE leaves some N–T occasions per beam sweep cycle unused.

In yet another example, if the number of transmit beams T is less than N, the UE can use more than one occasion per beam sweep cycle for a transmit beam. For example, the choice to leave some occasions unused per beam sweep cycle or repeat a transmit beam in multiple occasions per beam sweep cycle can be (pre-)configured or left to the UE's implementation.

In yet another example, if the number of transmit beams T is equal to N, a UE maps a transmit beam to an occasion each beam sweep cycle.

In yet another example, if the number of transmit beams T is more than N, the UE selects N transmit beams to map to the N occasions per beam sweep cycle. In one sub-example, the same N transmit beams are used in each beam sweep cycle. In one sub-example, different N transmit beams can be used in each beam sweep cycle.

Figure 11:
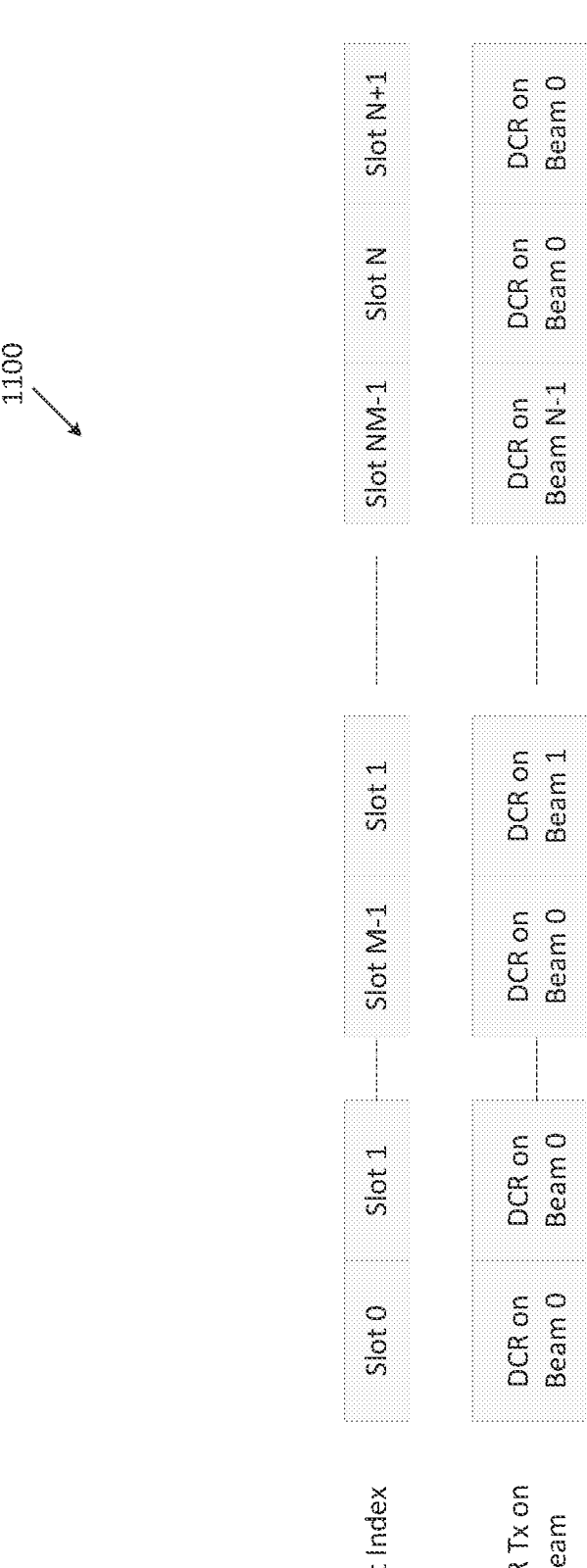
FIG. 11 illustrates another example of an implementation for slot indexes linked to transmission beams according to embodiments of the present disclosure.

FIG. 11 illustrates an example of an implementation 1100 for slot indexes linked to transmission beams according to embodiments of the present disclosure. For example, implementation 1100 can be utilized by the UE 111*a* of FIG. 1. This example is for illustration only and other embodiments can be used without departing from the scope of the present disclosure.

In one example, if there are N UE-A transmit beams (e.g., UE-A spatial domain transmission filters), 0, 1, . . . , N–1, a DCR transmitted in a slot with index m, is transmitted on beam (e.g., spatial domain transmission filter) n, such that $$\left\lfloor \frac{m}{M} \right\rfloor \% N = n.$$

% is the modulo operator that determines the remainder after dividing $$\left\lfloor \frac{m}{M} \right\rfloor$$

by N. Where, M is the number of slots a DCR message (i.e., link establishment message) can be repeated on the same beam. M can be pre-configured, and/or configured or updated by RRC signaling from a network and/or RRC signaling over PC5 and/or MAC CE signaling and/or L1 control signaling.

In another example, M can be specified in the system specifications. In yet another example, if M is not (pre-)configured, a default value specified in the system specification is used.

In yet another example, if an initial transmission of the DCR message is in slot $m_0$, a retransmission of the DCR message is in slot $m_1$ such that $m_0$% $NM=m_1$% $NM$. The repetition of the DCR message in multiple slots in the same UE-A transmit beam (e.g., UE spatial domain transmission filter) can be used for spatial domain receive filter sweeping at the UE receiving the DCR message, i.e., for UE-B to refine its receive beam for a transmission from UE-A. N can be pre-configured, and/or configured or updated by RRC signaling from a network and/or RRC signaling over PC5 and/or MAC CE signaling and/or L1 control signaling.

In yet another example, N can be specified in the system specifications. In yet another example, if N is not (pre-)configured, a default value specified in the system specification is used. After the UE sweeps through N×M transmit beams, the UE can cyclically repeat the beam sweep (e.g., retransmission).

In yet another example, after one transmit beam sweep cycle across the N×M transmit antennas, the UE can ramp up its power by a step size. The step size can be pre-configured, and/or configured or updated by RRC signaling from a network and/or RRC signaling over PC5 and/or MAC CE signaling and/or L1 control signaling.

In yet another example, step size can be specified in the system specifications. In yet another example, if step size is not (pre-)configured, a default value specified in the system specification is used.

In yet another example, whether or not the UE ramps up its power by a step size after sweeping across, N×M transmit antennas can be pre-configured, and/or configured or updated by RRC signaling from a network and/or RRC signaling over PC5 and/or MAC CE signaling and/or L1 control signaling.

In yet another example, after K transmit beam sweep cycle across the N×M transmit antennas, the UE can ramp up its power by a step size (e.g., after N×M×K transmission). The step size and/or K can be pre-configured, and/or configured or updated by RRC signaling from a network and/or RRC signaling over PC5 and/or MAC CE signaling and/or L1 control signaling.

In yet another example, step size and/or K can be specified in the system specifications. In yet another example, if step size and/or K is not (pre-)configured, a default value specified in the system specification is used.

In yet another example, if the number of transmit beams T is less than N, the UE leaves some (N−T)×M occasions per beam sweep cycle unused. In one example, if the number of transmit beams T is less than N, the UE can use more than M occasion per beam sweep cycle for a transmit beam. For example, the choice to leave some occasions unused per beam sweep cycle or repeat a transmit beam in multiple occasions per beam sweep cycle can be (pre-)configured or left to the UE's implementation.

In yet another example, if the number of transmit beams T is equal to N, a UE maps a transmit beam to M occasions each beam sweep cycle.

In yet another example, if the number of transmit beams T is more than N, the UE selects N transmit beams to map to the N×M occasions per beam sweep cycle.

In one sub-example, the same N transmit beams are used in each beam sweep cycle. In one sub-example, different N transmit beams can be used in each beam sweep cycle.

Figure 12:
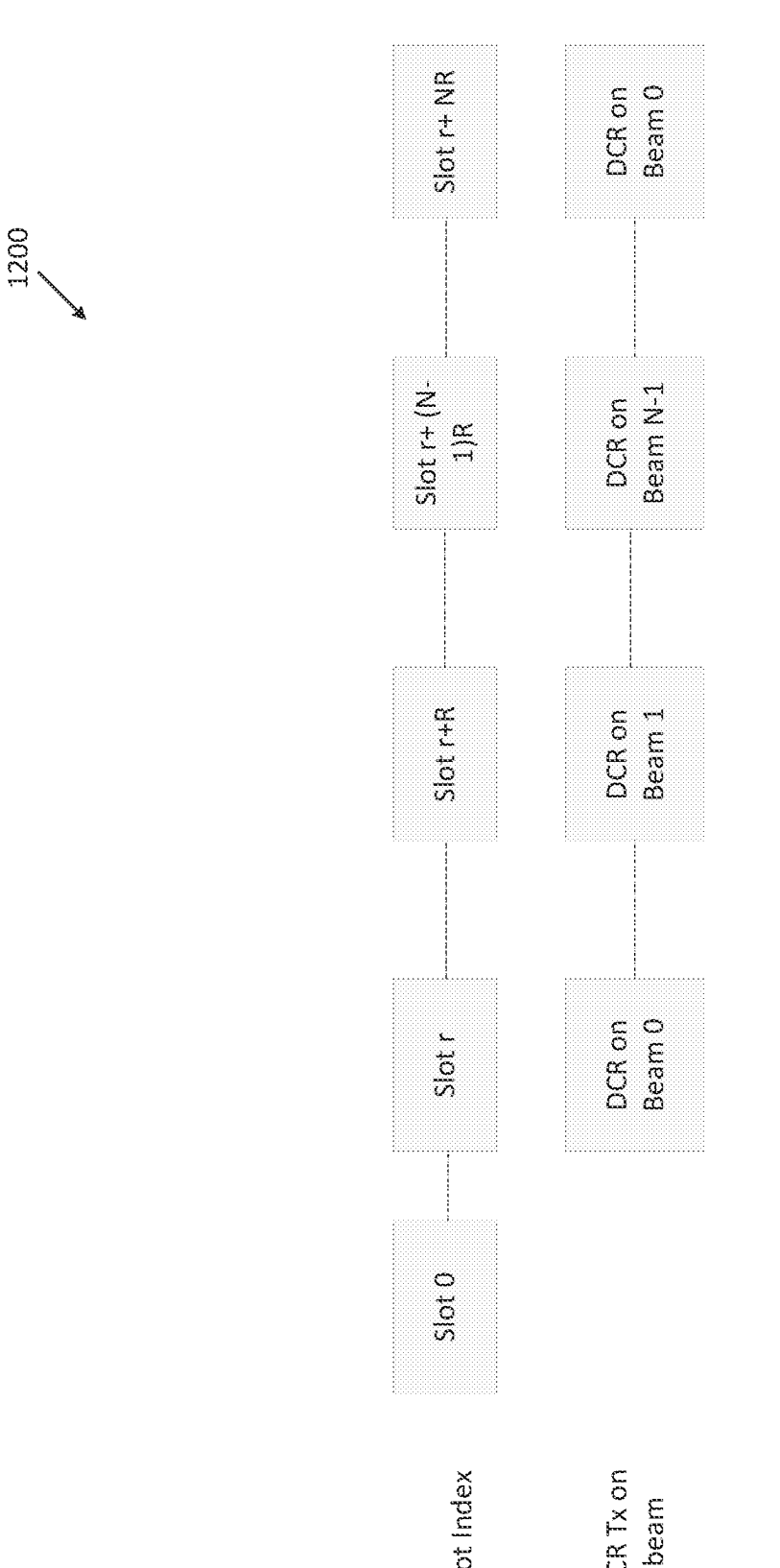
FIG. 12 illustrates another example of an implementation for slot indexes linked to transmission beams according to embodiments of the present disclosure.

FIG. 12 illustrates an example of an implementation 1200 for slot indexes linked to transmission beams according to embodiments of the present disclosure. For example, implementation 1200 can be utilized by the UE 111*b* of FIG. 1. This example is for illustration only and other embodiments can be used without departing from the scope of the present disclosure.

In one example, if there are N UE-A transmit beams (e.g., UE-A spatial domain transmission filters), 0, 1, . . . , N−1, a DCR transmitted in a slot with index m, is transmitted on beam (e.g., spatial domain transmission filter) n, such that (m−r) % R=0 and $$\left( \frac{m-r}{R} \right) \% N = n.$$

% is the modulo operator that determines the remainder after dividing $$\left( \frac{m-r}{R} \right)$$

by N. R can be pre-configured, and/or configured or updated by RRC signaling from a network and/or RRC signaling over PC5 and/or MAC CE signaling and/or L1 control signaling.

In another example, R can be specified in the system specifications. In yet another example, if R is not (pre-)configured, a default value specified in the system specification is used. r can be pre-configured, and/or configured or updated by RRC signaling from a network and/or RRC signaling over PC5 and/or MAC CE signaling and/or L1 control signaling.

In yet another example, r can be specified in the system specifications, e.g., r=0. In yet another example, if r is not (pre-)configured, a default value specified in the system specification is used, e.g., r=0.

In yet another example, if an initial transmission of the DCR message is in slot $m_0$, a retransmission of the DCR message is in slot $m_1$ such that $m_0$% $NR=m_1$% $NR$. N can be pre-configured, and/or configured or updated by RRC signaling from a network and/or RRC signaling over PC5 and/or MAC CE signaling and/or L1 control signaling.

In yet another example, N can be specified in the system specifications. In yet another example, if N is not (pre-)configured, a default value specified in the system specification is used. After the UE sweeps through N×R transmit beams, the UE can cyclically repeat the beam sweep (e.g., retransmission).

In yet another example, after one transmit beam sweep cycle across the N transmit antennas, the UE can ramp up its power by a step size. The step size can be pre-configured, and/or configured or updated by RRC signaling from a network and/or RRC signaling over PC5 and/or MAC CE signaling and/or L1 control signaling.

In yet another example, step size can be specified in the system specifications. In yet another example, if step size is not (pre-)configured, a default value specified in the system specification is used.

In yet another example, whether or not the UE ramps up its power by a step size after sweeping across N, transmit antennas can be pre-configured, and/or configured or updated by RRC signaling from a network and/or RRC signaling over PC5 and/or MAC CE signaling and/or L1 control signaling.

In yet another example, after K transmit beam sweep cycle across the N transmit antennas, the UE can ramp up its power by a step size (i.e., after N×K transmission). The step size and/or K can be pre-configured, and/or configured or updated by RRC signaling from a network and/or RRC signaling over PC5 and/or MAC CE signaling and/or L1 control signaling.

In yet another example, step size and/or K can be specified in the system specifications. In yet another example, if step size and/or K is not (pre-)configured, a default value specified in the system specification is used.

In yet another example, if the number of transmit beams T is less than N, the UE leaves some (N−T) occasions per beam sweep cycle unused.

In yet another example, if the number of transmit beams T is less than N, the UE can use more than one occasion per beam sweep cycle for a transmit beam. For example, the choice to leave some occasions unused per beam sweep cycle or repeat a transmit beam in multiple occasions per beam sweep cycle can be (pre-)configured or left to the UE's implementation.

In yet another example, if the number of transmit beams T is equal to N, a UE maps a transmit beam to one occasion in each beam sweep cycle. In yet another example, if the number of transmit beams T is more than N, the UE selects N transmit beams to map to the N occasions per beam sweep cycle.

In one sub-example, the same N transmit beams are used in each beam sweep cycle. In one sub-example, different N transmit beams can be used in each beam sweep cycle.

Figure 13:
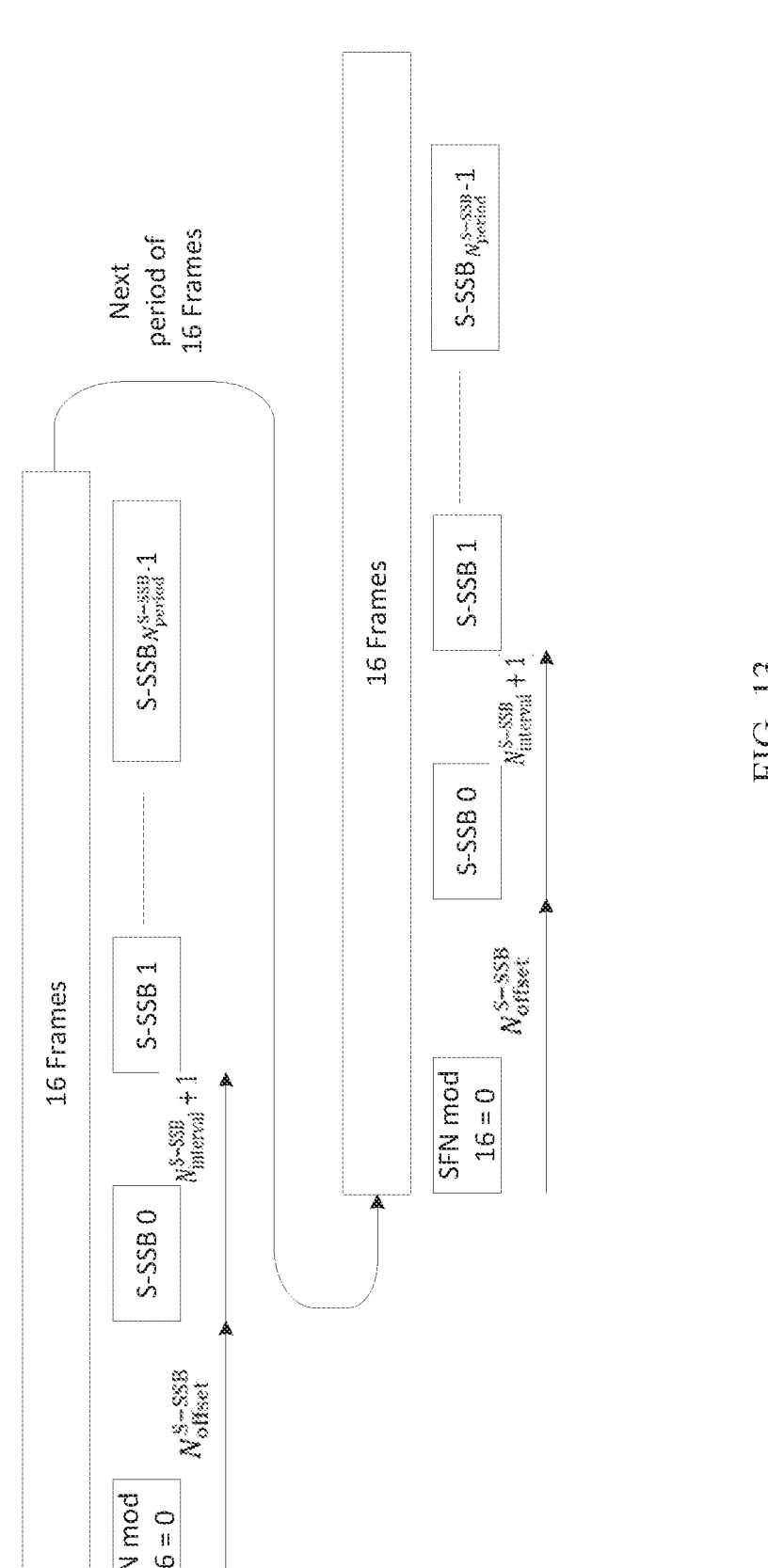
FIG. 13 illustrates an example of SL synchronization signal blocks (S-SSBs) according to embodiments of the present disclosure.

FIG. 13 illustrates an example of S-SSBs 1300 according to embodiments of the present disclosure. For example, S-SSBs 1300 can be utilized by any of the UEs 111-116 of FIG. 1. This example is for illustration only and other embodiments can be used without departing from the scope of the present disclosure.

In one example, a most recent S-SSB transmission determines or is linked to a UE-A transmit beam (e.g., UE-A spatial domain transmission filter). A SL UE receives or transmits SL primary synchronization signal (S-PSS), SL secondary synchronization signal (S-SSS), and physical SL broadcast channel (PSBCH). The UE assumes that reception occasions of a PSBCH, S-PSS, and S-SSS are in consecutive symbols and form a S-SS/PSBCH block (S-SSB). The UE is provided, by higher layer parameter sl-NumSSB-WithinPeriod, a number of $$N_{period}^{S-SSB}$$

SSBs in a period of 16 frames. The allowed values for sl-NumSSB-WithinPeriod $$\left(N_{period}^{S-SSB}\right),$$

depends on the frequency range and the sub-carrier spacing (SCS):

a) For FR1 and SCS=15 kHz, $$N_{period}^{S-SSB} \in \{1\}.$$

b) For FR1 and SCS=30 kHz, $$N_{period}^{S-SSB} \in \{1, 2\}.$$

c) For FR1 and SCS=60 kHz, $$N_{period}^{S-SSB} \in \{1, 2, 4\}.$$

d) For FR2 and SCS=60 kHz, $$N_{period}^{S-SSB} \in \{1, 2, 4, 8, 16, 32\}.$$

e) For FR2 and SCS=120 kHz, $$N_{period}^{S-SSB} \in \{1, 2, 4, 6, 16, 32, 64\}.$$

The transmission of the S-SSBs of the period is with a periodicity of 16 frames. The index of slots used for the transmission of SSBs with index $$i_{S-SSB} \in \left\{0, 1, \dots, N_{period}^{S-SSB} - 1\right\}$$

are determined by:

$$N_{offset}^{S-SSB} + \left(N_{interval}^{S-SSB} + 1\right) \cdot i_{S-SSB}$$

Where, a) Slot index 0 corresponds to the first slots of frame with (SFN mod 16)=0, or (DFN mod 16)=0.

b)

$$N_{offset}^{S-SSB}$$

is given by higher layer parameter sl-TimeOffsetSSB, which is in the range {0, 1, . . . , 1279}.

c)

$$N_{interval}^{S\text{-}SSB}$$

is given by higher layer parameter which is in the range $\{0, 1, \ldots, 639\}$.

In one example, a DCR transmission between S-SSB 0 and S-SSB 1 is associated with or linked to a first UE-A TX beam (e.g., a first UE-A spatial domain transmission filter), a DCR transmission between S-SSB 1 and S-SSB 2 is associated with or linked to a second UE-A TX beam (e.g., a second UE-A spatial domain transmission filter), . . . , a DCR transmission between S-SSB $$N_{period}^{S\text{-}SSB} - 2$$

and S-SSB $$N_{period}^{S\text{-}SSB} - 1$$

is associated with or linked to a $$\left(N_{period}^{S\text{-}SSB} - 1\right)^{th}$$

UE-A TX beam (e.g., a $$\left(N_{period}^{S\text{-}SSB} - 1\right)^{th}$$

UE-A spatial domain transmission filter), a DCR transmission after S-SSB $$N_{period}^{S\text{-}SSB} - 1$$

and before S-SSB 0 of the next 16-frame period is associated with or linked to a $$N_{period}^{S\text{-}SSB_{th}}$$

UE-A Tx beam (e.g., a $$N_{period}^{S\text{-}SSB_{th}}$$

UE-A spatial domain transmission filter).

In one example, a DCR transmission between S-SSB 0 and S-SSB 1 is associated with or linked to a first UE-A TX beam (e.g., a first UE-A spatial domain transmission filter), a DCR transmission between S-SSB 1 and S-SSB 2 is associated with or linked to a second UE-A TX beam (e.g., a second UE-A spatial domain transmission filter), . . . , a DCR transmission between S-SSB $$N_{period}^{S\text{-}SSB} - 2$$

and S-SSB $$N_{period}^{S\text{-}SSB} - 1$$

is associated with or linked to a $$\left(N_{period}^{S\text{-}SSB} - 1\right)^{th}$$

UE-A TX beam (e.g., a $$\left(N_{period}^{S\text{-}SSB} - 1\right)^{th}$$

UE-A spatial domain transmission filter), a DCR transmission after S-SSB $$N_{period}^{S\text{-}SSB} - 1$$

and before the end of the 16-frame period is associated with or linked to a $$N_{period}^{S\text{-}SSB_{th}}$$

UE-A Tx beam (e.g a $$N_{period}^{S\text{-}SSB}$$

UE-A spatial domain transmission filter).

In one example, a DCR transmission between S-SSB 0 and S-SSB 1 is associated with or linked to a first UE-A Tx beam (e.g., a first UE-A spatial domain transmission filter), a DCR transmission between S-SSB 1 and S-SSB 2 is associated with or linked to a second UE-A Tx beam (e.g., a second UE-A spatial domain transmission filter), . . . , a DCR transmission between S-SSB $$N_{period}^{S\text{-}SSB} - 2$$

and S-SSB $$N_{period}^{S\text{-}SSB} - 1$$

is associated with or linked to a $$\left(N_{period}^{S-SSB}-1\right)^{th}$$

UE-A Tx beam (e.g., a $$\left(N_{period}^{S-SSB}-1\right)^{th}$$

UE-A spatial domain transmission filter), a DCR transmission after S-SSB $$N_{period}^{S-SSB}-1$$

and for $$N_{interval}^{S-SSB}$$

slots from S-SSB $$N_{period}^{S-SSB}-1$$

is associated with or linked to a $N_{period}^{S-SSB}{}^{th}$ UE-A Tx beam (e.g., a $$N_{period}^{S-SSB}{}_{th}$$

UE-A spatial domain transmission filter).

In one example, a DCR transmission after S-SSB 0 and before S-SSB 1 and for no more than K slots starting from S-SSB 0 is associated with or linked to a first UE-A Tx beam (e.g., a first UE-A spatial domain transmission filter), a DCR transmission after S-SSB 1 and before S-SSB 2 and for no more than K slots starting from S-SSB 1 is associated with or linked to a second UE-A Tx beam (e.g., a second UE-A spatial domain transmission filter), . . . , a DCR transmission after S-SSB $$N_{period}^{S-SSB}-2$$

and before S-SSB $$N_{period}^{S-SSB}-1$$

and for no more than K slots starting from S-SSB $$N_{period}^{S-SSB}-2$$

is associated with or linked to a $$\left(N_{period}^{S-SSB}-1\right)^{th}$$

UE-A Tx beam (e.g., a $$\left(N_{period}^{S-SSB}-1\right)^{th}$$

UE-A spatial domain transmission filter), a DCR transmission after S-SSB $$N_{period}^{S-SSB}-1$$

and before S-SSB 0 of the next 16-frame interval and for no more than K slots starting from S-SSB $$N_{period}^{S-SSB}-1$$

is associated with or linked to a $$N_{period}^{S-SSB}{}^{th}$$

UE-A-A Tx beam (e.g., a $$N_{period}^{S-SSB}{}^{th}$$

UE-A spatial domain transmission filter).

In one example, K is in units of logical slots in a resource pool. In one example, K is in units of physical slots. K can be pre-configured, and/or configured or updated by RRC signaling from a network and/or RRC signaling over PC5 and/or MAC CE signaling and/or L1 control signaling. In one example, K can be specified in the system specifications, for example, K=1 or K=2. In one example, if K is not (pre-)configured, a default value specified in the system specification is used for example K=1 or K=2. In one example, K is the same for all S-SSBs. In one example, a different K can be configured for each S-SSB or some of the S-SSBs.

In one example, a DCR transmission after S-SSB 0 and before S-SSB 1 and for no more than K slots starting from S-SSB 0 is associated with or linked to a first UE-A Tx beam (e.g., a first UE-A spatial domain transmission filter), a DCR transmission after S-SSB 1 and before S-SSB 2 and for no more than K slots starting from S-SSB 1 is associated with or linked to a second UE-A Tx beam (e.g., a second UE-A spatial domain transmission filter), . . . , a DCR transmission after S-SSB $$N_{period}^{S-SSB}-2$$

and before S-SSB $$N_{period}^{S\text{-}SSB} - 1$$

and for no more than K slots starting from S-SSB $$N_{period}^{S\text{-}SSB} - 2$$

is associated with or linked to a $$\left(N_{period}^{S\text{-}SSB} - 1\right)^{th}$$

UE-A Tx beam (e.g., a $$\left(N_{period}^{S\text{-}SSB} - 1\right)^{th}$$

UE-A spatial domain transmission filter), a DCR transmission after S-SSB $$N_{period}^{S\text{-}SSB} - 1$$

and before the end of the 16-frame interval and for no more than K slots starting from S-SSB $$N_{period}^{S\text{-}SSB} - 1$$

is associated with or linked to a $$N_{period}^{S\text{-}SSB\,th}$$

UE-A Tx beam (e.g. a $$N_{period}^{S\text{-}SSB\,th}$$

UE-A spatial domain transmission filter).

In one example, K is in units of logical slots in a resource pool. In one example, K is in units of physical slots. K can be pre-configured, and/or configured or updated by RRC signaling from a network and/or RRC signaling over PC5 and/or MAC CE signaling and/or L1 control signaling.

In one example, K can be specified in the system specifications, for example, K=1 or K=2. In one example, if K is not (pre-)configured, a default value specified in the system specification is used for example K=1 or K=2. In one example, K is the same for all S-SSBs. In one example, a different K can be configured for each S-SSB or some of the S-SSBs.

In one example, a DCR transmission after S-SSB 0 and for no more than K slots starting from S-SSB 0 is associated with or linked to a first UE-A Tx beam (e.g., a first UE-A spatial domain transmission filter), a DCR transmission after S-SSB 1 and for no more than K slots starting from S-SSB 1 is associated with or linked to a second UE-A Tx beam (e.g., a second UE-A spatial domain transmission filter), . . . , a DCR transmission after S-SSB $$N_{period}^{S\text{-}SSB} - 2$$

and for no more than K slots starting from S-SSB $$N_{period}^{S\text{-}SSB} - 2$$

is associated with or linked to a $$\left(N_{period}^{S\text{-}SSB} - 1\right)$$

UE-A Tx beam (e.g., a $$\left(N_{period}^{S-SSB} - 1\right)^{th}$$

UE-A spatial domain transmission filter), a DCR transmission after S-SSB $$\left(N_{period}^{S-SSB} - 1\right)$$

and for no more than K slots starting from S-SSB $$N_{period}^{S-SSB} - 1$$

is associated with or linked to a $$N_{period}^{S-SSB\,th}$$

UE-A Tx beam (e.g., a $$N_{period}^{S-SSB\,th}$$

UE-A spatial domain transmission filter).

In one example, K is in units of logical slots in a resource pool. In one example, K is in units of physical slots. K can be pre-configured, and/or configured or updated by RRC signaling from a network and/or RRC signaling over PC5 and/or MAC CE signaling and/or L1 control signaling.

In one example, K can be specified in the system specifications, for example, K=1 or K=2. In one example, if K is not (pre-)configured, a default value specified in the system specification is used for example K=1 or K=2.

In one example, K is the same for all S-SSBs. In one example, a different K can be configured for each S-SSB or some of the S-SSBs.

In one example, a parameter (value) is included in the DCR, wherein the parameter (value) determines or is linked to a UE-A transmit beam (e.g., UE-A spatial domain transmission filter). In one example, the parameter (value) can be a UE-A transmit beam (e.g., UE-A spatial domain transmission filter) index.

In one example, the parameter (value) is a field in a first stage SCI in a PSCCH channel associated with the DCR. In one example, the parameter (value) is a field in a second stage SCI in a PSSCH channel associated with the DCR. In one example, the parameter (value) is a field in a SL shared channel (SL-SCH) in a PSCCH channel associated with the DCR. In one example, the parameter (value) is a field in MAC CE associated with the DCR.

In one example, a DCR includes a SL CSI-RS. In one example, a SL CSI-RS can include and/or indicate a UE-ID. In one example, a SL CSI-RS can include and/or indicate a beam ID.

In one example, the sequence of the SL CSI-RS resource is generated according to:

$$r(m) = \frac{1}{\sqrt{2}}(1 - 2c(2m)) + j\frac{1}{\sqrt{2}}(1 - 2c(2m+1))$$

Where, m=0, 1, . . .

The pseudo-random sequence c(n) is a length-31 Gold sequence defined as $$c(n) = (x_1(n+N_c) + x_2(n+N_c)) \bmod 2$$

Where, $$N_c = 1600$$

$$x_1(n+31) = (x_1(n+3) + x_1(n)) \bmod 2$$

$$x_1(n+31) = (x_2(n+3) + x_2(n+2) + x_2(n+1) + x_2(n)) \bmod 2$$

The first m-sequence is initialized with $x_1(0)=1$, and $x_2(n)=0$, for n=1 . . . 30.

The second m-sequence is initialized with $c_{init}$, where $c_{init}$ $$c_{init} = \left(2^{10}\left(N_{symb}^{slot}n_{s,f}^{\mu} + l + 1\right)(2n_{ID} + 1) + n_{ID}\right) \bmod 2^{31}$$

Where,
a)

$$N_{symb}^{slot}$$

is the number of symbols in a slot.
b)

$$n_{s,f}^{\mu}$$

is the slot number within a frame for sub-carrier spacing configuration it.
c) l is the OFDM symbol number in a slot.
d)

$$n_{ID} = N_{ID}^{x} \bmod 2^{10}, \text{ where } N_{ID}^{x}$$

is the decimal representation of CRC of the first stage SL control information carried on PSCCH.

In one example, the sequence of the SL CSI-RS resource is the same for all UE-A transmit beams (UE-A spatial domain transmission filters). In one example, the sequence of the SL CSI-RS resource depends on (is a function of) the UE-A transmit beam index (UE-A spatial domain transmission filter index). In one example, the sequence $n_{ID}$ depends on the UE-A transmit beam index (UE-A spatial domain transmission filter index).

In one example, the equation for $c_{init}$ depends on the UE-A transmit beam index (UE-A spatial domain transmission filter index).

In one example, the CSI-RS resource has a sequence that is a function of the slot number within a frame and a symbol number. In a variant example, the slot number is a logical slot number. In a variant example, the slot number is a slot number within a sub-frame. The slot number and/or symbol determine the beam (or spatial filter) ID based on a mapping between the slot/symbol index and the beam (or spatial filter) ID.

In one example, a DCR for a first UE (e.g., UE-A) to a second UE (e.g., UE-B) doesn't implicitly or explicitly indicate to UE-B a UE-A transmit beam index (UE-A spatial domain transmission filter). A DCR from UE-A is transmitted on multiple beams. A response to a particular transmission instance of the DCR allows UE-A to infer (e.g. based on timing) the UE-A transmit beam index (UE-A spatial domain transmission filter) for subsequent transmissions from UE-A to UE-B based on the transmission instance of the DCR for which UE-A received a response from UE-B.

In a further example, the response of the DCR transmitted from UE-B to UE-A includes a signal quality indicator (e.g., SL reference signal received power (RSRP) or SL-signal to interference noise ratio (SINR) as measured by UE-B). For determining the UE-A transmit beam index (UE-A spatial domain transmission filter), UE-A can select a transmission instance with the best (e.g., largest) signal quality indicator (e.g., SL RSRP or SL SINR). Alternatively, UE-A can select any transmission instance with SL RSRP that exceeds a SL RSRP threshold or a SL SINR threshold. The SL RSRP threshold or SL SINR threshold can be pre-configured, and/or configured or updated by RRC signaling from a network and/or RRC signaling over PC5 and/or MAC CE signaling and/or L1 control signaling. In one example, if a SL RSRP threshold or SL SINR threshold is not (pre-) configured, a default value specified in the system specification is used.

In one example, the SL RSRP threshold or SL SINR threshold depends on the priority of the corresponding DCR message. In one example, the SL RSRP can be based on PSCCH DMRS RSRP or PSSCH DMRS RSRP or SL CSI-RS RSRP. In one example, the SL SINR can be based on PSCCH DMRS SINR or PSSCH DMRS SINR or SL CSI-RS SINR.

In a further example, the response of the DCR transmitted from UE-B to UE-A includes the corresponding resource or resources used for the DCR from UE-A, for example, the starting (or ending) time resource (e.g., slot and/or symbol—this can be absolute or relative to the response) and/or the starting (or ending) frequency resource (e.g., sub-channel and/or PRB and/or sub-carrier—this can be absolute or relative to the response). In a further example, the response of the DCR transmitted from UE-B to UE-A includes a reference (e.g., index) to the DCR from UE-A.

In one example, UE-B receives or attempts to receive the DCR messages transmitted on multiple UE-A transmit beams (e.g., UE-A spatial domain transmission filter). UE-B can check if its target user information (e.g., Layer-2 destination ID) is included in the DCR message. Accordingly, UE-B can follow one or more of the following:

a) In one example, if a DCR is successfully decoded, UE-B sends a response back to UE-A corresponding to the DCR that is successfully decoded.

b) In one example, if a DCR is successfully decoded and SL RSRP of the DCR exceeds a SL RSRP threshold or SL SINR of the DCR exceeds a SL SINR threshold, UE-B sends a response back to UE-A corresponding to the DCR that exceeds a SL RSRP threshold or SL SINR threshold. The SL RSRP or SL SINR can be determined based on the PSCCH DMRS or based on the PSSCH DMRS or based on the SL CSI-RS. The SL RSRP threshold or SL SINR threshold can be pre-configured, and/or configured or updated by RRC signaling from a network and/or RRC signaling over PC5 and/or MAC CE signaling and/or L1 control signaling. In one example, if a SL RSRP threshold or SL SINR threshold is not (pre-)configured, a default value specified in the system specification is used. In one example, the SL RSRP threshold or SL SINR threshold depends on the priority of the corresponding DCR message.

c) In one example, if multiple DCR messages are successfully decoded, UE-B determines the DCR message with the largest SL RSRP or SL SINR. The SL RSRP or SL SINR can be determined based on the PSCCH DMRS or based on the PSSCH DMRS or based on the SL CSI-RS. UE-B sends a response back to UE-A corresponding to the determined DCR. In one further example, a window can be (pre-)configured during which UE-B attempts to receive a DCR message. In one example, the window starts in the slot of the first successfully decoded DCR (or in the following slot) and ends T slots later where T can be in units of logical slots in a resource pool. In another example, T can be in units of physical slots. In one example, T can be pre-configured, and/or configured or updated by RRC signaling from a network and/or RRC signaling over PC5 and/or MAC CE signaling and/or L1 control signaling. In one example, T can be specified in the system specifications. In one example, if T is not (pre-)configured, a default value specified in the system specification is used.

d) In one example, if multiple DCR messages are successfully decoded with SL RSRP or SL SINR of the DCR message exceeding a SL RSRP threshold or a SL SINR threshold, UE-B determines the DCR message with the largest SL RSRP or SL SINR. UE-B sends a response back to UE-A corresponding to the determined DCR message. The SL RSRP or SL SINR can be determined based on the PSCCH DMRS or based on the PSSCH DMRS or based on the SL CSI-RS. The SL RSRP threshold or SL SINR threshold can be pre-configured, and/or configured or updated by RRC signaling from a network and/or RRC signaling over PC5 and/or MAC CE signaling and/or L1 control signaling. In one example, if a SL RSRP threshold or SL SINR threshold is not (pre-)configured, a default value specified in the system specification is used. In one example, the SL RSRP threshold or SL SINR threshold depends on the priority of the corresponding DCR message. In one further example, a window can be (pre-)configured during which UE-B attempts to receive a DCR message. In one example, the window starts in the slot of the first successfully decoded DCR (or in the following slot) and ends T slots later. Where, in one example, T can be in units of logical slots in a resource pool. In another example, T can be in units of physical slots. In one example, T can be pre-configured, and/or configured or updated by RRC signaling from a network and/or RRC signaling over PC5 and/or MAC CE signaling and/or L1 control signaling. In one example, T can be specified in the system specifications. In one example, if T is not (pre-)configured, a default value specified in the system specification is used.

e) In one example, UE-B receives or attempts to receive a DCR corresponding to all transmitted beams from UE-A before determining the DCR message to respond to. For example, within a (pre-)configured window as described herein. In another example, the link establishment messages (e.g., DCR) can be those transmitted in one transmit beam sweep as described herein.

f) In one example, once UE-B successfully decodes a DCR message, UE-B can send a response back to UE-A corresponding to the DCR that is successfully decoded. In a variant of this example, it can be up to the implementation of UE-B whether to wait for decoding other DCR messages or not before UE-B sends a response back to UE-A (for example within a (pre-)configured window as described herein).

g) In one example, once UE-B successfully decodes a DCR message and the corresponding SL RSRP or SL SINR of the DCR exceeds a SL RSRP threshold or SL SINR threshold, UE-B sends a response back to UE-A corresponding to the DCR that exceeds a SL RSRP threshold or SL SINR threshold. The SL RSRP or SL SINR can be determined based on the PSCCH DMRS or based on the PSSCH DMRS or base on the SL CSI-RS. The SL RSRP threshold or SL SINR threshold can be pre-configured, and/or configured or updated by RRC signaling from a network and/or RRC signaling over PC5 and/or MAC CE signaling and/or L1 control signaling. In one example, if a SL RSRP threshold or SL SINR threshold is not (pre-)configured, a default value specified in the system specification is used. In one example, the SL RSRP threshold or SL SINR threshold depends on the priority of the corresponding DCR message. In a variant of this example, it can be up to the implementation of UE-B whether to wait for decoding other DCR messages or not before UE-B sends a response back to UE-A. In one example if UE-B waits, the decoded DCRs can be within a (pre-)configured window as described herein.

h) In one example, if no DCR message with a SL RSRP that exceeds a SL RSRP threshold at UE-B or SL SINR that exceeds a SL SINR threshold, UE-B receives or attempts to receive DCR corresponding to all transmitted beams from UE-A before determining the DCR message to respond to. In one example, the decoded DCRs can be within a (pre-)configured window as described herein. In another example, the link establishment messages (e.g., DCR) can be those transmitted in one transmit beam sweep as described herein. UE-B determines the DCR message with the largest SL RSRP or SL SINR. The SL RSRP or SL SINR can be determined based on the PSCCH DMRS or based on the PSSCH DMRS or based on the SL CSI-RS. The SL RSRP threshold or SL SINR threshold can be pre-configured, and/or configured or updated by RRC signaling from a network and/or RRC signaling over PC5 and/or MAC CE signaling and/or L1 control signaling. In one example, if a SL RSRP threshold or SL SINR threshold is not (pre-)configured, a default value specified in the system specification is used. In one example, the SL RSRP threshold or SL SINR threshold depends on the priority of the corresponding DCR message.

i) In one example, UE-A repeats the DCR message on the same transmit beam (spatial domain transmission filter) UE-B attempts to receive the repeated DCR using different receive beams (spatial domain reception filters) to find the best receiver beam (spatial domain reception filter) to use (at UE-B). In one example, the resource pool can be (pre-) configured whether repetition is on or off. Repetition can be pre-configured, and/or configured or updated by RRC signaling from a network and/or RRC signaling over PC5 and/or MAC CE signaling and/or L1 control signaling. In one example, if repetition is not (pre-)configured, a default value specified in the system specification is used. When repetition is on, UE-B can assume that the DCR message is repeated using the same transmit beam (spatial domain transmission filter) from UE-A. When repetition is off, UE-B can't assume that the DCR message is repeated using the same transmit beam (spatial domain transmission filter) from UE-A. When repetition is on, the resource pool can be (pre-)configured with the number of repetitions M, where M is the number of DCR transmissions on the same transmit beam (spatial domain transmission filter) from UE-A. M can be pre-configured, and/or configured or updated by RRC signaling from a network and/or RRC signaling over PC5 and/or MAC CE signaling and/or L1 control signaling. In one example, if M is not (pre-) configured, a default value specified in the system specification is used.

Figure 14:
FIG. 14 illustrates an example of transmit and receive beam sweeping according to embodiments of the present disclosure.
Figure 14:
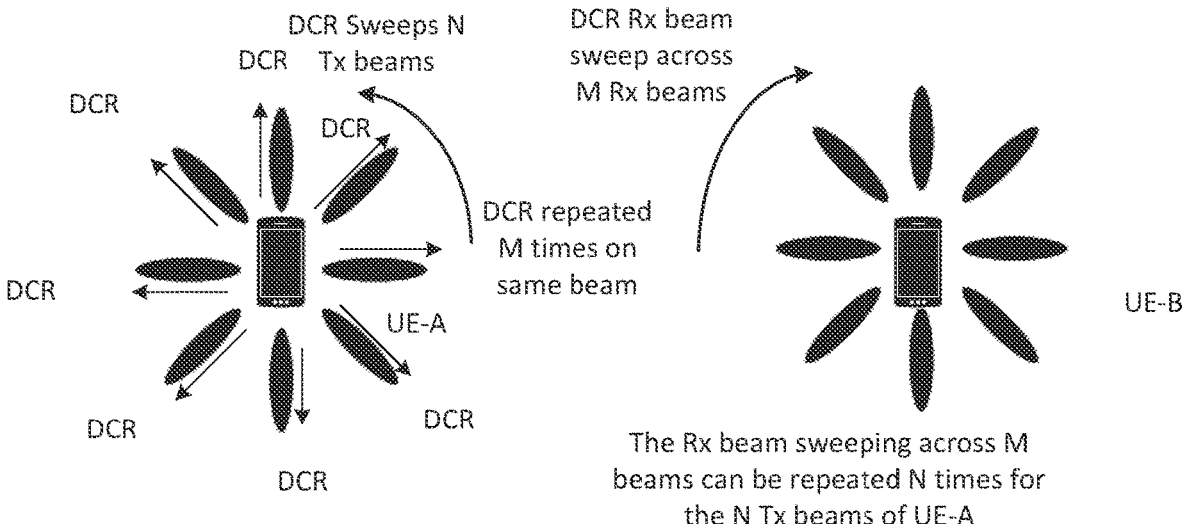

FIG. 14 illustrates an example of transmit and receive beam sweeping 1400 according to embodiments of the present disclosure. For example, beam sweeping 1400 can be utilized by any of the UEs 111-116 to perform SL communications. This example is for illustration only and other embodiments can be used without departing from the scope of the present disclosure.

In one example, after a UE (e.g., UE-B) determines a DCR and a corresponding transmit beam (or spatial domain transmission filter) from UE-A according to one or more examples described herein, UE-B sends a response, a signal, or a message to UE-A, wherein the response, the signal, or the message indicates a transmit beam (or spatial domain transmission filter) from UE-A.

In one example, the response is a PSFCH transmission corresponding to the DCR of a transmit beam (or spatial domain transmission filter) from UE-A. There is a relation between the DCR (e.g., transmitted on PSCCH/PSSCH) and the corresponding PSFCH resource. By receiving a PSFCH, UE-A would be able to determine the corresponding PSCCH/PSSCH of the DCR and the associated transmit team (spatial domain transmission filter). This can be the spatial domain filter UE-A uses for subsequent transmissions to UE-B.

In a further example, the PSFCH response contains a positive acknowledgment. In a further example, the PSFCH response contains a negative acknowledgment. The retransmission of the DCR uses the transmit beam (spatial domain transmission filter) of the DCR being negatively acknowledged.

In one example, UE-A receives multiple PSFCH transmissions in response to DCR messages sent on multiple transmit beams (spatial domain transmission filters). UE-A can select a transmit beam (spatial domain transmission filter) corresponding to one of the DCRs with a received PSFCH.

In one example, UE-A can select a transmit beam (spatial domain transmission filter) corresponding to the DCR associated with the strongest received PSFCH. In one example, UE-A can select a transmit beam (spatial domain transmission filter) corresponding to a DCR associated with a PSFCH that includes a positive acknowledgment. In one example, UE-A can select a transmit beam (spatial domain transmission filter) corresponding to a DCR associated with the strongest received PSFCH that includes a positive acknowledgment.

In one example if UE-B receives multiple DCRs that are successfully decoded, UE-B only sends PSFCH with positive acknowledgement for one of the successfully decoded DCRs. For example, the DCR associated with a preferred transmit beam (or spatial domain transmission filter) can be according to one or more examples described herein. In one example if UE-B receives multiple DCRs that are successfully decoded, UE-B can send PSFCH with positive acknowledgement for the successfully decoded DCRs or a subset of the successfully decoded DCRs.

In one example, the response is a PSCCH transmission corresponding to the DCR of a transmit beam (or spatial domain transmission filter) from UE-A. There can be a fixed relation between the DCR and the PSCCH transmission.

For example, a fixed time offset between a DCR can be determined according to one or more examples described herein, e.g., associated with a preferred transmit beam (or spatial domain transmission filter) from UE-A, and the PSCCH transmission.

In another example, there is a mapping between the resource used for a DCR determined according to one or more examples described herein, e.g., associated with a preferred transmit beam (or spatial domain transmission filter) from UE-A, and the PSCCH transmission.

In another example, a DCR determined according to one or more examples described herein, e.g., associated with a preferred transmit beam (or spatial domain transmission filter) from UE-A, indicates a resource for a corresponding PSCCH transmission.

In one example, the slot of the link establishment message (e.g., DCR)—slot n—determines the slot of the response message (e.g., PSCCH)—slot m—e.g., m=n+D, m≥n+D, m>n+D wherein D can be pre-configured, and/or configured or updated by RRC signaling from a network and/or RRC signaling over PC5 and/or MAC CE signaling and/or L1 control signaling.

In one example, D can be specified in the system specifications. In one example, if D is not (pre-)configured, a default value specified in the system specification is used.

In one example, m and/or n and/or D can be in logical slots of a resource pool. In one example, m and/or n and/or D can be in logical slots that can be in a resource pool. In one example, m and/or n and/or D can be in physical slots or physical time.

In one example, UE-A receives multiple PSCCH transmissions in response to DCR messages sent on multiple transmit beams (spatial domain transmission filters). UE-A can select a transmit beam (spatial domain transmission filter) corresponding to one of the DCRs with a received PSCCH transmission.

In one example, UE-A can select a transmit beam (spatial domain transmission filter) corresponding to the DCR that is associated with the strongest received PSCCH transmission.

In one example, if UE-B receives multiple DCRs that are successfully decoded, UE-B only sends PSCCH transmission for one of the successfully decoded DCRs. For example, the DCR that is associated with a preferred transmit beam (or spatial domain transmission filter), can be according to one or more examples described herein.

In one example, if UE-B receives multiple DCRs that are successfully decoded, UE-B can send PSCCH transmissions for the successfully decoded DCRs or a subset of the successfully decoded DCRs.

In one example, the PSCCH transmission includes a quality metric of the corresponding DCR. For example, the quality metric can be a SL RSRP of the DCR (PSCCH RSRP or PSSCH RSRP or SL CSI-RS RSRP). In another example, the quality metric can be a SL SINR of the DCR (PSCCH SINR or PSSCH SINR or SL CSI-RS SINR).

In one further example, UE-A can determine the transmit beam (spatial domain transmission filter) from UE-A for subsequent transmission at least based on the quality metric.

In one example, in response to one or more DCR transmissions, e.g., transmissions associated with multiple transmit beams (spatial domain transmission filters) from UE-A, UE-B sends a PSCCH transmission. The PSCCH transmission includes an indication of the determined DCR according to one or more examples described herein, for example, a DCR associated with a preferred transmit beam (or spatial domain transmission filter) from UE-A.

In one example, the PSCCH transmission is transmitted multiple times on different transmit beams (or spatial domain transmission filters) from UE-B for transmit beam sweeping from UE-B.

In one example, the response is PSCCH/PSSCH transmission corresponding to the DCR of a transmit beam (or spatial domain transmission filter) from UE-A. There can be a fixed relation between the DCR and the PSCCH/PSSCH transmission, such as a fixed time offset between a DCR determined according to one or more examples described herein, e.g., associated with a preferred transmit beam (or spatial domain transmission filter) from UE-A, and the PSCCH/PSSCH transmission.

In another example, there is a mapping between the resource used for a DCR determined according to one or more examples described herein, e.g., associated with a preferred transmit beam (or spatial domain transmission filter) from UE-A, and the PSCCH/PSSCH transmission.

In another example, a DCR determined according to one or more examples described herein, e.g., associated with a preferred transmit beam (or spatial domain transmission filter) from UE-A, indicates a resource for a corresponding PSCCH/PSSCH transmission.

In one example, the slot of the link establishment message (e.g., DCR)—slot n—determines the slot of the response message (e.g., PSCCH/PSCCH)—slot m—e.g., m=n+D, m≥n+D, or m>n+D, wherein D can be pre-configured, and/or configured or updated by RRC signaling from a network and/or RRC signaling over PC5 and/or MAC CE signaling and/or L1 control signaling.

In one example, D can be specified in the system specifications. In one example, if D is not (pre-)configured, a default value specified in the system specification is used.

In one example, m and/or n and/or D can be in logical slots of a resource pool. In one example, m and/or n and/or D can be in logical slots that can be in a resource pool. In one example, m and/or n and/or D can be in physical slots or physical time.

In one example, UE-A receives multiple PSCCH/PSSCH transmissions in response to DCR messages sent on multiple transmit beams (spatial domain transmission filters). UE-A can select a transmit beam (spatial domain transmission filter) corresponding to one of the DCRs with a received PSCCH/PSSCH transmission.

In one example, UE-A can select a transmit beam (spatial domain transmission filter) corresponding to the DCR associated with the strongest received PSCCH/PSSCH transmission or strongest SL CSI-RS associated with or included in PSCCH/PSSCH.

In one example if UE-B receives multiple DCRs that are successfully decoded, UE-B only sends PSCCH/PSSCH transmission for one of the successfully decoded DCRs, such as the DCR associated with a preferred transmit beam (or spatial domain transmission filter) according to one or more examples described herein.

In one example, if UE-B receives multiple DCRs that are successfully decoded, UE-B can send PSCCH/PSSCH transmissions for the successfully decoded DCRs or a subset of the successfully decoded DCRs.

In one example, the PSCCH/PSSCH transmission includes a quality metric of the corresponding DCR. For example, the quality metric can be a SL RSRP of the DCR (PSCCH RSRP or PSSCH RSRP or SL CSI-RS RSRP). In another example, the quality metric can be a SL SINR of the DCR (PSCCH SINR or PSSCH SINR or SL CSI-RS SINR).

In one further example, UE-A can determine the transmit beam (spatial domain transmission filter) from UE-A for subsequent transmission at least based on the quality metric. In one example, the quality metric can be in the first stage SCI (e.g., in PSCCH). In another example, the quality metric can be in the second stage SCI (e.g., in PSSCH). In another example, the quality metric can be in a SL shared channel (e.g., in PSSCH). In another example, the quality metric can be in a MAC CE.

In one example, in response to one or more DCR transmissions, e.g., transmissions associated with multiple transmit beams (spatial domain transmission filters) from UE-A, UE-B sends a PSCCH/PSSCH transmission. The PSCCH/PSSCH transmission includes an indication of the determined DCR according to one or more examples described herein, such as a DCR associated with a preferred transmit beam (or spatial domain transmission filter) from UE-A. In one example, the indication can be in the first stage SCI (e.g., in PSCCH). In another example, the indication can be in the second stage SCI (e.g., in PSSCH). In another example, the indication can be in a SL shared channel (e.g., in PSSCH). In another example, the indication can be in a MAC CE.

In one example, the PSCCH/PSSCH transmission is transmitted multiple times on different transmit beams (or spatial domain transmission filters) from UE-B for transmit beam sweeping from UE-B.

In one example, the response to the DCRs transmitted on multiple transmit beams (spatial domain transmission filters) from UE-A indicating a determined DCR and its associated transmit beam (spatial domain transmission filter) is included in (or part of) the security establishment procedure, e.g., step 740 of FIG. 7.

In one example, UE-B can determine the transmit beam for the response message to UE-A, e.g., PSFCH according to one or more examples described herein and security establishment procedure according to one or more examples described herein, based on beam correspondence or beam reciprocity between the transmit beam (or spatial domain transmission filter) of UE-B and the receive beam (or spatial domain reception filter) of UE-B. The receive beam (or spatial domain reception filter) of UE-B used to receive the DCR (e.g., the DCR determined according to one or more examples described herein) determines the transmit beam (or spatial domain transmission filter) UE-B uses to transmit a response to UE-A.

In a further example, the response message according to one or more examples described herein, is repeated multiple times on the same transmit beam (spatial domain transmission filter) from UE-B to allow UE-A to perform RX beam sweeping and find a preferred RX beam (spatial domain reception filter) at UE-A.

In a further example, UE-A determines its receive beam (spatial domain reception filter) based on beam correspondence (beam reciprocity) using the transmit beam (spatial domain reception filter) of UE-A of the corresponding DCR transmitted from UE-A.

For example, if UE-A transmits a message in slot n, and expects to receive the response in slot m, UE-A determines the RX beam of slot m based on beam correspondence with the TX beam used in slot n.

In one example, the response message from UE-B, e.g., PSFCH, PSCCH, and/or PSCCH/PSSCH according to one or more examples described herein and security establishment procedure according to one or more examples described herein, is transmitted on multiple transmit beams (spatial domain transmission filters) from UE-B. The transmissions in multiple beams can be in different time and/or frequency and/or code (e.g., cyclic shift for PSFCH) resources. UE-A can determine a transmission from UE-B corresponding to a transmit beam (e.g., spatial domain transmission filter) from UE-B that is preferred for subsequent transmissions from UE-B. UE-A can signal to UE-B the preferred transmission, e.g., using one or more examples described herein, where the role of UE-A and UE-B are switched. UE-A can determine a preferred transmission and corresponding a preferred transmit beam (e.g., spatial domain transmission filter) from UE-B based on a quality metric, e.g., SL RSPR, wherein the SL RSRP can be based on PSCCH DMRS RSRP or PSSCH DMRS RSRP or SL CSI-RS RSRP or SL SINR, wherein the SL SINR can be based on PSCCH DMRS SINR or PSSCH DMRS SINR or SL CSI-RS SINR.

In a further example, the response message according to one or more examples described herein, is repeated multiple times on each transmit beam (spatial domain transmission filter) from UE-B (in addition to having multiple Tx beams), to allow UE-A to perform RX beam sweeping and find a preferred RX beam (spatial domain reception filter) at UE-A.

In a further example, UE-A determines its receive beam (spatial domain reception filter), based on beam correspondence (beam reciprocity) using the transmit beam (spatial domain reception filter) of UE-A of the corresponding DCR transmitted from UE-A.

For example, if UE-A transmits a message in slot n, and expects to receive the response in slot m, UE-A determines the Rx beam of slot m based on beam correspondence with the TX beam used in slot n.

According to one or more examples described herein, when UE-B receives one or more link establishment messages from UE-A, examples of the response from UE-B can be:

a) In one example, each response from UE-B corresponds to one of the messages received from UE-A. In a sub-example, UE-B can send one message (e.g., if more than one link establishment message is received (e.g., successfully decoded) by UE-B, UE-B can select one of them based on the aforementioned examples and sends a corresponding response). In a sub-example, UE-B can send multiple messages (e.g., if more than one link establishment message is received (e.g., successfully decoded) by UE-B, UE-B can select some or all of them based on the aforementioned examples and sends a corresponding response for each message).

b) In one example, the response from UE-B corresponds to one or multiple messages received from UE-A. For example, a single response message can be sent for the received (or a subset of the received) link establishment messages at UE-B from UE-A. UE-B can select, based on a selection criteria according to one or more examples described herein, one, some, or all of the received link establishment messaged to include in the message sent to UE-A.

c) In one example, the response from UE-B can be PSFCH and/or PSCCH and/or PSCCH/PSSCH (e.g., $2^{nd}$ stage SCI and/or $1^{st}$ stage SCI) and/or PSCCH/PSSCH (e.g., MAC CE).

In one example, the DCR doesn't include the Target User Info. The DCR used to initiate the unicast layer-2 link establishment is transmitted via PC5 broadcast transmission to multiple UEs. The UEs interested in using the announced V2X service type respond to the DCR.

Figure 15:
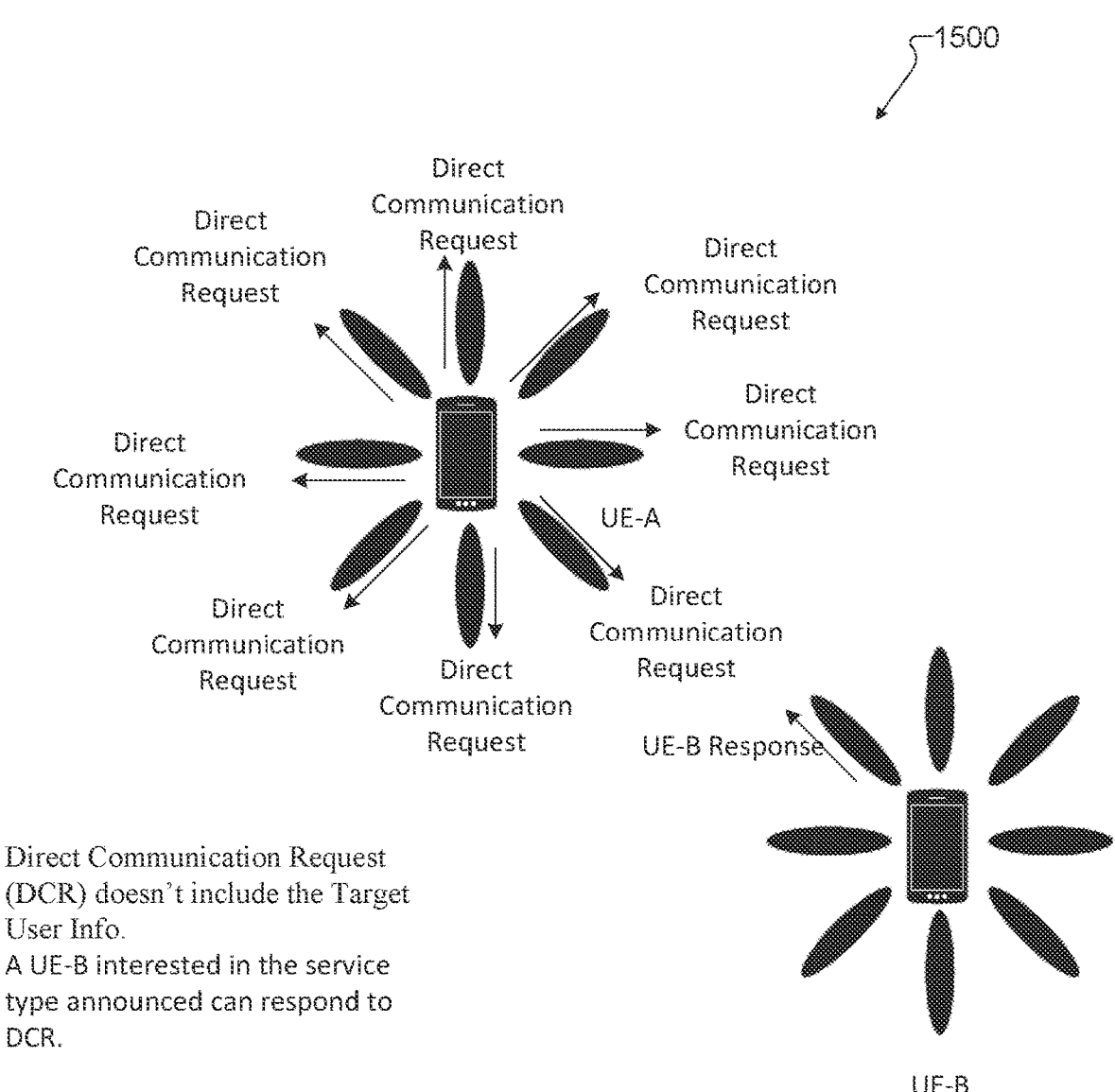
FIG. 15 illustrates an example of an initial beam acquisition according to embodiments of the present disclosure.

FIG. 15 illustrates an example of an initial beam acquisition 1500 according to embodiments of the present disclosure. For example, acquisition 1500 can be performed by any of the UEs 111-116 for SL communications. This example is for illustration only and other embodiments can be used without departing from the scope of the present disclosure.

UE-A transmits the DCR message on multiple UE-A transmit beams (e.g., multiple UE-A spatial domain transmission filters), e.g. transmit beam sweeping. UE-B attempts to receive the DCR messages transmitted on the multiple UE-A transmit beams (e.g., UE-A spatial domain transmission filters) and determines if it is interested in the announced service type. If the UE-B is interested in the announced service type, UE-B determines a DCR message (e.g., a DCR message corresponding to a preferred UE-A transmit beam (e.g., UE-A spatial domain transmission filter)).

In one example, UE-B can perform receive beam sweeping to find a preferred receive beam (spatial domain receive filter) at UE-B. In this case, UE-A can repeat transmission on the same transmit beam (spatial domain transmission filter) from UE-A. UE-B sends a response back to UE-A corresponding to the determined DCR message indicating a preferred transmit beam (spatial domain transmission filter) from UE-A to UE-B.

In one example, the response from UE-B is sent on one transmit beam (spatial domain transmission filter) from UE-B.

In one example, UE-A can perform receive beam sweeping for the response to find a preferred receive beam (spatial domain reception filter) at UE-A. In this case, UE-B can repeat a response transmission on the same transmit beam (spatial domain transmission filter) from UE-B.

In one example, the response from UE-B is transmitted on multiple transmit beams (spatial domain transmission filters) from UE-B to UE-A.

In one example UE-A can perform receive beam sweeping for the response to find a preferred receive beam (spatial domain reception filter) at UE-A. In this case, UE-B can repeat a response transmission on the same transmit beam (spatial domain transmission filter) from UE-B.

In a further example, UE-A can indicate to UE-B a preferred transmit beam (spatial domain transmission filter) from UE-B to UE-A.

There could be one or more UE-B(s) that is interested in the announced service type. Hence, a UE-A might receive one or more responses from one or more UE-B. It could also be possible that no UE's are interested in the announced service type or that no UE's received the DCR message, in which case, there could be no response back to UE-A.

In one example, UE-A transmits the DCR message on multiple UE-A transmit beams (e.g., multiple UE-A spatial domain transmission filters), e.g., UE-A performs transmit beam sweeping.

Figure 16:
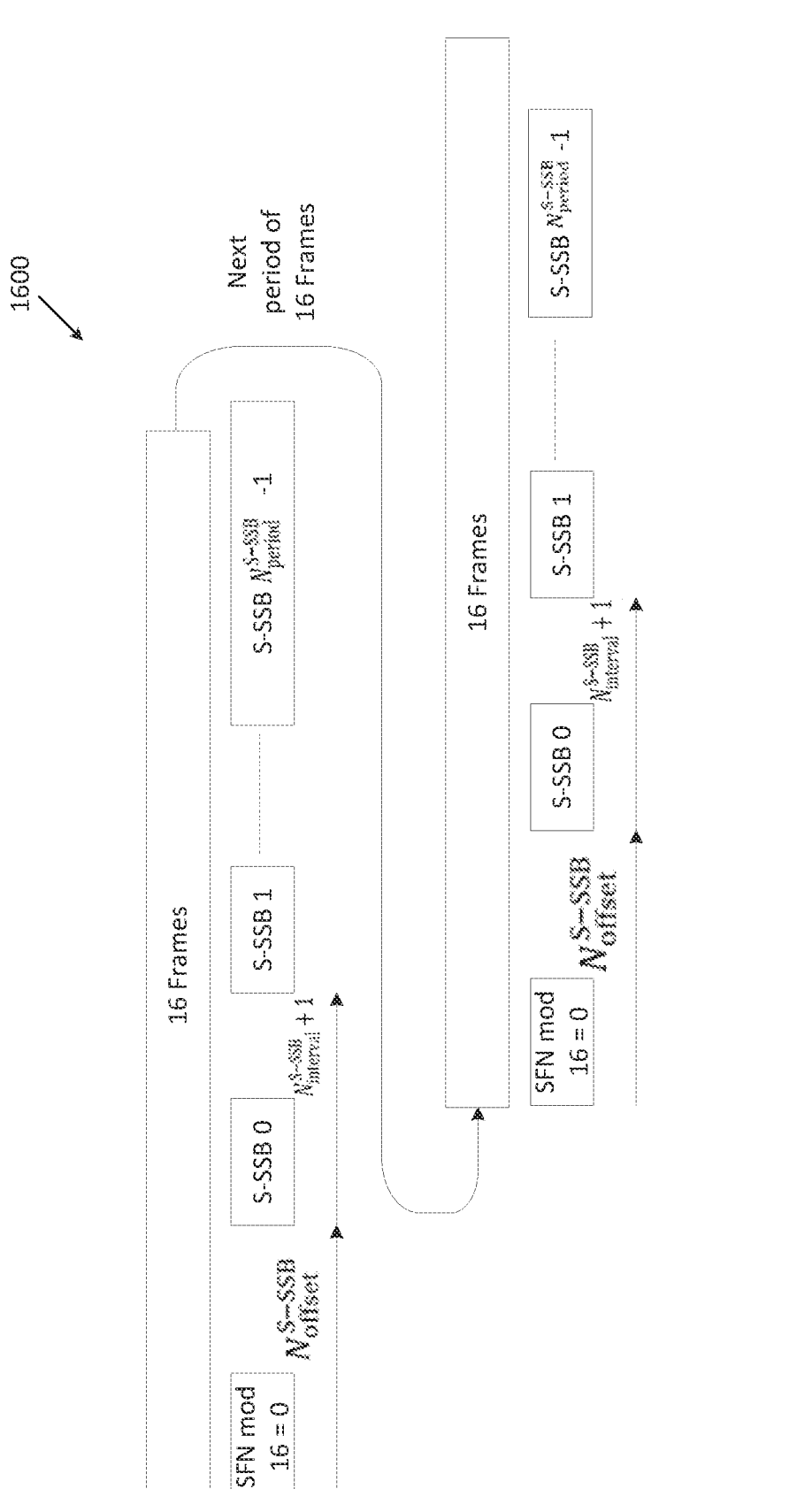
FIG. 16 illustrates another example of S-SSBs according to embodiments of the present disclosure.

FIG. 16 illustrates an example of S-SSBs 1600 according to embodiments of the present disclosure. For example, S-SSBs 1600 can be utilized by an of the UEs 111-116 of FIG. 1. This example is for illustration only and other embodiments can be used without departing from the scope of the present disclosure.

In one example, a DCR transmission between S-SSB 0 and S-SSB 1 is associated with or linked to a first UE-A Tx beam (e.g., a first UE-A spatial domain transmission filter), a DCR transmission between S-SSB 1 and S-SSB 2 is associated with or linked to a second UE-A Tx beam (e.g., a second UE-A spatial domain transmission filter), . . . , a DCR transmission between S-SSB $$N_{period}^{S-SSB} - 2$$

and S-SSB $$N_{period}^{S-SSB} - 1$$

is associated with or linked to a $$1\left(N_{period}^{S-SSB} - 1\right)^{th}$$

UE-A Tx beam (e.g., a $$\left(N_{period}^{S-SSB} - 1\right)^{th}$$

UE-A spatial domain transmission filter), a DCR transmission after S-SSB $$N_{period}^{S-SSB} - 1$$

and before S-SSB 0 of the next 16-frame period is associated with or linked to a $$N_{period}^{S-SSB_{th}}$$

UE-A Tx beam (e.g., a $$N_{period}^{S-SSB_{th}}$$

UE-A spatial domain transmission filter).

In one example a DCR transmission between S-SSB 0 and S-SSB 1 is associated with or linked to a first UE-A Tx beam (e.g., a first UE-A spatial domain transmission filter), a DCR transmission between S-SSB 1 and S-SSB 2 is associated with or linked to a second UE-A Tx beam (e.g., a second UE-A spatial domain transmission filter), . . . , a DCR transmission between S-SSB $$N_{period}^{S-SSB} - 2$$

and S-SSB $$N_{period}^{S-SSB} - 1$$

is associated with or linked to a $$1\left(N_{period}^{S-SSB} - 1\right)^{th}$$

UE-A Tx beam (e.g., a $$\left(N_{period}^{S-SSB} - 1\right)^{th}$$

UE-A spatial domain transmission filter), a DCR transmission after S-SSB $$N_{period}^{S-SSB} - 1$$

and before the end of the 16-frame period is associated with or linked to a $$N_{period}^{S-SSB_{th}}$$

UE-A Tx beam (e.g., a $$N_{period}^{S-SSB_{th}}$$

UE-A spatial domain transmission filter).

In one example a DCR transmission between S-SSB 0 and S-SSB 1 is associated with or linked to a first UE-A Tx beam (e.g., a first UE-A spatial domain transmission filter), a DCR transmission between S-SSB 1 and S-SSB 2 is associated with or linked to a second UE-A Tx beam (e.g., a second UE-A spatial domain transmission filter), . . . , a DCR transmission between S-SSB $$N_{period}^{S-SSB} - 2$$

and S-SSB $$N_{period}^{S-SSB} - 1$$

is associated with or linked to a $$\left(N_{period}^{S-SSB}-1\right)^{th}$$

UE-A Tx beam (e.g., a $$\left(N_{period}^{S-SSB}-1\right)^{th}$$

UE-A spatial domain transmission filter), a DCR transmission after S-SSB $$N_{period}^{S-SSB}-1$$

and for $N_{period}^{S-SSB}$ slots from S-SSB $$N_{period}^{S-SSB}-1$$

is associated with or linked to a $$N_{period}^{S-SSB_{th}}$$

UE-A Tx beam (e.g., a $$N_{period}^{S-SSB_{th}}$$

UE-A spatial domain transmission filter).

In one example a DCR transmission after S-SSB 0 and before S-SSB 1 and for no more than K slots starting from S-SSB 0 is associated with or linked to a first UE-A Tx beam (e.g., a first UE-A spatial domain transmission filter), a DCR transmission after S-SSB 1 and before S-SSB 2 and for no more than K slots starting from S-SSB 1 is associated with or linked to a second UE-A Tx beam (e.g., a second UE-A spatial domain transmission filter), . . . , a DCR transmission after S-SSB $$N_{period}^{S-SSB}-2$$

and before S-SSB $$N_{period}^{S-SSB}-1$$

and for no more than K slots starting from S-SSB $$N_{period}^{S-SSB}-2$$

is associated with or linked to a $$\left(N_{period}^{S-SSB}-1\right)^{th}$$

UE-A Tx beam (e.g., a $$\left(N_{period}^{S-SSB}-1\right)^{th}$$

UE-A spatial domain transmission filter), a DCR transmission after S-SSB $$N_{period}^{S-SSB}-1$$

and before S-SSB 0 of the next 16-frame interval and for no more than K slots starting from S-SSB $N_{period}^{S-SSB}-1$ is associated with or linked to a $$N_{period}^{S-SSB_{th}}$$

UE-A Tx beam (e.g., a $$N_{period}^{S-SSB_{th}}$$

UE-A spatial domain transmission filter).

In one example, K is in units of logical slots in a resource pool. In one example, K is in units of physical slots. K can be pre-configured, and/or configured or updated by RRC signaling from a network and/or RRC signaling over PC5 and/or MAC CE signaling and/or L1 control signaling.

In one example, K can be specified in the system specifications, for example, K=1 or K=2. In one example, if K is not (pre-)configured, a default value specified in the system specification is used for example K=1 or K=2. In one example, K is the same for all S-SSBs. In one example, a different K can be configured for each S-SSB or some of the S-SSBs.

In one example a DCR transmission after S-SSB 0 and before S-SSB 1 and for no more than K slots starting from S-SSB 0 is associated with or linked to a first UE-A Tx beam (e.g., a first UE-A spatial domain transmission filter), a DCR transmission after S-SSB 1 and before S-SSB 2 and for no more than K slots starting from S-SSB 1 is associated with or linked to a second UE-A Tx beam (e.g., a second UE-A spatial domain transmission filter), . . . , a DCR transmission after S-SSB $$N_{period}^{S-SSB}-2$$

and before S-SSB $$N_{period}^{S-SSB}-1$$

and for no more than K slots starting from S-SSB $$N_{period}^{S-SSB} - 2$$

is associated with or linked to a $$\left(N_{period}^{S-SSB} - 1\right)^{th}$$

UE-A Tx beam (e.g., a $$\left(N_{period}^{S-SSB} - 1\right)^{th}$$

UE-A spatial domain transmission filter), a DCR transmission after S-SSB $$N_{period}^{S-SSB} - 1$$

and before the end of the 16-frame interval and for no more than K slots starting from S-SSB $N_{period}^{S-SSB} - 1$ is associated with or linked to a $$N_{period}^{S-SSB_{th}}$$

UE-A Tx beam (e.g. a $$N_{period}^{S-SSB_{th}}$$

UE-A spatial domain transmission filter).

In one example, K is in units of logical slots in a resource pool. In one example, K is in units of physical slots. K can be pre-configured, and/or configured or updated by RRC signaling from a network and/or RRC signaling over PC5 and/or MAC CE signaling and/or L1 control signaling.

In one example, K can be specified in the system specifications, for example, K=1 or K=2. In one example, if K is not (pre-)configured, a default value specified in the system specification is used for example K=1 or K=2.

In one example, K is the same for all S-SSBs. In one example, a different K can be configured for each S-SSB or some of the S-SSBs.

In one example a DCR transmission after S-SSB 0 and for no more than K slots starting from S-SSB 0 is associated with or linked to a first UE-A Tx beam (e.g., a first UE-A spatial domain transmission filter), a DCR transmission after S-SSB 1 and for no more than K slots starting from S-SSB 1 is associated with or linked to a second UE-A Tx beam (e.g., a second UE-A spatial domain transmission filter), . . . , a DCR transmission after S-SSB $$N_{period}^{S-SSB} - 2$$

and for no more than K slots starting from S-SSB $$N_{period}^{S-SSB} - 2$$

is associated with or linked to a $$\left(N_{period}^{S-SSB} - 1\right)^{th}$$

UE-A Tx beam (e.g., a $$\left(N_{period}^{S-SSB} - 1\right)^{th}$$

UE-A spatial domain transmission filter), a DCR transmission after S-SSB $$N_{period}^{S-SSB} - 1$$

and for no more than K slots starting from S-SSB $$N_{period}^{S-SSB} - 1$$

is associated with or linked to a $$N_{period}^{S-SSB_{th}}$$

UE-A Tx beam (e.g. a $$N_{period}^{S-SSB_{th}}$$

UE-A spatial domain transmission filter).

In one example, K is in units of logical slots in a resource pool. In one example, K is in units of physical slots. K can be pre-configured, and/or configured or updated by RRC signaling from a network and/or RRC signaling over PC5 and/or MAC CE signaling and/or L1 control signaling.

In one example, K can be specified in the system specifications, for example, K=1 or K=2. In one example, if K is not (pre-)configured, a default value specified in the system specification is used for example K=1 or K=2.

In one example, K is the same for all S-SSBs. In one example, a different K can be configured for each S-SSB or some of the S-SSBs.

In one example, a parameter (value) is included in the DCR, wherein the parameter (value) determines or is linked to a UE-A transmit beam (e.g., UE-A spatial domain transmission filter). In one example, the parameter (value) can be a UE-A transmit beam (e.g., UE-A spatial domain transmission filter) index. In one example, the parameter (value) is a field in a first stage SCI in a PSCCH channel associated with the DCR. In one example, the parameter (value) is a field in a second stage SCI in a PSSCH channel associated with the DCR. In one example, the parameter (value) is a field in a SL shared channel (SL-SCH) in a PSCCH channel associated with the DCR. In one example, the parameter (value) is a field in MAC CE associated with the DCR.

In one example, a DCR includes a SL CSI-RS. In one example, a SL CSI-RS can include and/or indicate a UE-ID. In one example, a SL CSI-RS can include and/or indicate a beam ID.

In one example, the sequence of the SL CSI-RS resource is generated according to:

$$r(m) = \frac{1}{\sqrt{2}}(1 - 2c(2m)) + j\frac{1}{\sqrt{2}}(1 - 2c(2m + 1))$$

Where, m=0, 1, . . .

The pseudo-random sequence c(n) is a length-31 Gold sequence defined as $c(n)=(x_1(n+N_c)+x_2(n+N_c))\bmod 2$ Where, $N_c=1600$ $x_1(n+31)=(x_1(n+3)+x_1(n))\bmod 2$ $x_1(n+31)=(x_2(n+3)+x_2(n+2)+x_2(n+1)+x_2(n))\bmod 2$ The first m-sequence is initialized with $x_1(0)=1$, and $x_2(n)=0$, for n=1 . . . 30.

The second m-sequence is initialized with $c_{init}$, where $c_{init}$ $$c_{init} = \left(2^{10}\left(N_{symb}^{slot}n_{s,f}^{\mu} + l + 1\right)(2n_{ID} + 1) + n_{ID}\right) + \bmod 2^{31}$$

Where, a)

$$N_{symb}^{slot}$$

is the number of symbols in a slot.

b)

$$n_{s,f}^{\mu}$$

is the slot number within a frame for sub-carrier spacing configuration pt.

c) l is the OFDM symbol number in a slot.

d)

$$n_{ID} = N_{ID}^{x} \bmod 2^{10}, \text{ where } N_{ID}^{x}$$

where $N_{ID}^{x}$ is the decimal representation of CRC of the first stage SL control information carried on PSCCH.

In one example, the sequence of the SL CSI-RS resource is the same for all UE-A transmit beams (UE-A spatial domain transmission filters). In one example, the sequence of the SL CSI-RS resource depends on (is a function of) the UE-A transmit beam index (UE-A spatial domain transmission filter index).

In one example, the sequence $n_{ID}$ depends on the UE-A transmit beam index (UE-A spatial domain transmission filter index).

In one example, the equation for $c_{init}$ depends on the UE-A transmit beam index (UE-A spatial domain transmission filter index).

In one example, the SL CSI-RS resource has a sequence that is a function of the slot number within a frame and a symbol number according to one or more examples described herein. In a variant example, the slot number is a logical slot number. In a variant example, the slot number is a slot number within a sub-frame The slot number and/or symbol determine the beam (or spatial filter) ID based on a mapping between the slot/symbol index and the beam (or spatial filter) ID.

In one example, a DCR for a first UE (e.g., UE-A) to second UEs (e.g., UE-Bs) doesn't implicitly or explicitly indicate to UE-Bs a UE-A transmit beam index (UE-A spatial domain transmission filter). A DCR from UE-A is transmitted on multiple beams. A response to a particular transmission instance of the DCR allows UE-A to infer (e.g., based on timing) the UE-A transmit beam index (UE-A spatial domain transmission filter) for subsequent transmissions from UE-A to a UE-B based on the transmission instance of the DCR for which UE-A received a response from the corresponding UE-B.

In a further example, the response of the DCR transmitted from a UE-B to UE-A includes a signal quality indicator (e.g., SL RSRP or SL SINR as measured by UE-B). For determining the UE-A transmit beam index (UE-A spatial domain transmission filter), UE-A can select a transmission instance with the best (e.g., largest) signal quality indicator (e.g., SL RSRP or SL SINR). Alternatively, UE-A can select any transmission instance with SL RSRP that exceeds a SL RSRP threshold or a SL SINR threshold. The SL RSRP threshold or SL SINR threshold can be pre-configured, and/or configured or updated by RRC signaling from a network and/or RRC signaling over PC5 and/or MAC CE signaling and/or L1 control signaling.

In one example, if a SL RSRP threshold or SL SINR threshold is not (pre-)configured, a default value specified in the system specification is used. In one example, the SL RSRP threshold or SL SINR threshold depends on the priority of the corresponding DCR message. In one example the SL RSRP can be based on PSCCH DMRS RSRP or PSSCH DMRS RSRP or SL CSI-RS RSRP. In one example, the SL SINR can be based on PSCCH DMRS SINR or PSSCH DMRS SINR or SL CSI-RS SINR.

In a further example, the response of the DCR transmitted from a UE-B to UE-A includes the corresponding resource or resources used for the DCR from UE-A, such as the starting (or ending) time resource (e.g., slot and/or symbol— this can be absolute or relative to the response) and/or the starting (or ending) frequency resource (e.g., sub-channel and/or PRB and/or sub-carrier—this can be absolute or relative to the response). In a further example, the response of the DCR transmitted from a UE-B to UE-A includes a reference (e.g., index) to the DCR from UE-A.

In one example, a UE-B receives or attempts to receive the DCR messages transmitted on multiple UE-A transmit beams (e.g., UE-A spatial domain transmission filter). The UE-B can check if it is interested in the announced service type. If UE-B is interested in the announced service type in the DCR message, UE-B can respond following one or more of the following:

a) In one example, if a DCR is successfully decoded, and UE-B is interested in the announced service, UE-B sends a response back to UE-A corresponding to the DCR that is successfully decoded. The message can include information that identifies UE-B.

b) In one example, if a DCR is successfully decoded and SL RSRP of the DCR exceeds a SL RSRP threshold or SL SINR of the DCR exceeds a SL SINR threshold and UE-B is interested in the announced service, UE-B sends a response back to UE-A corresponding to the DCR that exceeds a SL RSRP threshold or SL SINR threshold. The SL RSRP or SL SINR can be determined based on the PSCCH DMRS or based on the PSSCH DMRS or based on the SL CSI-RS. The SL RSRP threshold or SL SINR threshold can be pre-configured, and/or configured or updated by RRC signaling from a network and/or RRC signaling over PC5 and/or MAC CE signaling and/or L1 control signaling. In one example, if a SL RSRP threshold or SL SINR threshold is not (pre-)configured, a default value specified in the system specification is used. In one example, the SL RSRP threshold or SL SINR threshold depends on the priority of the corresponding DCR message. The message sent by UE-B can include information that identifies UE-B.

c) In one example, if multiple DCR messages are successfully decoded, and UE-B is interested in the announced service, UE-B determines the DCR message with the largest SL RSRP or largest SL SINR. The SL RSRP or SL SINR can be determined based on the PSCCH DMRS or based on the PSSCH DMRS or based on the SL CSI-RS. UE-B sends a response back to UE-A corresponding to the determined DCR. In one further example, a window can be (pre-)configured during which UE-B attempts to received DCR message. In one example, the window starts in the slot of the first successfully decoded DCR (or in the following slot) and ends T slots later, where, in one example, T can be in units of logical slots in a resource pool. In another example, T can be in units of physical slots. In one example, T can be pre-configured, and/or configured or updated by RRC signaling from a network and/or RRC signaling over PC5 and/or MAC CE signaling and/or L1 control signaling. In one example, T can be specified in the system specifications. In one example, if T is not (pre-)configured, a default value specified in the system specification is used. The message sent by UE-B can include information that identifies UE-B.

d) In one example, if multiple DCR messages are successfully decoded with SL RSRP or SL SINR of the DCR message exceeding a SL RSRP threshold or SL SINR threshold, and UE-B is interested in the announced service, UE-B determines the DCR message with the largest SL RSRP or SL SINR. A UE-B sends a response back to UE-A corresponding to the determined DCR message. The SL RSRP or SL SINR can be determined based on the PSCCH DMRS or based on the PSSCH DMRS or based on the SL CSI-RS. The SL RSRP threshold or SL SINR threshold can be pre-configured, and/or configured or updated by RRC signaling from a network and/or RRC signaling over PC5 and/or MAC CE signaling and/or L1 control signaling. In one example, if a SL RSRP threshold or SL SINR threshold is not (pre-)configured, a default value specified in the system specification is used. In one example, the SL RSRP threshold or SL SINR threshold depends on the priority of the corresponding DCR message. In one further example, a window can be (pre-)configured during which UE-B attempts to received DCR message. In one example, the window starts in the slot of the first successfully decoded DCR (or in the following slot) and ends T slots later, where, in one example, T can be in units of logical slots in a resource pool. In another example, T can be in units of physical slots. In one example, T can be pre-configured, and/or configured or updated by RRC signaling from a network and/or RRC signaling over PC5 and/or MAC CE signaling and/or L1 control signaling. In one example, T can be specified in the system specifications. In one example, if T is not (pre-)configured, a default value specified in the system specification is used. The message sent by UE-B can include information that identifies UE-B.

e) In one example, a UE-B receives or attempts to receive DCR corresponding to all transmitted beams from UE-A, and UE-B is interested in the announced service, before determining the DCR message to respond to. The message sent by UE-B can include information that identifies UE-B. For example, within a (pre-)configured window as described herein. In another example, the link establishment messages (e.g., DCR) can be those transmitted in one transmit beam sweep as aforementioned.

f) In one example, once a UE-B successfully decodes a DCR message and UE-B is interested in the announced service, UE-B can send a response back to UE-A corresponding to the DCR that is successfully decoded. In a variant of this example, it can be up to the implementation of UE-B whether to wait for decoding other DCR messages or not before UE-B sends a response back to UE-A (for example within a (pre-)configured window as described herein). The message sent by UE-B can include information that identifies UE-B.

g) In one example, once UE-B successfully decodes a DCR message, UE-B is interested in the announced service, and the corresponding SL RSRP or SL SINR of the DCR exceeds a SL RSRP threshold or SL SINR threshold, a UE-B sends a response back to UE-A corresponding to the DCR that exceeds a SL RSRP threshold or SL SINR threshold. The SL RSRP or SL SINR can be determined based on the PSCCH DMRS or based on the PSSCH DMRS or based on the SL CSI-RS. The SL RSRP threshold or SL SINR threshold can be pre-configured, and/or configured or updated by RRC signaling from a network and/or RRC signaling over PC5 and/or MAC CE signaling and/or L1 control signaling. In one example, if a SL RSRP threshold or SL SINR threshold is not (pre-)configured, a default value specified in the system specification is used. In one example, the SL RSRP threshold or SL SINR threshold depends on the priority of the corresponding DCR message. In a variant of this example, it can be up to the implementation of UE-B whether to wait for decoding other DCR messages or not before UE-B sends a response back to UE-A. In one example if UE-B waits, the decoded DCRs can be within a (pre-)configured window as described herein. The message sent by UE-B can include information that identifies UE-B.

h) In one example, if no DCR message with a SL RSRP that exceeds a SL RSRP threshold at UE-B or SL SINR that exceeds a SL SINR threshold and if UE-B is interested in the announced service, a UE-B receives or attempts to receive DCR corresponding to all transmitted beams from UE-A before determining the DCR message to respond to. In one example, the decoded DCRs can be within a (pre-)configured window as described herein. In another example, the link establishment messages (e.g., DCR) can be those transmitted in one transmit beam sweep as aforementioned. UE-B determines the DCR message with the largest SL RSRP or SL SINR. The SL RSRP or SL SINR can be determined based on the PSCCH DMRS or based on the PSSCH DMRS or based on the SL CSI-RS. The SL RSRP threshold or SL SINR threshold can be pre-configured, and/or configured or updated by RRC signaling from a network and/or RRC signaling over PC5 and/or MAC CE signaling and/or L1 control signaling. In one example, if a SL RSRP threshold or SL SINR threshold is not (pre-)configured, a default value specified in the system specification is used. In one example, the SL RSRP threshold or SL SINR threshold depends on the priority of the corresponding DCR message. The message sent by UE-B can include information that identifies UE-B.

i) In one example, UE-A repeats the DCR message on the same transmit beam (spatial domain transmission filter). UE-B attempts to receive the repeated DCR using different receive beams (spatial domain reception filters) to find the best receiver beam (spatial domain reception filter) to use (at UE-B) if UE-B is interested in the announced service. In one example, the resource pool can be (pre-)configured whether repetition is on or off. Repetition can be pre-configured, and/or configured or updated by RRC signaling from a network and/or RRC signaling over PC5 and/or MAC CE signaling and/or L1 control signaling. In one example, if repetition is not (pre-)configured, a default value specified in the system specification is used. When repetition is on, UE-B can assume that the DCR message is repeated using the same transmit beam (spatial domain transmission filter) from UE-A. When repetition is off, UE-B can't assume that the DCR message is repeated using the same transmit beam (spatial domain transmission filter) from UE-A. When repetition is on, the resource pool can be (pre-)configured with the number of repetitions M, where M is the number of DCR transmission on the same transmit beam (spatial domain transmission filter) from UE-A. M can be pre-configured, and/or configured or updated by RRC signaling from a network and/or RRC signaling over PC5 and/or MAC CE signaling and/or L1 control signaling. In one example, if M is not (pre-)configured, a default value specified in the system specification is used. The message sent by UE-B can include information that identifies UE-B.

Figure 17:
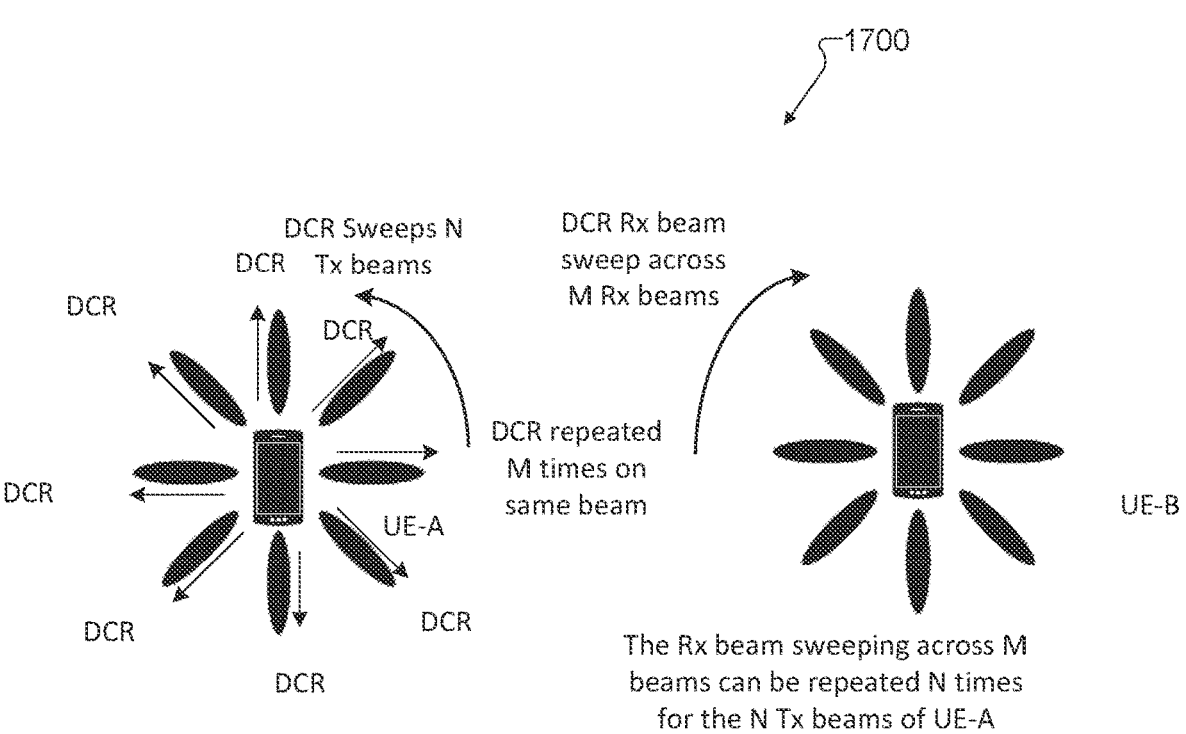
FIG. 17 illustrates an example of transmit and receive beam sweeping according to embodiments of the present disclosure.

FIG. 17 illustrates an example of transmit and receive beam sweeping 1700 according to embodiments of the present disclosure. For example, beam sweeping 1700 can be utilized by any of the UEs 111-116 to perform SL communications. This example is for illustration only and other embodiments can be used without departing from the scope of the present disclosure.

In one example, after a UE (e.g., UE-B determines a DCR and a corresponding transmit beam (or spatial domain transmission filter) from UE-A according to one or more examples described herein, and wherein UE-B is interested in the announced service, UE-B sends a response, a signal, or a message to UE-A, wherein the response or the signal or the message indicates a transmit beam (or spatial domain transmission filter) from UE-A. The message sent by UE-B can include information that identifies UE-B.

In one example, the response is a PSFCH transmission corresponding to the DCR of a transmit beam (or spatial domain transmission filter) from UE-A. There is a relation between the DCR (e.g., transmitted on PSCCH/PSSCH) and the corresponding PSFCH resource. By receiving a PSFCH, UE-A would be able to determine the corresponding PSCCH/PSSCH of the DCR and the associated transmit team (spatial domain transmission filter). This can be the spatial domain filter UE-A uses for subsequent transmissions to UE-B.

In one example, a UE-B transmits a PSFCH if it is interested in the announced service. The PSFCH can also indicate the UE-B transmitting the response. For example, each UE-B can be identified by the cyclic shift/PRB of the PSFCH or the PSFCH resource used.

In a further example, the PSFCH response contains a positive acknowledgment. In a further example, the PSFCH response contains a negative acknowledgment. The retransmission of the DCR uses the transmit beam (spatial domain transmission filter) of the DCR being negatively acknowledged.

In one example, UE-A receives multiple PSFCH transmissions in response to DCR messages sent on multiple transmit beams (spatial domain transmission filters) for a same UE-B. UE-A can also receive PSFCH response from other UE-Bs. UE-A can select a transmit beam (spatial domain transmission filter) corresponding to one of the DCRs with a received PSFCH for each UE-B.

In one example, UE-A can select a transmit beam (spatial domain transmission filter) corresponding to the DCR associated with the strongest received PSFCH of each UE-B. In one example, UE-A can select a transmit beam (spatial domain transmission filter) corresponding to a DCR associated with a PSFCH that includes a positive acknowledgement of each UE-B. In one example, UE-A can select a transmit beam (spatial domain transmission filter) corresponding to a DCR associated with the strongest received PSFCH that includes a positive acknowledgement of each UE-B.

In one example, if a UE-B receives multiple DCRs that are successfully decoded and UE-B is interested in the announced service, UE-B only sends PSFCH with positive acknowledgement for one of the successfully decoded DCRs, for example, the DCR associated with a preferred transmit beam (or spatial domain transmission filter), according to one or more examples described herein. In one example, if UE-B receives multiple DCRs that are successfully decoded and UE-B is interested in the announced service, UE-B can send PSFCH with positive acknowledgement for the successfully decoded DCRs or a subset of the successfully decoded DCRs.

In one example, there is no PSFCH transmission corresponding to the DCR. Instead, UE-B can use one or more of the examples described herein to indicate the preferred transmit beam (spatial domain transmission filter) from UE-A.

In one example, the response is PSCCH transmission corresponding to the DCR of a transmit beam (or spatial domain transmission filter) from UE-A. There can be a fixed relation between the DCR and the PSCCH transmission. For example, a fixed time offset between a DCR is determined according to one or more examples described herein, e.g., associated with a preferred transmit beam (or spatial domain transmission filter) from UE-A and the PSCCH transmission.

In another example, there is a mapping between the resource used for a DCR determined according to one or more examples described herein, e.g., associated with a preferred transmit beam (or spatial domain transmission filter) from UE-A and the PSCCH transmission.

In another example, a DCR determined according to one or more examples described herein, e.g., associated with a preferred transmit beam (or spatial domain transmission filter) from UE-A indicates a resource for a corresponding PSCCH transmission. A UE-B transmits the PSCCH if it is interested in the service announced in the DCR.

In one example, the PSCCH can include an indication of the UE-B identity or index. In one example, the identity or index of UE-B is explicitly indicated in the PSCCH, e.g., part of the payload. In another example, the identity or index of UE-B is implicitly indicated by the PSCCH, e.g., indicated by sequence of the PSCCH DMRS or sequence scrambling the CRC, etc.

In one example, the slot of the link establishment message (e.g., DCR)—slot n—determines the slot of the response message (e.g., PSCCH)—slot m—e.g., m=n+D, m≥n+D, or m>n+D, wherein D can be pre-configured, and/or configured or updated by RRC signaling from a network and/or RRC signaling over PC5 and/or MAC CE signaling and/or L1 control signaling.

In one example, D can be specified in the system specifications. In one example, if D is not (pre-)configured, a default value specified in the system specification is used.

In one example, m and/or n and/or D can be in logical slots of a resource pool. In one example, m and/or n and/or D can be in logical slots that can be in a resource pool. In one example, m and/or n and/or D can be in physical slots or physical time.

In one example, UE-A receives multiple PSCCH transmissions in response to DCR messages sent on multiple transmit beams (spatial domain transmission filters) for a same UE-B. UE-A can also receive PSCCH response from other UE-Bs. UE-A can select a transmit beam (spatial domain transmission filter) corresponding to one of the DCRs with a received PSCCH for each UE-B transmission.

In one example, UE-A can select a transmit beam (spatial domain transmission filter) corresponding to the DCR associated with the strongest received PSCCH transmission of each UE-B.

In one example if a UE-B receives multiple DCRs that are successfully decoded, and UE-B is interested in the announced service, UE-B only sends PSCCH transmission for one of the successfully decoded DCRs, for example, the DCR associated with a preferred transmit beam (or spatial domain transmission filter), according to one or more examples described herein.

In one example if UE-B receives multiple DCRs that are successfully decoded and UE-B is interested in the announced service, UE-B can send PSCCH transmissions for the successfully decoded DCRs or a subset of the successfully decoded DCRs.

In one example, the PSCCH transmission includes a quality metric of the corresponding DCR. For example, the quality metric can be a SL RSRP of the DCR (PSCCH RSRP or PSSCH RSRP or SL CSI-RS RSRP). In another example, the quality metric can be a SL SINR of the DCR (PSCCH SINR or PSSCH SINR or SL CSI-RS SINR).

In one further example, UE-A can determine the transmit beam (spatial domain transmission filter) from UE-A for subsequent transmission to each UE-B at least based on the quality metric from the corresponding UE-B.

In one example, in response to one or more DCR transmissions, e.g., transmissions associated with multiple transmit beams (spatial domain transmission filters) from UE-A and if a UE-B is interested in the announced service, the UE-B sends a PSCCH transmission. The PSCCH transmission includes an indication of the determined DCR according to one or more examples described herein, for example, a DCR associated with a preferred transmit beam (or spatial domain transmission filter) from UE-A. A UE-B transmits the PSCCH if it is interested in the service announced in the DCR.

In one example, the PSCCH can include an indication of the UE-B identity or index.

In one example, the identity or index of UE-B is explicitly indicated in the PSCCH, e.g., part of the payload.

In another example, the identity or index of UE-B is implicitly indicated by the PSCCH, e.g., indicated by sequence of the PSCCH DMRS or sequence scrambling the CRC, etc.

In one example, the PSCCH transmission is transmitted multiple times on different transmit beams (or spatial domain transmission filters) from UE-B for transmit beam sweeping from UE-B.

In one example, the response is a PSCCH/PSSCH transmission corresponding to the DCR of a transmit beam (or spatial domain transmission filter) from UE-A. There can be a fixed relation between the DCR and the PSCCH/PSSCH transmission. For example, a fixed time offset between a DCR is determined according to one or more examples described herein, e.g., associated with a preferred transmit beam (or spatial domain transmission filter) from UE-A and the PSCCH/PSSCH transmission.

In another example, there is a mapping between the resource used for a DCR determined according to one or more examples described herein, e.g., associated with a preferred transmit beam (or spatial domain transmission filter) from UE-A and the PSCCH/PSSCH transmission.

In another example, a DCR determined according to one or more examples described herein, e.g., associated with a preferred transmit beam (or spatial domain transmission filter) from UE-A indicates a resource for a corresponding PSCCH/PSSCH transmission. A UE-B transmits the PSCCH/PSSCH if it is interested in the service announced in the DCR.

In one example, the PSCCH/PSSCH can include an indication of the UE-B identity or index. In one example, the identity or index of UE-B is explicitly indicated in the PSCCH, e.g., part of the payload or in the PSSCH e.g., as a field in the second stage SCI or included in the SL-SCH or included in a MAC CE. In another example, the identity or index of UE-B is implicitly indicated by the PSCCH or PSSCH, e.g., indicated by sequence of the PSCCH DMRS or PSSCH DMRS or sequence of associated SL CSI-RS or sequence scrambling the CRC of PSCCH or CRC of second stage SCI or CRC of SL shared channel, etc.

In one example, the slot of the link establishment message (e.g., DCR)—slot n—determines the slot of the response message (e.g., PSCCH/PSCCH)— slot m—e.g., m=n+D, m≥n+D, or m>n+D, wherein D can be pre-configured, and/or configured or updated by RRC signaling from a network and/or RRC signaling over PC5 and/or MAC CE signaling and/or L1 control signaling.

In one example, D can be specified in the system specifications. In one example, if D is not (pre-)configured, a default value specified in the system specification is used.

In one example, m and/or n and/or D can be in logical slots of a resource pool. In one example, m and/or n and/or D can be in logical slots that can be in a resource pool. In one example, m and/or n and/or D can be in physical slots or physical time.

In one example, UE-A receives multiple PSCCH/PSSCH transmissions in response to DCR messages sent on multiple transmit beams (spatial domain transmission filters) for a same UE-B. UE-A can also receive PSCCH/PSSCH response from other UE-Bs. UE-A can select a transmit beam (spatial domain transmission filter) corresponding to one of the DCRs with a received PSCCH/PSSCH transmission for each UE-B.

In one example, UE-A can select a transmit beam (spatial domain transmission filter) corresponding to the DCR associated with the strongest received PSCCH/PSSCH transmission of each UE-B or strongest SL CSI-RS associated with or included in PSCCH/PSSCH.

In one example if a UE-B receives multiple DCRs that are successfully decoded and UE-B is interested in the announced service, UE-B only sends PSCCH/PSSCH transmission for one of the successfully decoded DCRs, for example, the DCR associated with a preferred transmit beam (or spatial domain transmission filter), according to one or more examples described herein.

In one example if UE-B receives multiple DCRs that are successfully decoded, and UE-B is interested in the announced service, UE-B can send PSCCH/PSSCH transmissions for the successfully decoded DCRs or a subset of the successfully decoded DCRs.

In one example, the PSCCH/PSSCH transmission includes a quality metric of the corresponding DCR. For example, the quality metric can be a SL RSRP of the DCR (PSCCH RSRP or PSSCH RSRP or SL CSI-RS RSRP). In another example, the quality metric can be a SL SINR of the DCR (PSCCH SINR or PSSCH SINR or SL CSI-RS SINR).

In one further example, UE-A can determine the transmit beam (spatial domain transmission filter) from UE-A for subsequent transmission to each UE-B at least based on the quality metric from the corresponding UE-B. In one example, the quality metric can be in the first stage SCI (e.g., in PSCCH). In another example, the quality metric can be in the second stage SCI (e.g., in PSSCH). In another example, the quality metric can be in a SL shared channel (e.g., in PSSCH). In another example, the quality metric can be in a MAC CE.

In one example, in response to one or more DCR transmissions, e.g., transmissions associated with multiple transmit beams (spatial domain transmission filters) from UE-A, and if a UE-B is interested in the announced service, the UE-B sends a PSCCH/PSSCH transmission. The PSCCH/PSSCH transmission includes an indication of the determined DCR according to one or more examples herein, for example, a DCR associated with a preferred transmit beam (or spatial domain transmission filter) from UE-A. In one example, the indication can be in the first stage SCI (e.g., in PSCCH). In another example the indication can be in the second stage SCI (e.g., in PSSCH). In another example, the indication can be in a SL shared channel (e.g., in PSSCH). In another example, the indication can be in a MAC CE.

A UE-B transmits the PSCCH/PSSCH if it is interested in the service announced in the DCR. In one example, the PSCCH/PSSCH can include an indication of the UE-B identity or index.

In one example, the identity or index of UE-B is explicitly indicated in the PSCCH, e.g., part of the payload or in the PSSCH e.g., as a field in the second stage SCI or included in the SL-SCH or included in a MAC CE. In another example, the identity or index of UE-B is implicitly indicated by the PSCCH or PSSCH, e.g., indicated by sequence of the PSCCH DMRS or PSSCH DMRS or sequence of SL CSI-RS or sequence scrambling the CRC of PSCCH or CRC of second stage SCI or CRC of SL shared channel, etc.

In one example, the PSCCH/PSSCH transmission is transmitted multiple times on different transmit beams (or spatial domain transmission filters) from UE-B for transmit beam sweeping from UE-B.

In one example, the response to the DCRs transmitted on multiple transmit beams (spatial domain transmission filters) from UE-A indicating a determined DCR and its associated transmit beam (spatial domain transmission filter) is included in (or part of) the security establishment procedure, e.g., step 740 of FIG. 7.

In one example, UE-B can determine the transmit beam for the response message to UE-A, e.g., PSFCH, if applicable, according to one or more examples herein, PSCCH according to one or more examples herein, PSCCH/PSSCH according to one or more examples herein, and security establishment procedure according to one or more examples herein, based on beam correspondence or beam reciprocity between the transmit beam (or spatial domain transmission filter) of UE-B and the receive beam (or spatial domain reception filter) of UE-B. The receive beam (or spatial domain reception filter) of UE-B used to receive the DCR (e.g., the DCR determined according to one or more examples herein) determines the transmit beam (or spatial domain transmission filter) UE-B uses to transmit a response to UE-A.

In one example, a UE-B transmits a response to the DCR if it is interested in the service announced in the DCR. In a further example, the response message according to one or more examples herein is repeated multiple time on the same transmit beam (spatial domain transmission filter) from UE-B to allow UE-A to perform Rx beam sweeping and find a preferred Rx beam (spatial domain reception filter) at UE-A for transmission to the corresponding UE-B.

In a further example, UE-A determines its receive beam (spatial domain reception filter) based on beam correspondence (beam reciprocity) using the transmit beam (spatial domain reception filter) of UE-A of the corresponding DCR transmitted from UE-A.

For example, if UE-A transmits a message in slot n, and expects to receive the response in slot m, UE-A determines the Rx beam of slot m based on beam correspondence with the TX beam used in slot n.

In one example, the response message from UE-B, e.g., PSFCH, if applicable, according to one or more examples herein, PSCCH according to one or more examples herein, PSCCH/PSSCH according to one or more examples herein, and security establishment procedure according to one or more examples described herein is transmitted on multiple transmit beams (spatial domain transmission filters) from UE-B. The transmissions in multiple beams can be in different time and/or frequency and/or code (e.g., cyclic shift for PSFCH, if applicable) resources. UE-A can determine a transmission from each UE-B corresponding to a transmit beam (e.g., spatial domain transmission filter) from a corresponding UE-B that is preferred for subsequent transmissions from the corresponding UE-B. UE-A can signal to the corresponding UE-B the preferred transmission, e.g., using one of the previous examples, where the role of UE-A and UE-B are switched. UE-A can determine a preferred transmission and corresponding a preferred transmit beam (e.g., spatial domain transmission filter) from UE-B based on a quality metric, e.g., SL RSPR, wherein the SL RSRP can be based on PSCCH DMRS RSRP or PSSCH DMRS RSRP or SL CSI-RS RSRP, or SL SINR, wherein the SL SINR can be based on PSCCH DMRS SINR or PSSCH DMRS SINR or SL CSI-RS RSRP.

In one example, a UE-B transmits a response to the DCR if it is interested in the service announced in the DCR. In a further example, the response message according to one or more examples described herein, is repeated multiple time on each transmit beam (spatial domain transmission filter)

from UE-B (in addition to having multiple Tx beams), to allow UE-A to perform Rx beam sweeping and find a preferred Rx beam (spatial domain reception filter) at UE-A for transmission to the corresponding UE-B.

In a further example, UE-A determines its receive beam (spatial domain reception filter) based on beam correspondence (beam reciprocity) using the transmit beam (spatial domain reception filter) of UE-A of the corresponding DCR transmitted from UE-A. For example, if UE-A transmits a message in slot n, and expects to receive the response in slot m, UE-A determines the Rx beam of slot m based on beam correspondence with the Tx beam used in slot n.

According to one or more examples described herein, when UE-B receives one or more link establishment messages from UE-A, the response from UE-B can be:

a) In one example, each response from UE-B corresponds to one of the messages received from UE-A. In a sub-example, UE-B can send one message (e.g., if more than one link establishment message is received (e.g., successfully decoded) by UE-B, UE-B can select one of them based on the aforementioned examples and sends a corresponding response).

In a sub-example, UE-B can send multiple messages (e.g., if more than one link establishment message is received (e.g., successfully decoded) by UE-B, UE-B can select some or all of them based on the aforementioned examples and sends a corresponding response for each message).

b) In one example, the response from UE-B corresponds to one or multiple messages received from UE-A. For example, a single response message can be sent for the received (or a subset of the received) link establishment messages at UE-B from UE-A. UE-B can select, based on a selection criteria as aforementioned, one, some, or all of the received link establishment messaged to include in the message sent to UE-A.

c) In one example, the response from UE-B can be PSFCH and/or PSCCH and/or PSCCH/PSSCH (e.g., $2^{nd}$ stage SCI and/or $1^{st}$ stage SCI) and/or PSCCH/PSSCH (e.g., MAC CE).

Figure 18:
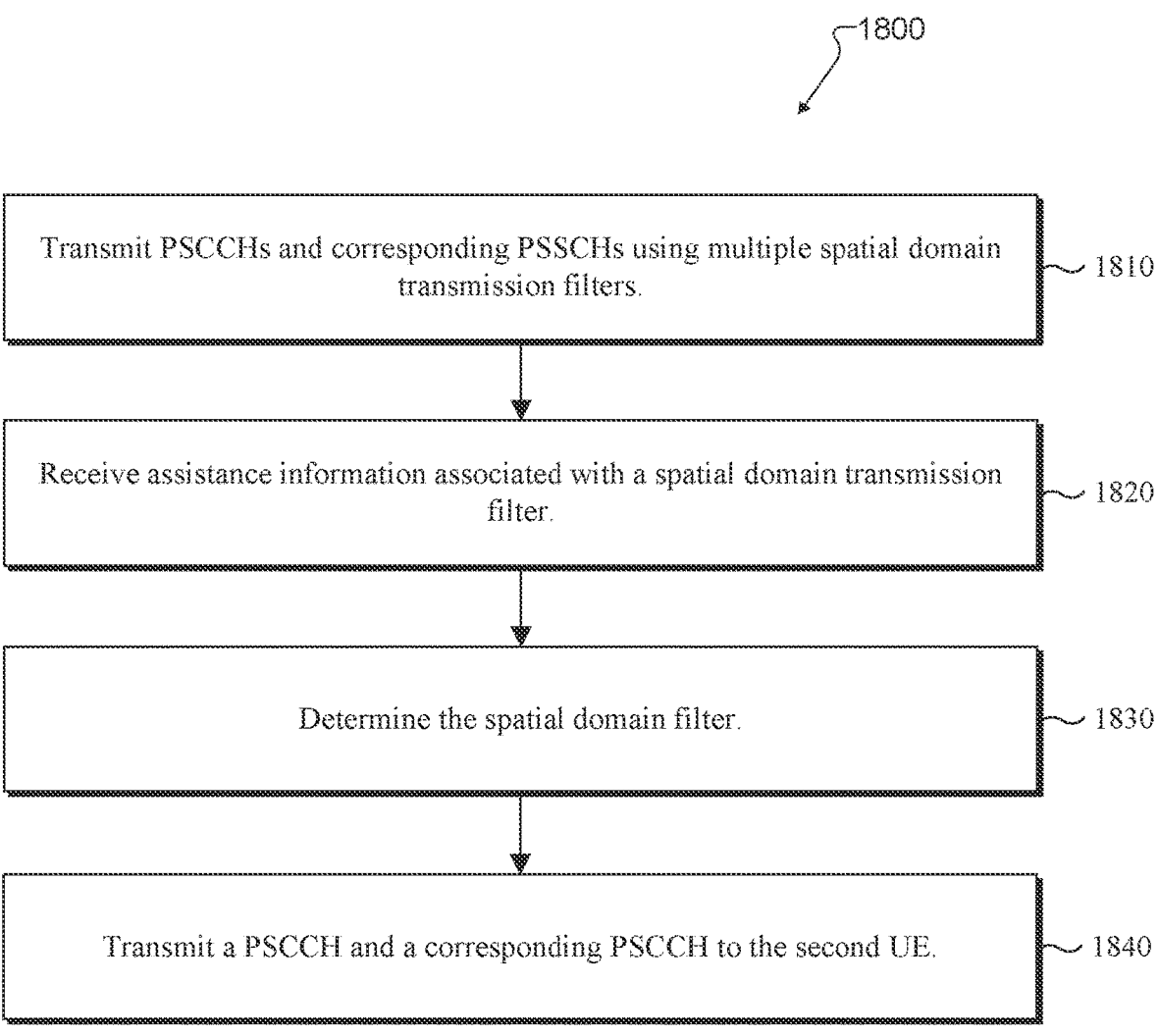
FIG. 18 illustrates an example method performed by a UE in a wireless communication system according to embodiments of the present disclosure.

FIG. 18 illustrates an example method 1800 performed by a UE in a wireless communication system according to embodiments of the present disclosure. The method 1800 of FIG. 18 can be performed by an of the UEs 111-116 of FIG. 1, such as the UE of FIG. 3. The method 1800 is for illustration only and other embodiments can be used without departing from the scope of the present disclosure.

The method 1800 begins with the UE transmitting to a second UE, first PSCCHs and corresponding first PSSCHs using multiple spatial domain transmission filters, respectively (1810). For example, in 1810, the first PSCCHs and the corresponding first PSSCHs include a first link establishment message. In various embodiments, a PSCCH from the first PSCCHs and a corresponding PSSCH from the corresponding first PSSCHs are repeated multiple times using a same spatial domain transmission filter from the multiple spatial domain transmission filters. In various embodiments, a retransmission of a PSCCH from the first PSCCHs and a corresponding PSSCH from the corresponding first PSSCHs uses a spatial domain transmission filter that was used for a corresponding earlier transmission. In various embodiments, the UE receives a PSFCH corresponding to a PSSCH from the corresponding first PSSCHs. The spatial domain transmission filter is a filter used for transmitting the PSSCH. The PSFCH includes a positive acknowledgement.

The UE then receives, from the second UE, assistance information associated with a spatial domain transmission filter (1820). For example, in 1820, the assistance information includes quality metrics related to the first PSCCHs and the corresponding PSSCHs. In various embodiments, a PSSCH from the corresponding first PSSCH includes a SL CSI-RS.

The UE then determines, based on the assistance information, the spatial domain transmission filter (1830). The UE then transmits, based on the spatial domain transmission filter, a second PSSCH and a corresponding second PSSCH to the second UE (1840).

In various embodiments, the UE may also receive, from a third UE, third PSCCHs and corresponding third PSSCHs. For example, the third PSCCHs and the corresponding third PSSCHs include a second link establishment message. The UE's measuring metrics are associated with the third PSCCHs and the corresponding third PSSCHs. In various embodiments, the metrics are based on SL RSRP measurements corresponding to the third PSCCHs and the corresponding third PSSCHs. The UE determines a second spatial domain reception filter to receive signals from the third UE. The UE transmits, to the third UE, second assistance information based on the metrics. The UE receives subsequent signals from the third UE using the second spatial domain reception filter. The UE receives information indicating a SL RSRP threshold. The UE determines a PSCCH from the third PSCCHs and a corresponding PSSCH from the corresponding third PSSCHs based on one of: a RSRP of a PSCCH DMRS exceeds the RSRP threshold, a RSRP of a PSSCH DMRS exceeds the RSRP threshold, or a RSRP of a CSI-RS associated with the corresponding PSSCH that exceeds the RSRP threshold. The UE transmits a PSFCH corresponding to the PSCCH and the corresponding PSSCH. In one example, the second assistance information is included in or indicated by the PSFCH.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Any of the above variation embodiments can be utilized independently or in combination with at least one other variation embodiment.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A user equipment (UE) comprising:

a transceiver configured to:

transmit, to a second UE, first physical sidelink control channels (PSCCHs) and corresponding first physical sidelink shared channels (PSSCHs) using multiple spatial domain transmission filters, respectively, wherein at least one of the first PSCCHs and the corresponding first PSSCHs includes a first link establishment message, and receive, from the second UE, a channel that includes a positive acknowledgment associated with a spatial domain transmission filter from the multiple spatial domain transmission filters, wherein a resource used for the channel is associated with the spatial domain transmission filter; and a processor operably coupled to the transceiver, the processor configured to determine the spatial domain transmission filter based on the channel, wherein the transceiver is further configured to transmit, based on the spatial domain transmission filter, a second PSCCH and a corresponding second PSSCH to the second UE.

2. The UE of claim 1, wherein a PSCCH from the first PSCCHs and a corresponding PSSCH from the corresponding first PSSCHs are repeated multiple times for transmission using a same spatial domain transmission filter from the multiple spatial domain transmission filters.

3. The UE of claim 1, wherein the channel includes quality metrics related to the first PSCCHs and the corresponding first PSSCHs.

4. The UE of claim 1, wherein a PSSCH from the corresponding first PSSCHs includes a sidelink (SL) channel state information reference signal (CSI-RS).

5. The UE of claim 1, wherein a retransmission of a PSCCH from the first PSCCHs and a corresponding PSSCH from the corresponding first PSSCHs uses a spatial domain transmission filter that was used for a corresponding earlier transmission.

6. The UE of claim 1, wherein:

the transceiver is further configured to receive a physical sidelink feedback channel (PSFCH) corresponding to a PSSCH from the corresponding first PSSCHs, and the spatial domain transmission filter is a filter used for transmitting the PSSCH.

7. The UE of claim 1, wherein the channel is a physical sidelink feedback channel (PSFCH).

8. The UE of claim 1, wherein:

the transceiver is further configured to receive, from a third UE, third PSCCHs and corresponding third PSSCHs, wherein the third PSCCHs and the corresponding third PSSCHs include a second link establishment message, the processor is further configured to:

measure metrics associated with the third PSCCHs and the corresponding third PSSCHs, and determine a spatial domain reception filter to receive signals from the third UE, and the transceiver is further configured to transmit, to the third UE, second assistance information based on the metrics, and receive subsequent signals from the third UE using the spatial domain reception filter.

9. The UE of claim 8, wherein the metrics are based on sidelink reference signal received power (RSRP) measurements corresponding to the third PSCCHs and the corresponding third PSSCHs.

10. The UE of claim 8, wherein:

the transceiver is further configured to receive information indicating a sidelink reference signal received power (RSRP) threshold, the processor is further configured to determine a PSCCH from the third PSCCHs and a corresponding PSSCH from the corresponding third PSSCHs based on one of:

a RSRP of a PSCCH DMRS exceeds the RSRP threshold, a RSRP of a PSSCH DMRS exceeds the RSRP threshold, or a RSRP of a channel state information reference signal (CSI-RS) associated with the corresponding PSSCH exceeds the RSRP threshold, the transceiver is further configured to transmit a physical sidelink feedback channel (PSFCH) corresponding to the PSCCH and the corresponding PSSCH, and the second assistance information is included in the PSFCH.

11. A method of operating a user equipment (UE), the method comprising:

transmitting, to a second UE, first physical sidelink control channels (PSCCHs) and corresponding first physical sidelink shared channels (PSSCHs) using multiple spatial domain transmission filters, respectively, wherein at least one of the first PSCCHs and the corresponding first PSSCHs includes a first link establishment message;

receiving, from the second UE, a channel that includes a positive acknowledgment associated with a spatial domain transmission filter from the multiple spatial domain transmission filters, wherein a resource used for the channel is associated with the spatial domain transmission filter;

determining the spatial domain transmission filter based on the channel; and transmitting, based on the spatial domain transmission filter, a second PSCCH and a corresponding second PSSCH to the second UE.

12. The method of claim 11, wherein a PSCCH from the first PSCCHs and a corresponding PSSCH from the corresponding first PSSCHs are repeated multiple times for transmission using a same spatial domain transmission filter from the multiple spatial domain transmission filters.

13. The method of claim 11, wherein the channel includes quality metrics related to the first PSCCHs and the corresponding first PSSCHs.

14. The method of claim 11, wherein a PSSCH from the corresponding first PSSCH includes a sidelink (SL) channel state information reference signal (CSI-RS).

15. The method of claim 11, wherein a retransmission of a PSCCH from the first PSCCHs and a corresponding PSSCH from the corresponding first PSSCHs uses a spatial domain transmission filter that was used for a corresponding earlier transmission.

16. The method of claim 11, further comprising:

receiving a physical sidelink feedback channel (PSFCH) corresponding to a PSSCH from the corresponding first PSSCHs, wherein the spatial domain transmission filter is a filter used for transmitting the PSSCH.

17. The method of claim 11, wherein the channel is a physical sidelink feedback channel (PSFCH).

18. The method of claim 11, further comprising:

receiving, from a third UE, third PSCCHs and corresponding third PSSCHs, wherein the third PSCCHs and the corresponding third PSSCHs include a second link establishment message;

measuring metrics associated with the third PSCCHs and the corresponding third PSSCHs;

determining a spatial domain reception filter to receive signals from the third UE;

transmitting, to the third UE, second assistance information based on the metrics; and receiving subsequent signals from the third UE using the spatial domain reception filter.

19. The method of claim 18, wherein the metrics are based on sidelink reference signal received power (RSRP) measurements corresponding to the third PSCCHs and the corresponding third PSSCHs.

20. The method of claim 18, further comprising:

receiving information indicating a sidelink reference signal received power (RSRP) threshold;

determining a PSCCH from the third PSCCHs and a corresponding PSSCH from the corresponding third PSSCHs based on one of:

a RSRP of a PSCCH DMRS exceeds the RSRP threshold, a RSRP of a PSSCH DMRS exceeds the RSRP threshold, or a RSRP of a channel state information reference signal (CSI-RS) associated with the corresponding PSSCH exceeds the RSRP threshold; and transmitting a physical sidelink feedback channel (PSFCH) corresponding to the PSCCH and the corresponding PSSCH, wherein the second assistance information is included in the PSFCH.

*   *   *   *   *